US007192349B2

(12) United States Patent
Baerlocher et al.

(10) Patent No.: US 7,192,349 B2
(45) Date of Patent: Mar. 20, 2007

(54) GAMING DEVICE HAVING MULTIPLE ROUND BONUS SCHEME WITH RESIDUAL AWARDS

(75) Inventors: Anthony J. Baerlocher, Reno, NV (US); Bayard S. Webb, Sparks, NV (US)

(73) Assignee: IGT, Reno, NV (US)

( * ) Notice: Subject to any disclaimer, the term of this patent is extended or adjusted under 35 U.S.C. 154(b) by 691 days.

(21) Appl. No.: 10/241,248

(22) Filed: Sep. 11, 2002

(65) Prior Publication Data

US 2003/0045350 A1 Mar. 6, 2003

Related U.S. Application Data

(63) Continuation-in-part of application No. 09/682,428, filed on Aug. 31, 2001, now Pat. No. 6,719,632.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/25; 463/17

(58) Field of Classification Search .................. 463/12, 463/15–21, 25
See application file for complete search history.

(56) References Cited

U.S. PATENT DOCUMENTS 4,448,419 A 5/1984 Telnaes
4,582,324 A 4/1986 Koza et al.
4,624,459 A 11/1986 Kaufman
5,611,535 A 3/1987 Tiberio
4,695,053 A 9/1987 Vazquez, Jr. et al.
4,991,848 A 2/1991 Greenwood et al.
5,121,919 A 6/1992 Martti
5,178,390 A 1/1993 Okada
5,205,555 A 4/1993 Hamano
5,342,047 A 8/1994 Heidel et al.
5,456,465 A 10/1995 Durham (Continued)

FOREIGN PATENT DOCUMENTS

EP 0874337 A1 10/1998

(Continued)

OTHER PUBLICATIONS

Addams Family Advertisement and Article written by IGT, Strictly Slots, published in 2000.

(Continued)

*Primary Examiner*—Corbett B. Coburn
*Assistant Examiner*—Jasson Yoo
(74) *Attorney, Agent, or Firm*—Bell, Boyd & Lloyd LLP

(57) ABSTRACT

A gaming device having an improved award-providing bonus scheme wherein the player may improve their award during different rounds of the bonus scheme. The gaming device enables the player to select an award from a plurality of awards. The gaming device enables the player to modify the selected award, creating a subsequent or modified award, and carry over residual award improvements from one round to a different round of the bonus game, with the idea of increasing the award to receive a greater or higher award during the bonus game.

53 Claims, 67 Drawing Sheets

U.S. PATENT DOCUMENTS

| | | | | | |
|---|---|---|---|---|---|
| 5,524,888 | A | | 6/1996 | Heidel | |
| 5,536,016 | A | | 7/1996 | Thompson | |
| 5,542,669 | A | | 8/1996 | Charron et al. | |
| 5,560,603 | A | | 10/1996 | Seelig et al. | |
| 5,711,525 | A | | 1/1998 | Breeding | |
| 5,769,716 | A | | 6/1998 | Saffari et al. | |
| 5,772,509 | A | | 6/1998 | Weiss | |
| 5,775,692 | A | | 7/1998 | Watts et al. | |
| 5,788,573 | A | | 8/1998 | Baerlocher et al. | |
| 5,823,874 | A | | 10/1998 | Weiss | |
| 5,833,537 | A | * | 11/1998 | Barrie | 463/21 |
| 5,833,538 | A | | 11/1998 | Weiss | |
| 5,848,932 | A | * | 12/1998 | Adams | 463/20 |
| 5,851,148 | A | | 12/1998 | Brune et al. | |
| 5,855,514 | A | * | 1/1999 | Kamille | 463/17 |
| 5,873,781 | A | | 2/1999 | Keane | |
| 5,882,261 | A | | 3/1999 | Adams | |
| 5,902,184 | A | | 5/1999 | Bennett et al. | |
| 5,911,418 | A | | 6/1999 | Adams | |
| 5,931,467 | A | | 8/1999 | Kamille | |
| 5,947,820 | A | | 9/1999 | Morro et al. | |
| 5,951,397 | A | | 9/1999 | Dickinson | |
| 5,964,463 | A | | 10/1999 | Moore, Jr. | |
| 5,967,894 | A | | 10/1999 | Kinoshita et al. | |
| 5,980,384 | A | | 11/1999 | Barrie | |
| 5,984,781 | A | | 11/1999 | Sunaga | |
| 5,996,997 | A | | 12/1999 | Kamille | |
| 5,997,400 | A | | 12/1999 | Seelig et al. | |
| 5,997,401 | A | | 12/1999 | Crawford | |
| 6,004,207 | A | | 12/1999 | Wilson, Jr. et al. | |
| 6,015,346 | A | | 1/2000 | Bennett | |
| 6,019,369 | A | | 2/2000 | Nakagawa et al. | |
| 6,033,307 | A | | 3/2000 | Vancura | |
| 6,050,895 | A | * | 4/2000 | Luciano et al. | 463/7 |
| 6,056,642 | A | | 5/2000 | Bennett | |
| 6,059,289 | A | | 5/2000 | Vancura | |
| 6,059,658 | A | | 5/2000 | Mangano et al. | |
| 6,062,980 | A | | 5/2000 | Luciano | |
| 6,089,976 | A | | 7/2000 | Schneider et al. | |
| 6,089,977 | A | | 7/2000 | Bennett | |
| 6,089,978 | A | | 7/2000 | Adams | |
| 6,093,102 | A | | 7/2000 | Bennett | |
| 6,102,798 | A | | 8/2000 | Bennett | |
| 6,120,031 | A | | 9/2000 | Adams | |
| 6,126,541 | A | | 10/2000 | Fuchs | |
| 6,126,542 | A | | 10/2000 | Fier | |
| 6,142,873 | A | | 11/2000 | Weiss et al. | |
| 6,142,874 | A | | 11/2000 | Kodachi et al. | |
| 6,142,875 | A | | 11/2000 | Kodachi et al. | |
| 6,146,273 | A | | 11/2000 | Olsen | |
| 6,159,095 | A | | 12/2000 | Frohm et al. | |
| 6,159,096 | A | | 12/2000 | Yoseloff | |
| 6,159,097 | A | | 12/2000 | Gura | |
| 6,159,098 | A | | 12/2000 | Slomiany et al. | |
| 6,162,121 | A | | 12/2000 | Morro et al. | |
| 6,168,520 | B1 | | 1/2001 | Baerlocher et al. | |
| 6,168,523 | B1 | | 1/2001 | Piechowiak et al. | |
| 6,173,955 | B1 | | 1/2001 | Perrie et al. | |
| 6,174,233 | B1 | | 1/2001 | Sunaga et al. | |
| 6,174,235 | B1 | | 1/2001 | Walker et al. | |
| 6,190,254 | B1 | | 2/2001 | Bennett | |
| 6,190,255 | B1 | | 2/2001 | Thomas et al. | |
| 6,203,429 | B1 | | 3/2001 | Demar et al. | |
| 6,210,279 | B1 | | 4/2001 | Dickinson | |
| 6,213,876 | B1 | | 4/2001 | Moore, Jr. | |
| 6,224,483 | B1 | | 5/2001 | Mayeroff | |
| 6,231,442 | B1 | | 5/2001 | Mayeroff | |
| 6,231,445 | B1 | | 5/2001 | Acres | |
| 6,237,913 | B1 | | 5/2001 | Kamille | |
| 6,261,177 | B1 | | 7/2001 | Bennett | |
| 6,302,790 | B1 | | 10/2001 | Brossard | |
| 6,305,686 | B1 | | 10/2001 | Perrie et al. | |
| 6,309,300 | B1 | | 10/2001 | Glavich | |
| 6,315,660 | B1 | | 11/2001 | DeMar et al. | |
| 6,328,649 | B1 | | 12/2001 | Randall et al. | |
| 6,375,187 | B1 | | 4/2002 | Baerlocher | |
| 6,494,785 | B1 | | 12/2002 | Gerrard et al. | |
| 6,506,118 | B1 | | 1/2003 | Baerlocher et al. | |
| 6,514,141 | B1 | | 2/2003 | Kaminkow et al. | |
| 6,569,015 | B1 | | 5/2003 | Baerlocher et al. | |
| 6,599,192 | B1 | | 7/2003 | Baerlocher et al. | |
| 6,632,141 | B2 | | 10/2003 | Webb et al. | |
| 6,648,754 | B2 | | 11/2003 | Baerlocher et al. | |
| 6,692,355 | B2 | | 2/2004 | Baerlocher et al. | |
| 6,719,632 | B2 | | 4/2004 | Palmer et al. | |
| 6,722,981 | B2 | | 4/2004 | Kaminkow et al. | |
| 6,722,982 | B2 | | 4/2004 | Kaminkow et al. | |
| 6,758,750 | B2 | | 7/2004 | Baerlocher et al. | |
| 6,786,820 | B2 | | 9/2004 | Gerrard et al. | |
| 6,793,579 | B2 | | 9/2004 | Baerlocher et al. | |
| 6,796,905 | B2 | | 9/2004 | Baerlocher et al. | |
| 6,808,452 | B2 | | 10/2004 | Baerlocher et al. | |
| 6,808,454 | B2 | | 10/2004 | Gerrard et al. | |
| 6,811,483 | B1 | | 11/2004 | Webb et al. | |
| 6,852,030 | B2 | | 2/2005 | Baerlocher et al. | |
| 6,890,257 | B2 | | 5/2005 | Baerlocher | |
| 6,899,623 | B2 | | 5/2005 | Baerlocher | |
| 6,942,566 | B2 | | 9/2005 | Baerlocher et al. | |
| 6,942,567 | B2 | | 9/2005 | Baerlocher et al. | |
| 6,960,132 | B2 | | 11/2005 | Baerlocher et al. | |
| 6,966,833 | B2 | | 11/2005 | Kaminkow et al. | |
| 6,971,953 | B2 | | 12/2005 | Gerrard et al. | |
| 7,001,273 | B2 | | 2/2006 | Baerlocher | |
| 2003/0008703 | A1 | | 1/2003 | Gauselmann | |
| 2003/0040360 | A1 | | 2/2003 | Kaminkow | |
| 2003/0064766 | A1 | | 4/2003 | Gauselmann | |
| 2003/0078093 | A1 | | 4/2003 | Simms et al. | |
| 2003/0162584 | A1 | | 8/2003 | Hughs-Baird et al. | |
| 2003/0181237 | A1 | | 9/2003 | Olive | |
| 2004/0023707 | A1 | | 2/2004 | Maya et al. | |
| 2004/0038729 | A1 | | 2/2004 | Webb et al. | |
| 2004/0106444 | A1 | | 6/2004 | Cuddy et al. | |
| 2004/0162128 | A1 | | 8/2004 | Baerlocher et al. | |
| 2004/0180710 | A1 | | 9/2004 | Palmer et al. | |
| 2004/0185928 | A1 | | 9/2004 | Baerlocher et al. | |
| 2004/0214632 | A1 | | 10/2004 | Cuddy et al. | |
| 2005/0020346 | A1 | | 1/2005 | Baerlocher | |
| 2005/0032567 | A1 | | 2/2005 | Baerlocher et al. | |
| 2005/0037829 | A1 | | 2/2005 | Baerlocher et al. | |
| 2005/0054429 | A1 | | 3/2005 | Baerlocher et al. | |
| 2005/0059476 | A1 | | 3/2005 | Vancura | |
| 2005/0101375 | A1 | | 5/2005 | Webb et al. | |
| 2005/0116410 | A1 | | 6/2005 | Vlanzy et al. | |
| 2005/0130729 | A1 | | 6/2005 | Baerlocher et al. | |
| 2005/0159205 | A1 | | 7/2005 | Kukita | |
| 2005/0187010 | A1 | | 8/2005 | Baerlocher | |
| 2005/0266914 | A1 | | 12/2005 | Baerlocher et al. | |
| 2006/0003837 | A1 | | 1/2006 | Baerlocher et al. | |

FOREIGN PATENT DOCUMENTS

| | | | | |
|---|---|---|---|---|
| EP | 0926645 | A2 | | 6/1999 |
| EP | 0944030 | A2 | | 9/1999 |
| EP | 0945837 | A2 | | 9/1999 |
| EP | 0981119 | A2 | | 2/2000 |
| EP | 0984408 | A2 | | 3/2000 |
| EP | 0984409 | A2 | | 3/2000 |
| GB | 2 147 442 | A | | 5/1985 |
| GB | 2 225 889 | | | 6/1990 |
| GB | 2 191 030 | | | 12/1997 |
| GB | 2 333 880 | | | 8/1999 |
| GB | 2353128 | A | * | 2/2001 |
| GB | 2 385 701 | A | | 8/2003 |
| GB | 2 387 010 | A | | 10/2003 |

| | | |
|---|---|---|
| WO | WO 96/35491 | 11/1996 |
| WO | WO 9732285 | 9/1997 |
| WO | WO 00/12186 | 3/2000 |

OTHER PUBLICATIONS

Adders and Ladders Advertisement written by Barcrest Ltd., published prior to 2000.
American Thunder Screen Shots written by IGT, published in 1998.
Big Bang Piggy Bankin Advertisement written by WMS Gaming, Inc., published prior to 2000.
Blackjack/Twenty-One Description written by Hoyle's Rules of Games, published in 1993.
Bonus Spin Red, White & Blue Advertisement written by IGT, published in 2000.
Bonus Times Article written by Strictly Slots, published in 2000.
By George written by IGT, published in 2002.
Caribbean Gold II Advertisement written by Aristocrat Incorporated, published in 1998.
Cash Box Advertisement & Article written by Anchor Games, Strictly Slots, published in 2000.
Chutes & Ladders Game Instructions written by Hasbro-Milton Bradley, published in 1999.
Description of Let's Make a Deal Television Show written by letsmakeadeal.com (2 pages), printed on Mar. 16, 2001.
Double Diamond Game Descriptions written by IGT printed on Mar. 21, 2001.
Double Up Poker Game Description written by IGT Undated.
Easy Street Advertisements and Articles written by Casino Data Systems, published in 2000.
Elvis Advertisement written by IGT, published in 1999.
Empire Game Advertisement written by AC Coin, published in 1996.
Fire and Fortune Article written by Strictly Slots, published in 2001.
Fox "N" Hound Advertisement written by IGT, published in 2000.
In Between Game Description written by IGT, available prior to 2000.
Jackpot Party Advertisements and Articles written by WMS Gaming, Inc., published in 1998.
Keep Your Hat On Advertisement written by Aristocrat, published in 2001.
Let's Make a Deal written by geocities.com (10 pages), printed on Mar. 21, 2001.
Let's Make a Deal written by fortunecity.com (4 pages), printed on Mar. 21, 2001.
Let's Make a Deal written by Illinoislottery.com (1 page), printed on Mar. 21, 2001.
Let's Make a Deal geocities.com (2 pages), printed on Mar. 16, 2001.
Let's Make A Deal Advertisement written by Shuffle Master and IGT, published in 2001.
Let's Make a Deal Game Advertisement written by Bally Gaming Systems, published in 1999.
Little Green Men Advertisement and Article written by IGT, Strictly Slots, published in 2000.
MegaJackpots Advertisement written by IGT, published in 1998.
Money Grab Article written by Strictly Slots, published in Apr. 2001.
Money in the Bank Advertisement written by Strictly Slots Konami, published in 2001.
Monopoly Advertisements and Articles written by WMS Gaming, Inc., Strictly Slots, published in 1998, 1999, 2000.
Monopoly Party Train Article written by Strictly Slots, published in 2002.
Neon Nights written by IGT, published in 2000.
On the Money Article written by Strictly Slots, Casino Data Systems, published in Dec. 2000.
Polly & Roger Advertisement written by VLC, Inc., published in 2000.
Price is Right "Cliff Hangers" Description written by www.geocities.com; members.aol.com (web site), printed Mar. 21, 2001.
Price is Right "Showcases" Description written by schuminweb.com (web site), printed Mar. 16, 2001.
Psycho Cash Beast Club (including knockouts) written by Barcrest, published prior to 1998.
Richard Petty Advertisement written by IGT, published in 2000.
South Park—Dodgeball Advertisement written by IGT, published in 2000.
Spell Binder Advertisement written by IGT, published in 2000.
Sphinx Advertisement written by Atronic Casino Technology, Ltd., published in 1997.
Take Your Pick Article written by Strictly Slots, published in Mar. 2001.
Take Your Pick Advertisement written by IGT/Anchor Gaming, published in 1999.
Texas Tea Advertisement written by IGT, published in 2000.
The Deals of Let's Make a Deal written by fortunecity.com (2 pages), printed on Mar. 16, 2001.
The Official Let's Make a Deal Website written by Bally Gaming System Website, printed on Mar. 16, 2001.
Top Cat Advertisement written by WMS Gaming, Inc., published prior to 2000.
Top Dollar Game Advertisement written by IGT, published in 1998.
Totem Pole Advertisement written by IGT, published in 1997.
Treasure Wheel/Treasure Tunnel Advertisement written by Sigma Game, Inc., published prior to 2000.
Wheel of Fortune Advertisement written by IGT, published in 1998.
Wheel of Fortune Advertisement written by IGT, published in 1999.
Wheel Poker Article written by Strictly Slots (Anchor Games), published in Nov. 2000.
Winning Streak Web Site Description written by WMS Gaming Inc. (web site), printed on Mar. 21, 2001.
X Factor Advertisement and Website Page written by WMS Gaming, Inc., published in 1998.

* cited by examiner

| Number | Credits |
|---|---|
| 1 | 500 |
| 2 | 200 |
| 3 | 100 |
| 4 | 90 |
| 5 | 80 |
| 6 | 70 |
| 7 | 60 |
| 8 | 50 |
| 9 | 40 |
| 10 | 35 |
| 11 | 30 |
| 12 | 25 |
| 13 | 20 |
| 14 | 15 |
| 15 | 12 |
| 16 | 10 |
| 17 | 9 |
| 18 | 8 |
| 19 | 7 |
| 20 | 6 |
| 21 | 5 |
| 22 | 4 |
| 23 | 3 |
| 24 | 2 |
| 25 | 1 |

| Number | Credits |
|---|---|
| 1 | 500 |
| 2 | 200 |
| 3 | 100 |
| 4 | 90 |
| 5 | 80 |
| 6 | 70 |
| 7 | 60 |
| 8 | 50 |
| 9 | 40 |
| 10 | 35 |
| 11 | 30 |
| 12 | 25 |
| 13 | 20 |
| 14 | 15 |
| 15 | 12 |
| 16 | 10 |
| 17 | 9 |
| 18 | 8 |
| 19 | 7 |
| 20 | 6 |
| 21 | 5 |
| 22 | 4 |
| 23 | 3 |
| 24 | 2 |
| 25 | 1 |

| Number | Credits |
|---|---|
| 1 | 500 |
| 2 | 200 |
| 3 | 100 |
| 4 | 90 |
| 5 | 80 |
| 6 | 70 |
| 7 | 60 |
| 8 | 50 |
| 9 | 40 |
| 10 | 35 |
| 11 | 30 |
| 12 | 25 |
| 13 | 20 |
| 14 | 15 |
| 15 | 12 |
| 16 | 10 |
| 17 | 9 |
| 18 | 8 |
| 19 | 7 |
| 20 | 6 |
| 21 | 5 |
| 22 | 4 |
| 23 | 3 |
| 24 | 2 |
| 25 | 1 |

| Number | Credits |
|---|---|
| 1 | 500 |
| 2 | 200 |
| 3 | 100 |
| 4 | 90 |
| 5 | 80 |
| 6 | 70 |
| 7 | 60 |
| 8 | 50 |
| 9 | 40 |
| 10 | 35 |
| 11 | 30 |
| 12 | 25 |
| 13 | 20 |
| 14 | 15 |
| 15 | 12 |
| 16 | 10 |
| 17 | 9 |
| 18 | 8 |
| 19 | 7 |
| 20 | 6 |
| 21 | 5 |
| 22 | 4 |
| 23 | 3 |
| 24 | 2 |
| 25 | 1 |

GAMING DEVICE HAVING MULTIPLE ROUND BONUS SCHEME WITH RESIDUAL AWARDS

PRIORITY CLAIM

This is a continuation-in-part of application Ser. No. 09/682,428, filed Aug. 31, 2001 now U.S. Pat. No. 6,719,632.

CROSS-REFERENCE TO RELATED APPLICATIONS

This application is related to the following commonly-owned co-pending patent applications: "GAMING DEVICE HAVING SEPARATELY CHANGEABLE VALUE AND MODIFIER BONUS SCHEME," Ser. No. 09/626,045, "GAMING DEVICE HAVING A BONUS ROUND WITH MULTIPLE RANDOM AWARD GENERATION AND MULTIPLE RETURN/RISK SCENARIOS," Ser. No. 09/678,989, "GAMING DEVICE HAVING AN AWARD EXCHANGE BONUS ROUND AND METHOD FOR REVEALING AWARD EXCHANGE POSSIBILITIES," Ser. No. 09/689,510, "GAMING DEVICE HAVING GRADUATING AWARD EXCHANGE SEQUENCE WITH A TEASE CONSOLATION SEQUENCE AND AN INITIAL QUALIFYING SEQUENCE," Ser. No. 09/680,601, "GAMING DEVICE HAVING A DESTINATION PURSUIT BONUS SCHEME WITH ADVANCED AND SETBACK CONDITIONS," Ser. No. 09/686,409, "GAMING DEVICE HAVING VALUE SELECTION BONUS," Ser. No. 09/684,605, "GAMING DEVICE HAVING RISK EVALUATION BONUS ROUND," Ser. No. 09/688,434, "GAMING DEVICE HAVING AN IMPROVED OFFER/ACCEPTANCE BONUS SCHEME," Ser. No. 09/966,884, "GAMING DEVICE HAVING IMPROVED OFFER AND ACCEPTANCE BONUS SCHEME," Ser. No. 09/680,630, "GAMING DEVICE HAVING IMPROVED AWARD OFFER BONUS SCHEME," Ser. No. 09/682,368, "GAMING DEVICE HAVING OFFER AND ACCEPTANCE GAME WITH HIDDEN OFFER," Ser. No. 10/160,688, "GAMING DEVICE HAVING OFFER ACCEPTANCE GAME WITH TERMINATION LIMIT," Ser. No. 09/822,711, "GAMING DEVICE HAVING OFFER/ACCEPTANCE ADVANCE THRESHOLD AND LIMIT BONUS SCHEME," Ser. No. 09/838,014, "GAMING DEVICE HAVING IMPROVED OFFER AND ACCEPTANCE GAME WITH MASKED OFFERS," Ser. No. 10/086,014, "GAMING DEVICE HAVING AN OFFER AND ACCEPTANCE SELECTION BONUS SCHEME WITH A TERMINATOR AND AN ANTI-TERMINATOR," Ser. No. 09/945,082, "GAMING DEVICE HAVING AN AWARD OFFER AND TERMINATION BONUS SCHEME," Ser. No. 09/682,428, "GAMING DEVICE HAVING AN OFFER AND ACCEPTANCE GAME WITH A PLAYER SELECTION FEATURE," Ser. No. 10/086,078, "GAMING DEVICE HAVING OFFER AND ACCEPTANCE GAME WITH A PLURALITY OF AWARD POOLS, A REVEAL FEATURE, AND A MODIFY FEATURE," Ser. No. 10/255,862, "GAMING DEVICE HAVING IMPROVED OFFER AND ACCEPTANCE BONUS SCHEME," Ser. No. 10/074,273, "GAMING DEVICE HAVING AN OFFER/ACCEPTANCE GAME WITH MULTI-OFFER SYMBOL," Ser. No. 10/245,387, "GAMING DEVICE HAVING AN OFFER/ACCEPTANCE GAME WHEREIN EACH OFFER IS BASED ON A PLURALITY OF INDEPENDENTLY GENERATED EVENTS," Ser. No. 10/244,134, "GAMING DEVICE HAVING A DESTINATION PURSUIT BONUS SCHEME WITH ADVANCED AND SETBACK CONDITIONS," Ser. No. 10/288,750, "GAMING DEVICE HAVING IMPROVED AWARD OFFER BONUS SCHEME," Ser. No. 10/290,800, "GAMING DEVICE HAVING VALUE SELECTION BONUS," Ser. No. 10/306,295, "GAMING DEVICE HAVING IMPROVED AWARD OFFER BONUS SCHEME," Ser. No. 10/318,752, "GAMING DEVICE HAVING VALUE SELECTION BONUS," Ser. No. 10/354,514.

COPYRIGHT NOTICE

A portion of the disclosure of this patent document contains or may contain material which is subject to copyright protection. The copyright owner has no objection to the photocopy reproduction by anyone of the patent document or the patent disclosure in exactly the form it appears in the Patent and Trademark Office patent file or records, but otherwise reserves all copyright rights whatsoever.

DESCRIPTION

The present invention relates in general to a gaming device, and more particularly to a gaming device having multiple round bonus scheme with residual awards.

BACKGROUND OF THE INVENTION

Gaming devices such as slot, poker, blackjack and keno machines having primary games and secondary or bonus games or schemes are well known. One well known bonus game provides a player with a series of different award offers consisting of credits or dollars. The player may accept or reject any individual award offer in the series, however, the player must accept the final award offer if no previous award offer is accepted. If the player accepts an award offer, the player keeps the award and the bonus game terminates. If the player rejects the award offer, the gaming device provides a new award offer for player acceptance. The bonus game continues to provide new award offers until an award offer is accepted or the award offer is the final award offer.

Several implementations of this type of bonus scheme have been employed in gaming machines of various types. While this type of gaming device has achieved significant popularity in the gaming industry, players may lose interest in the game after playing the game repeatedly. Accordingly, there is a need for new gaming devices having improved award offer bonus schemes.

SUMMARY OF THE INVENTION

The present invention provides a gaming device having an award offer and termination bonus scheme, wherein the player may improve an award offer during the bonus scheme. The bonus game enables the player to select an initial choice that either is the initial award offer or that the game uses to provide an initial award offer. The gaming device then enables the player to modify the initial award offer, creating a subsequent or modified award offer, which may be more or less than the initial award offer. The game repeats this process a predetermined number of times. In one embodiment, the game sequentially increases the likelihood of decreasing the player's award offer each time the player rejects an award offer.

In one embodiment, to modify the award offer, the player picks a masked selection from a plurality of masked selections. The picked selection yields a modifying value. The gaming device reveals the modifying value and determines a new award offer based on the modifying value.

In another embodiment of the present invention, the gaming device provides a plurality of offers associated with a plurality of positions. The gaming device further provides a plurality of position changes that modify the player's position and offer. Upon the initiation of the bonus scheme, the player obtains a position and an offer. The gaming device randomly selects a position change and the player's position and offer are modified by the selected position change. The selected position change is associated with a terminator. The gaming device enables the player to either accept the provided offer or enable the gaming device to select another position change in an attempt to modify the provided offer. The bonus scheme proceeds until the player accepts the provided offer or the gaming device randomly selects a position change with an associated terminator.

In another embodiment of the present invention, the gaming device further provides a bonus game having a plurality of rounds, each round including a plurality of picks by the player. Upon the initiation of each round, the player obtains a position and an award. Upon an input by the player, the gaming device randomly selects position moves and the player's position and award are modified by the selected position moves. If the player reaches the first or ultimate position associated with a maximum award without using all position move points and/or picks in a round, the gaming device enables the player to carry over any residual position change points and/or residual picks from one round to another round of the bonus game.

It is therefore an advantage of the present invention to provide a gaming device with a bonus game that has a plurality of rounds, wherein residual awards unused during a round can be carried over to another round of the bonus game.

It is a further advantage of the present invention to provide a gaming device with a bonus game that has a plurality of rounds, wherein residual picks unused during a round can be carried over to another round of the bonus game.

Other objects, features and advantages of the invention will be apparent from the following detailed disclosure, taken in conjunction with the accompanying sheets of drawings, wherein like numerals refer to like parts, elements, components, steps and processes.

DETAILED DESCRIPTION OF THE INVENTION

Gaming Device and Electronics

Figure 1A:
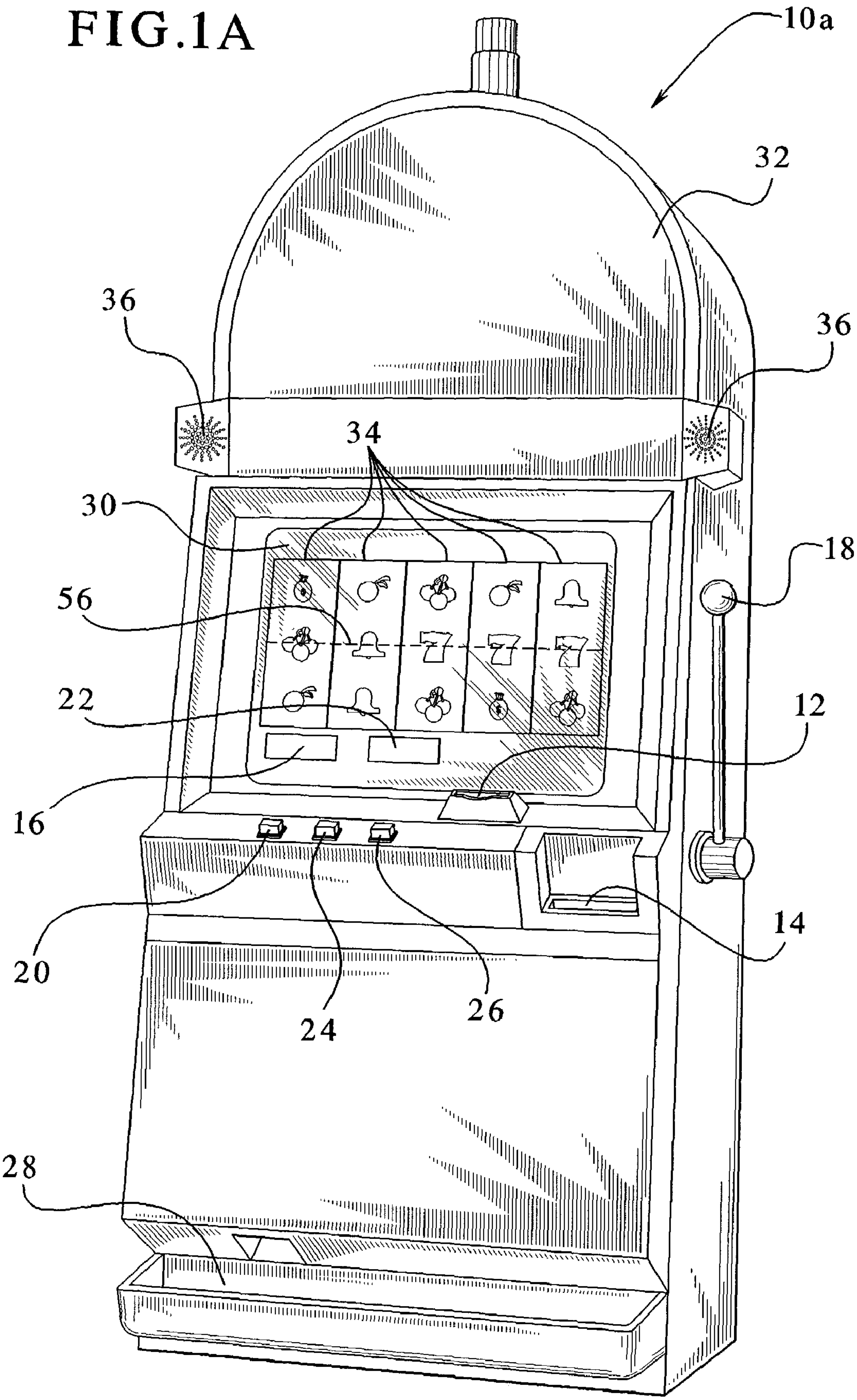
FIGS. 1A and 1B are perspective views of alternative embodiments of the gaming device of the present invention.
Figure 1B:
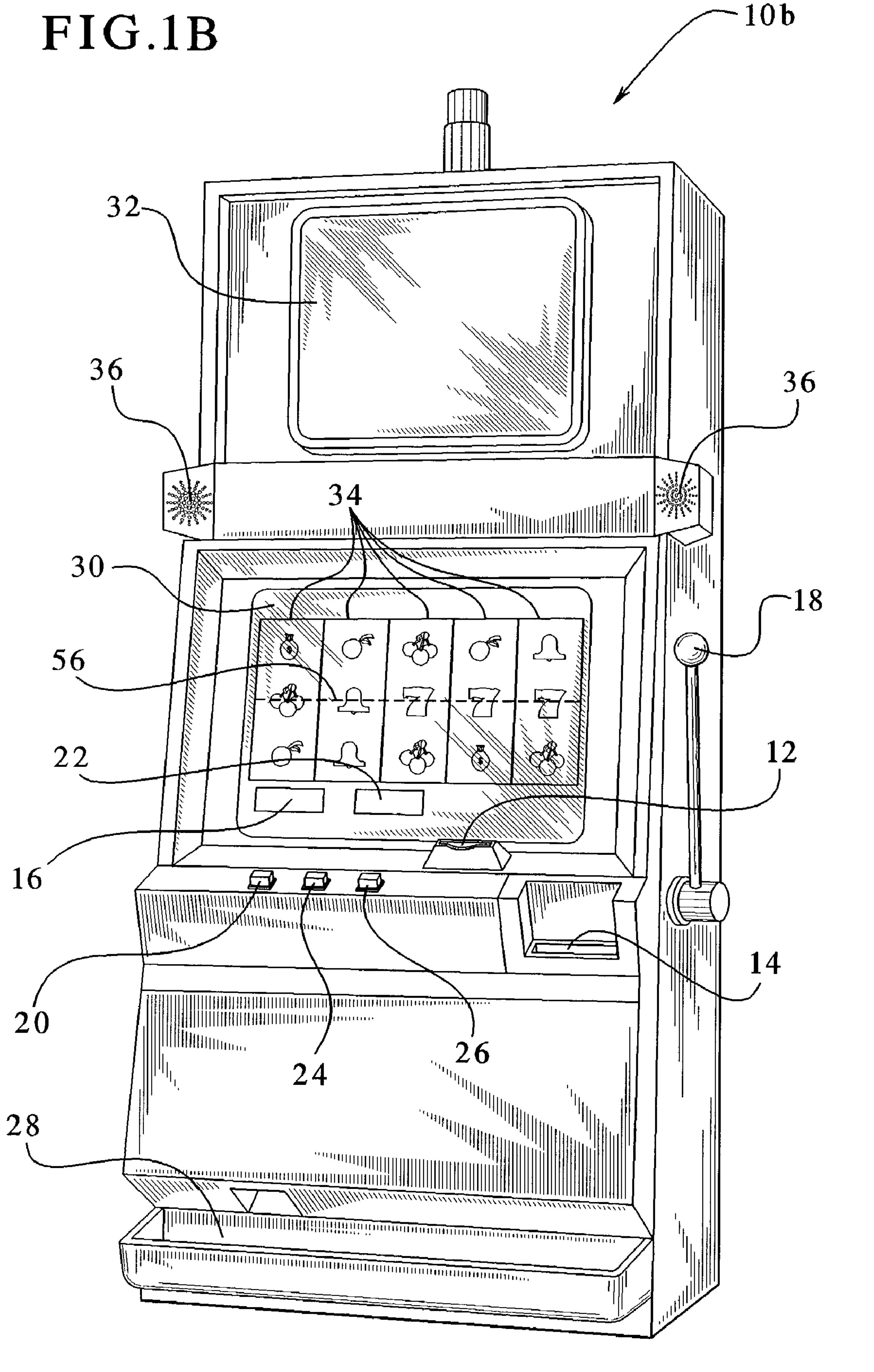

Referring now to the drawings, and in particular to FIGS. 1A and 1B, gaming device 10*a* and gaming device 10*b* illustrate two possible cabinet styles and display arrangements and are collectively referred to herein as gaming device 10. The present invention includes the game (described below) being a stand alone game or a bonus or secondary game that coordinates with a base game. When the game of the present invention is a bonus game, gaming device 10 in one base game is a slot machine having the controls, displays and features of a conventional slot machine, wherein the player operates the gaming device while standing or sitting. Gaming device 10 also includes being a pub-style or table-top game (not shown), which a player operates while sitting.

The base games of the gaming device 10 include slot, poker, blackjack or keno, among others. The gaming device 10 also embodies any bonus triggering events, bonus games as well as any progressive game coordinating with these base games. The symbols and indicia used for any of the base, bonus and progressive games include mechanical, electrical or video symbols and indicia.

In a stand alone or a bonus embodiment, the gaming device 10 includes monetary input devices. FIGS. 1A and 1B illustrate a coin slot 12 for coins or tokens and/or a payment acceptor 14 for cash money. The payment acceptor 14 also includes other devices for accepting payment, such as readers or validators for credit cards, debit cards or smart cards, tickets, notes, etc. When a player inserts money in gaming device 10, a number of credits corresponding to the amount deposited is shown in a credit display 16. After depositing the appropriate amount of money, a player can begin the game by pulling arm 18 or pushing play button 20. Play button 20 can be any play activator used by the player which starts any game or sequence of events in the gaming device.

As shown in FIGS. 1A and 1B, gaming device 10 also includes a bet display 22 and a bet one button 24. The player places a bet by pushing the bet one button 24. The player can increase the bet by one credit each time the player pushes the bet one button 24. When the player pushes the bet one button 24, the number of credits shown in the credit display 16 decreases by one, and the number of credits shown in the bet display 22 increases by one. A player may cash out by pushing a cash out button 26 to receive coins or tokens in the coin payout tray 28 or other forms of payment, such as an amount printed on a ticket or credited to a credit card, debit card or smart card. Well known ticket printing and card reading machines (not illustrated) are commercially available.

Gaming device 10 also includes one or more display devices. The embodiment shown in FIG. 1A includes a central display device 30, and the alternative embodiment shown in FIG. 1B includes a central display device 30 as well as an upper display device 32. The display devices display any visual representation or exhibition, including but not limited to movement of physical objects such as mechanical reels and wheels, dynamic lighting and video images. The display device includes any viewing surface such as glass, a video monitor or screen, a liquid crystal display or any other static or dynamic display mechanism. In a video poker, blackjack or other card gaming machine embodiment, the display device includes displaying one or more cards. In a keno embodiment, the display device includes displaying numbers.

The slot machine base game of gaming device 10 preferably displays a plurality of reels 34, preferably three to five reels 34, in mechanical or video form on one or more of the display devices. Each reel 34 displays a plurality of indicia such as bells, hearts, fruits, numbers, letters, bars or other images which preferably correspond to a theme associated with the gaming device 10. If the reels 34 are in video form, the display device displaying the video reels 34 is preferably a video monitor. Each base game, especially in the slot machine base game of the gaming device 10, includes speakers 36 for making sounds or playing music.

Figure 2:
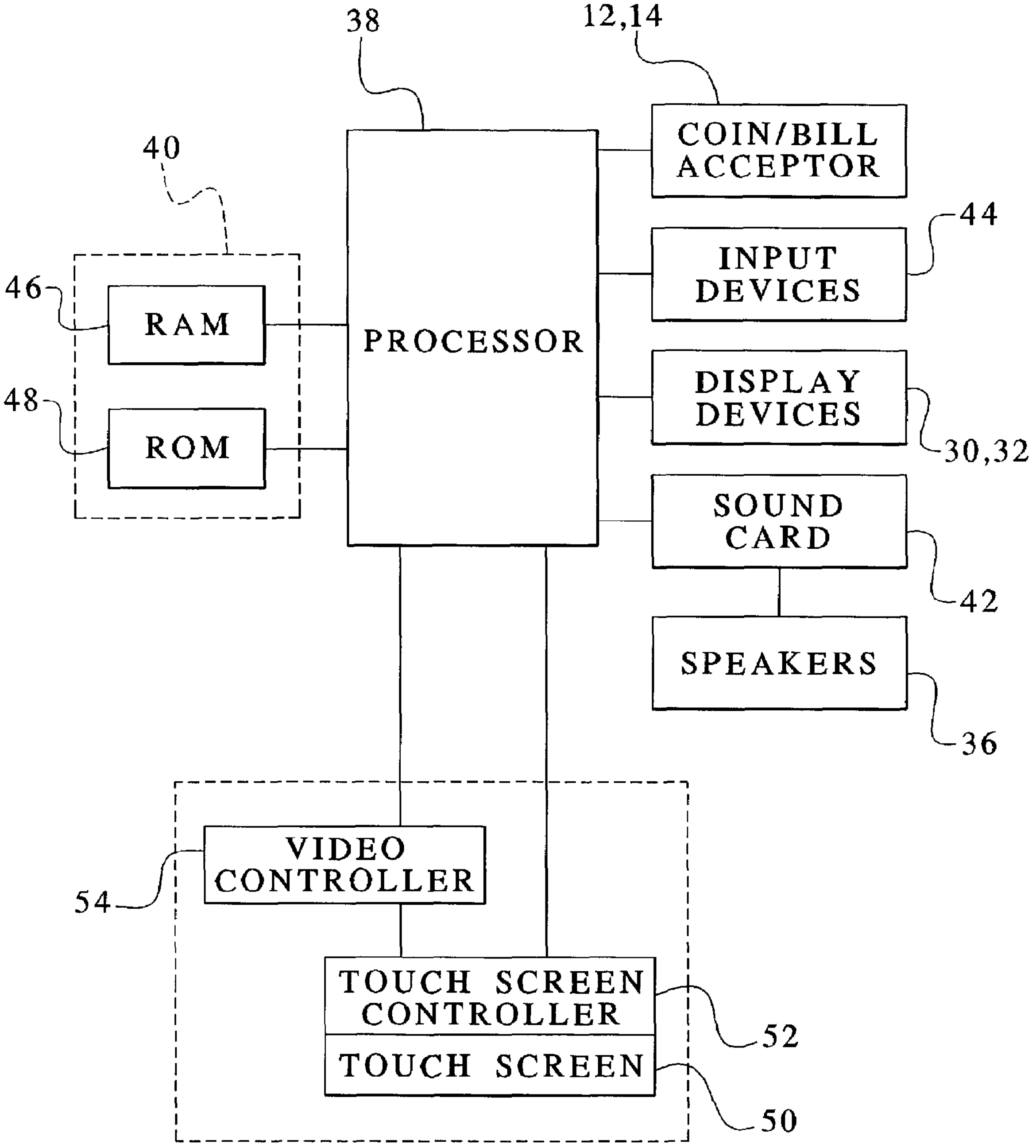
FIG. 2 is a schematic block diagram of the electronic configuration of one embodiment of the gaming device of the present invention.

Referring now to FIG. 2, a general electronic configuration of the gaming device 10 for the stand alone and bonus embodiments described above preferably includes: a processor 38; a memory device 40 for storing program code or other data; a central display device 30; an upper display device 32; a sound card 42; a plurality of speakers 36; and one or more input devices 44. The processor 38 is preferably a microprocessor or microcontroller-based platform which is capable of displaying images, symbols and other indicia such as images of people, characters, places, things and faces of cards. The memory device 40 includes random access memory (RAM) 46 for storing event data or other data generated or used during a particular game. The memory device 40 also includes read only memory (ROM) 48 for storing program code, which controls the gaming device 10 so that it plays a particular game in accordance with applicable game rules and pay tables.

As illustrated in FIG. 2, the player preferably uses the input devices 44 to input signals into gaming device 10. In the slot machine base game, the input devices 44 include the pull arm 18, play button 20, the bet one button 24 and the cash out button 26. A touch screen 50 and touch screen controller 52 are connected to a video controller 54 and processor 38. The terms "computer" or "controller" are used herein to refer collectively to the processor 38, the memory device 40, the sound card 42, the touch screen controller and the video controller 54.

In certain instances, it is preferable to use a touch screen 50 and an associated touch screen controller 52 instead of a conventional video monitor display device. The touch screen enables a player to input decisions into the gaming device 10 by sending a discrete signal based on the area of the touch screen 50 that the player touches or presses. As further illustrated in FIG. 2, the processor 38 connects to the coin slot 12 or payment acceptor 14, whereby the processor 38 requires a player to deposit a certain amount of money in to start the game.

It should be appreciated that although a processor 38 and memory device 40 are preferable implementations of the present invention, the present invention also includes being implemented via one or more application-specific integrated circuits (ASIC's), one or more hard-wired devices, or one or more mechanical devices (collectively or alternatively referred to herein as a "processor"). Furthermore, although the processor 38 and memory device 40 preferably reside in each gaming device 10 unit, the present invention includes providing some or all of their functions at a central location such as a network server for communication to a playing station such as over a local area network (LAN), wide area network (WAN), Internet connection, microwave link, and the like.

With reference to the slot machine base game of FIGS. 1A and 1B, to operate the gaming device 10, the player inserts the appropriate amount of tokens or money in the coin slot 12 or the payment acceptor 14 and then pulls the arm 18 or pushes the play button 20. The reels 34 then begin to spin. Eventually, the reels 34 come to a stop. As long as the player has credits remaining, the player can spin the reels 34 again. Depending upon where the reels 34 stop, the player may or may not win additional credits.

In addition to winning base game credits, the gaming device 10, including any of the base games disclosed above, also includes bonus games that give players the opportunity to win credits. The gaming device 10 preferably employs a video-based display device 30 or 32 for the bonus games. The bonus games include a program that automatically begins when the player achieves a qualifying condition in the base game.

In the slot machine embodiment, the qualifying condition includes a particular symbol or symbol combination generated on a display device. As illustrated in the five reel slot game shown in FIGS. 1A and 1B, the qualifying condition includes the number seven appearing on three adjacent reels 34 along a payline 56. It should be appreciated that the present invention includes one or more paylines, such as payline 56, wherein the paylines can be horizontal, diagonal or any combination thereof.

Offer Modification

Referring now to FIGS. 3A through 3J, one embodiment of the improved award offer bonus scheme of the present invention includes modifying such as by increasing or decreasing an existing offer by mathematically altering it, as discussed in more detail below. The gaming device includes a screen or display 100 which preferably includes a touch screen. The display and particularly the touch screen enables the player to select an award offer from a plurality of award offers. A plurality of masked selections 102, 104 and 106 are illustrated in FIGS. 3A through 3D. It should be appreciated that while three selections are illustrated, two or more selections are contemplated. Appropriate messages such as "MAKE A SELECTION" or "SELECT AN AWARD OFFER" are preferably provided to the player visually, or through suitable audio or audiovisual displays in conjunction with the plurality of selections.

Figure 3A:
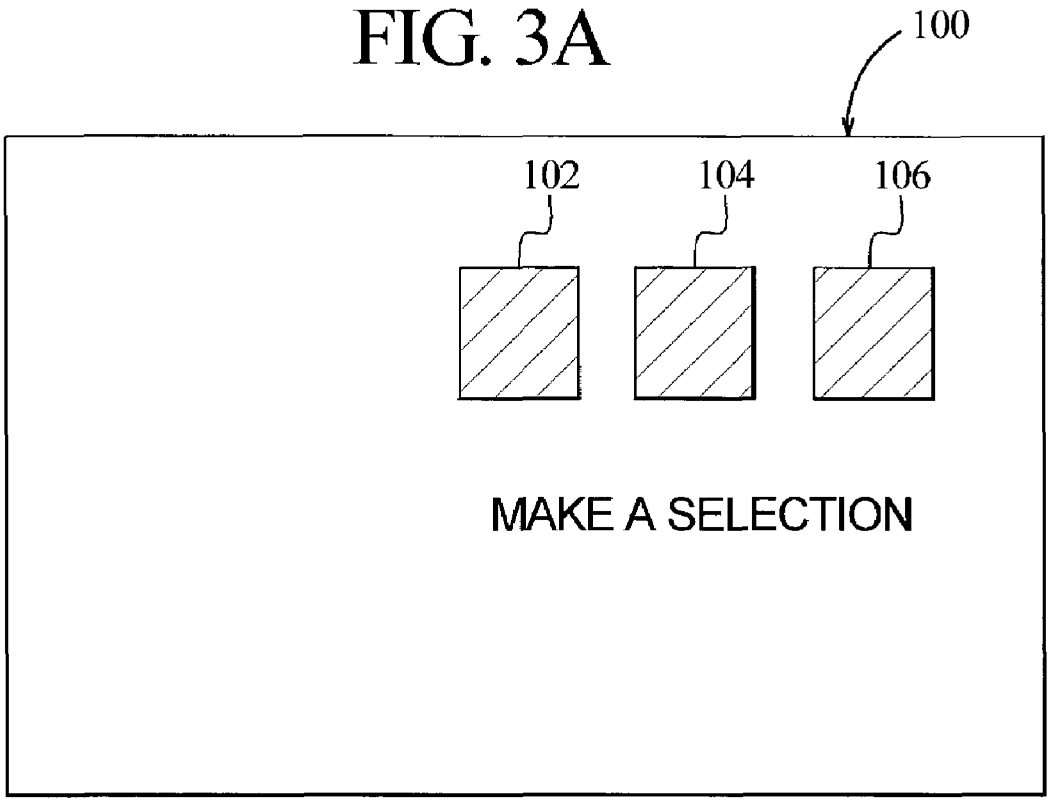
FIGS. 3A through 3D are front elevation views of the display of one embodiment of the improved award offer bonus scheme illustrating the selection of an initial offer from a plurality of offers.
Figure 3B:
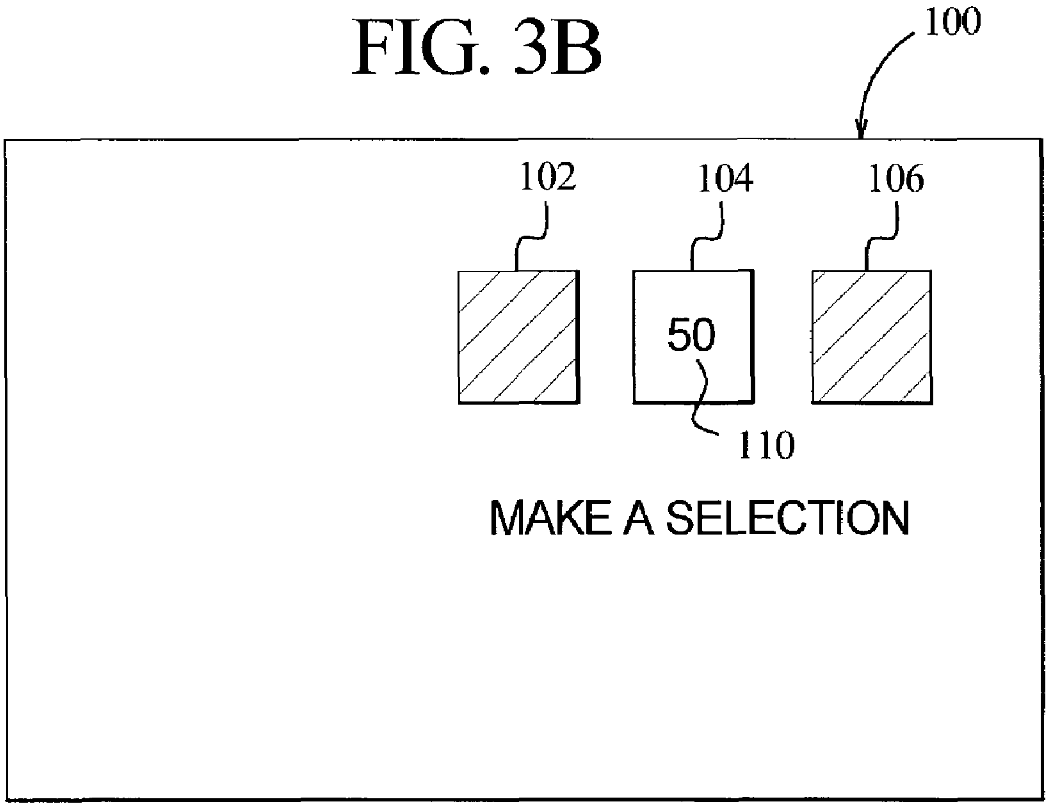
Figure 3C:
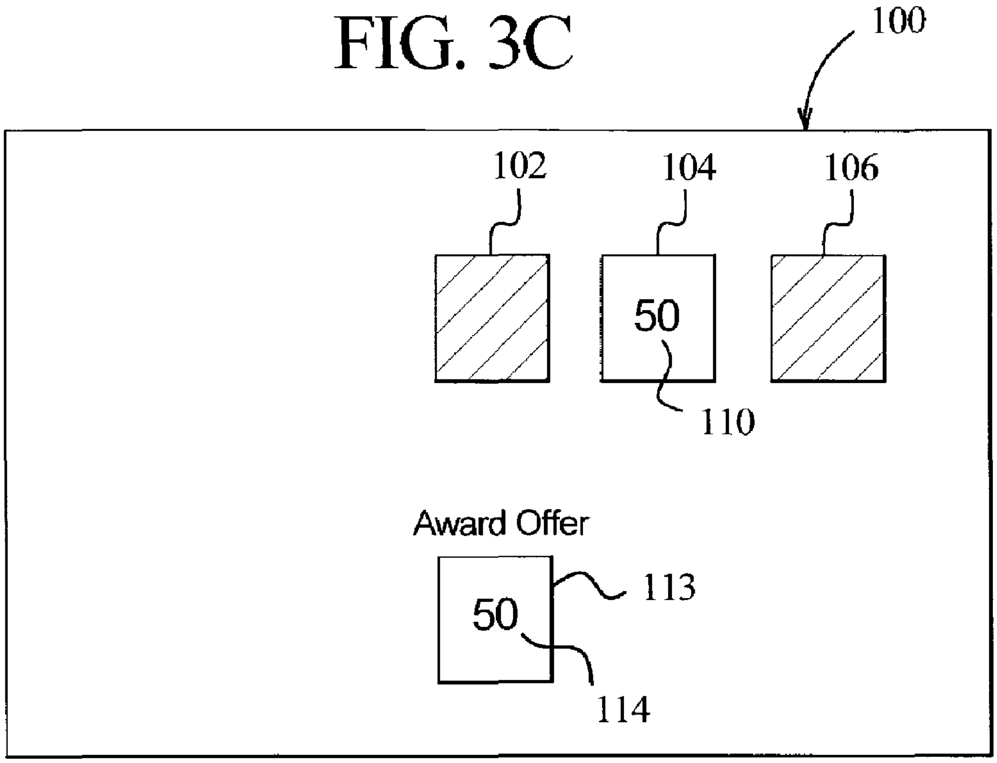
Figure 3D:
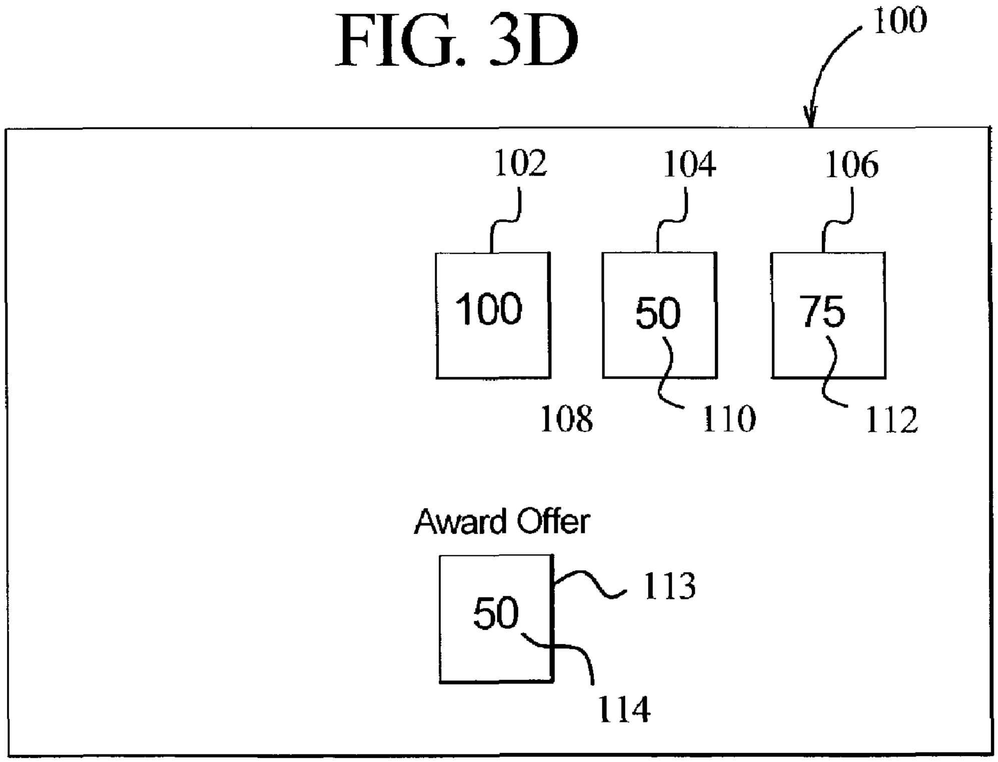
Figure 3E:
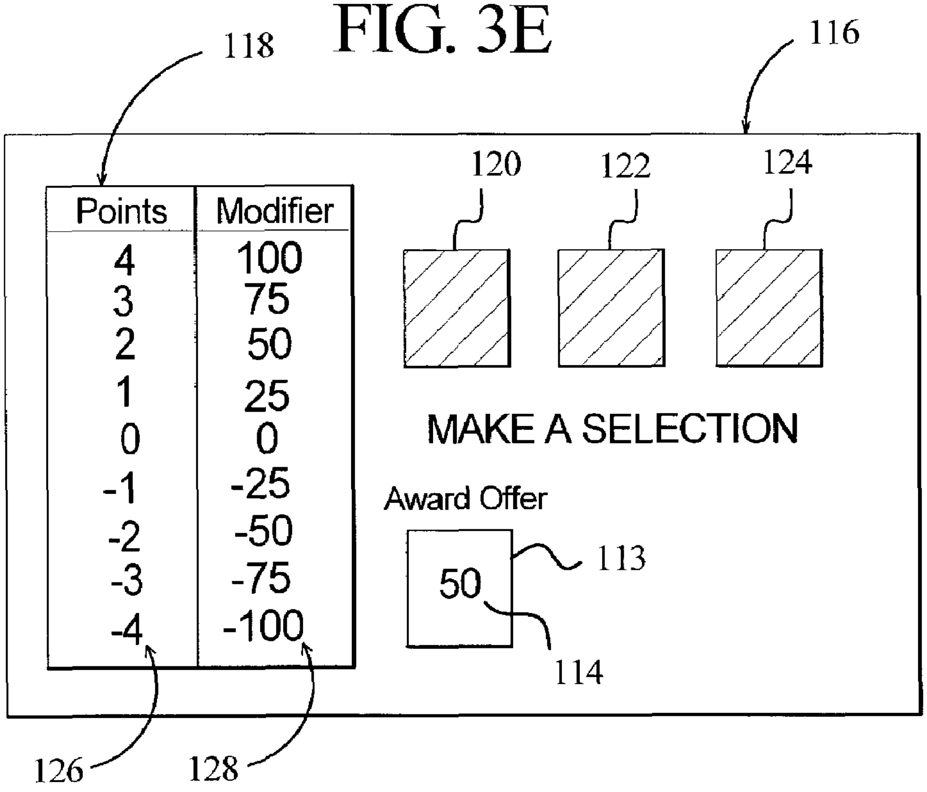
FIGS. 3E through 3J are front elevation views of the display of one embodiment of the improved award offer bonus scheme illustrating the modification of an existing offer.

The player picks one of the masked initial award offers or selections 102, 104 or 106, and the game provides or generates an initial award offer 108, 110 or 112, respectively. The gaming device also preferably reveals each of the available initial award offers 108, 110 and 112 associated with selections 102, 104 and 106, respectively, as illustrated in FIG. 3D, so that the player knows whether the player has made a good or bad selection. In one example, the player chooses the selection 104, and the game reveals the initial award offer 110 having a value of 50 credits as illustrated in FIGS. 3B and 3C. The gaming device preferably includes an award offer display 113, which displays the initial award offer 114 as illustrated in FIGS. 3C and 3D.

In one embodiment, the gaming device selects and distributes the plurality of masked initial award offers from a larger pool (not illustrated) of initial award offers available during the bonus game. The pool of initial award offers may, for example, include nine possible initial award offers ranging from +10 to +100 credits, although any size pool is contemplated by the present invention. The pool may alternatively include negative initial award offers. The gaming device preferably randomly selects the plurality of initial award offers from the pool of initial award offers (not illustrated) each time the bonus game is initiated. It is also contemplated that the gaming device may assign a weight factor or probability to each initial award offer in the pool such that award offers having higher weight factors or probabilities have a greater chance of being selected. This weight factor or probability may be consistent throughout the entire bonus game or change from play to play during the bonus game.

The bonus game as described above reveals or unmasks the remaining initial award offers 108 and 112 as illustrated in FIG. 3D. If the player would have chosen the selection 102, the player would have obtained the initial award offer 108 worth 100 credits, and if the player would have chosen the selection 106, the player would have obtained the initial award offer 112 worth 75 credits.

After establishing the initial award offer, the gaming device enables the player to modify the initial award offer and form a subsequent or new award offer. The subsequent or new award offer is based on or dependent on the initial award offer. It should be appreciated that the subsequent or new award offer may be of lesser, greater or equal value than the selected award offer, adding an element of risk to the bonus game. It should be appreciated that the initial award offer is preferably positive as discussed above.

Referring now to FIGS. 3E through 3J, after establishing an initial award offer, the gaming device provides the player with a second display 116. The second display 116 includes the initially selected award offer 114 in the award offer display 113, a value display 118 and a plurality of masked selections 120, 122 and 124. It should be appreciated that the number of masked selections may vary in accordance with the present invention.

The value display 118 includes a plurality of positions or points 126 or a ranking of positions or points and a plurality of associated offer modifiers 128. In this embodiment, the ranking of positions or points and modifiers or offer modifiers are displayed in a tabular format although other suitable displays are contemplated. Each position, point or number of points has an associated offer modifier. The offer modifier in one embodiment is measured in credits. The offer modifiers 128 are not new award offers. Rather, the gaming device uses the offer modifiers 128 to modify the initially selected award offer 114 (and subsequent award offers) to produce a new or modified award offer. The points 126 which the player chooses or obtains as described below, correspond to or determine which offer modifiers 128 the game uses to modify the award offer.

The player picks one of the masked selections 120, 122 or 124. The gaming device reveals and provides a number of points associated with the selection. The gaming device may select the points for this portion of the bonus game from a larger pool of points (not illustrated). The gaming device preferably randomly selects points from the pool and randomly assigns the points to each of the selections 120, 122 and 124. The point pools (not illustrated) may be weighted via a weight factor or probability associated with each point. The weight factor or probability may be consistent throughout the bonus game or vary from play to play in the bonus scheme.

Figure 3F:
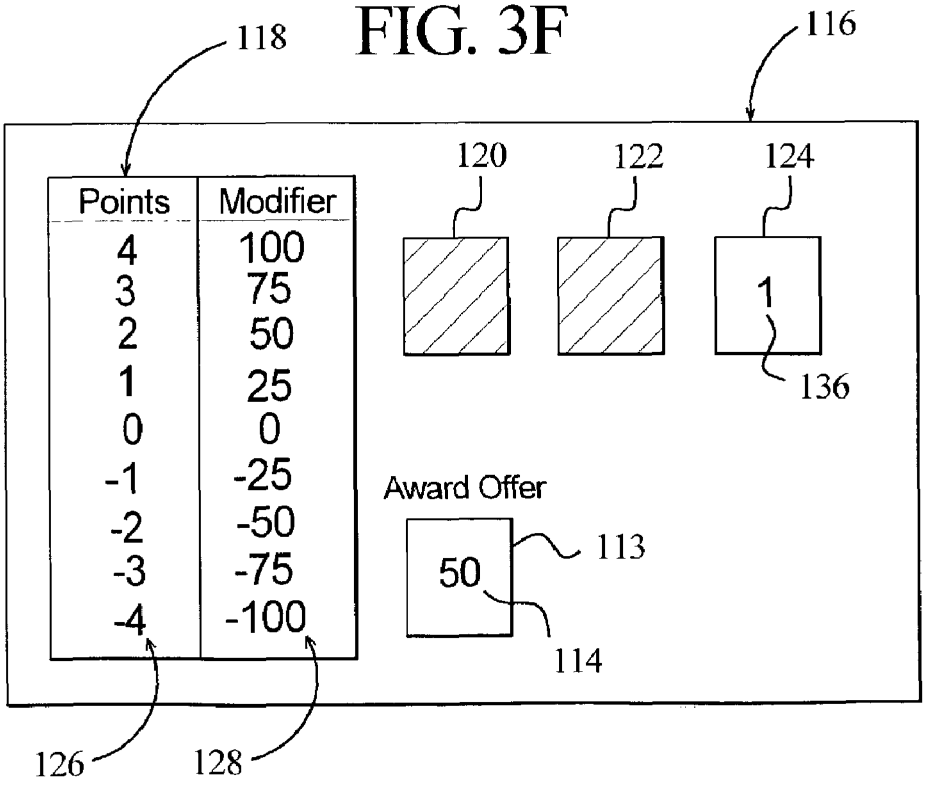
Figure 3G:
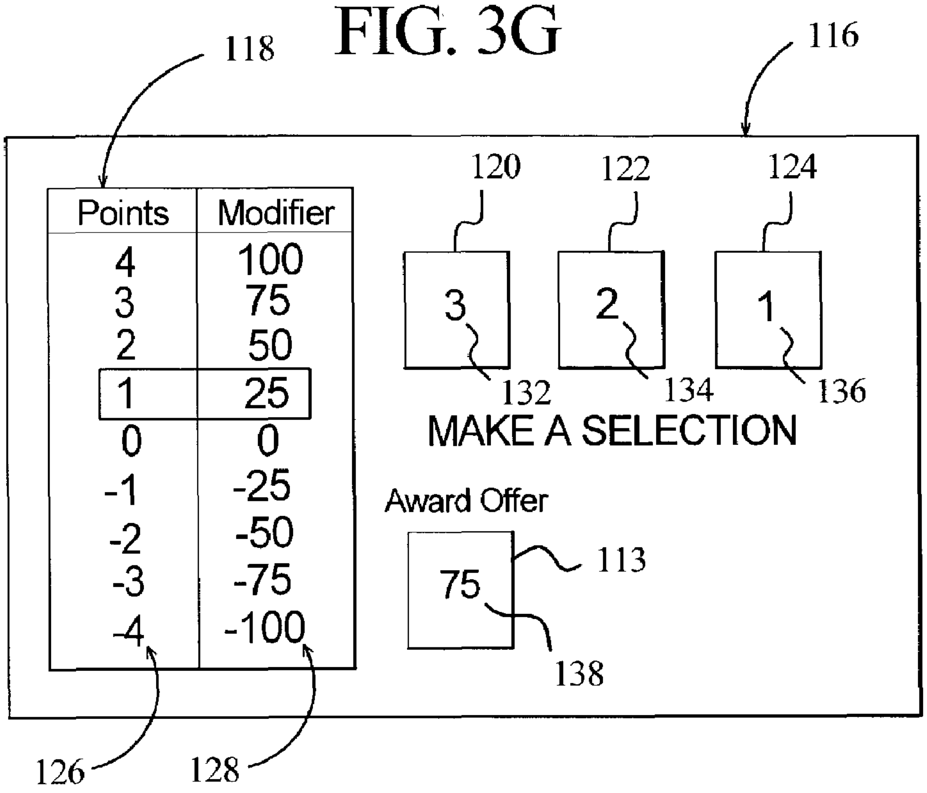

In one example, the player chooses selection 124, which reveals the point 136 having a value of "1" as illustrated in FIG. 3F. The gaming device preferably reveals or unmasks the remaining, non-chosen points 132 and 134 as illustrated in FIG. 3G. The gaming device also highlights or otherwise indicates the offer modifier associated with the selected point in the value display 118. In this embodiment, the value display 118 highlights the offer modifier of twenty-five, which is associated with the selected point value of "1" as illustrated in FIG. 3G.

Figure 3H:
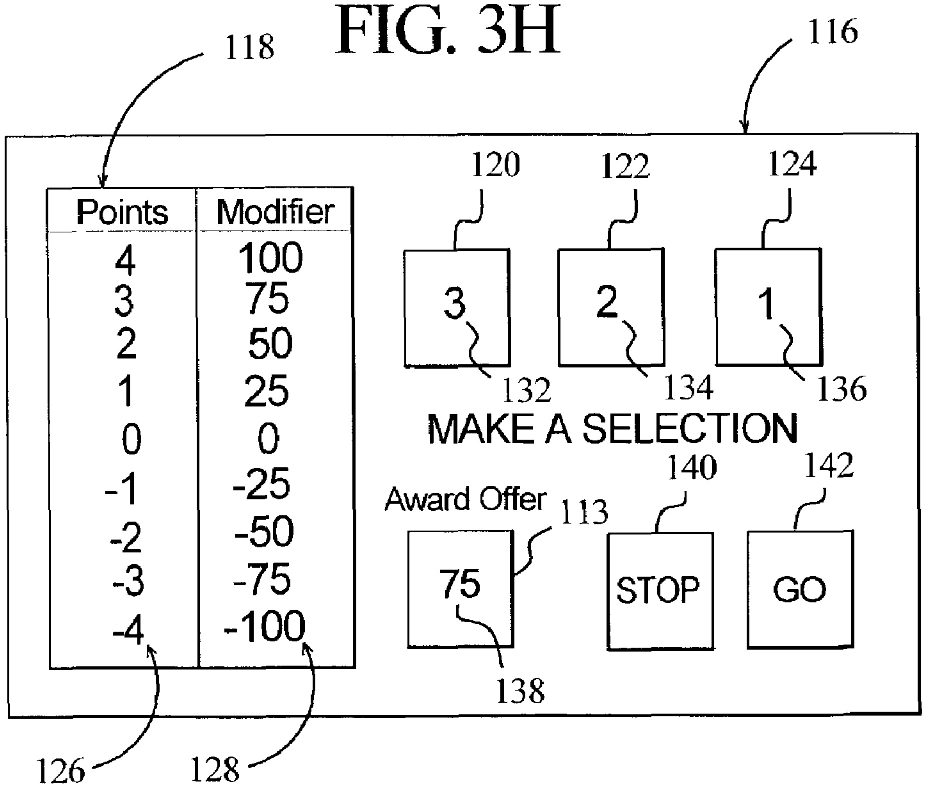

The gaming device modifies the award offer and specifically adds the designated offer modifier 128 of "25" to the initial or previous offer of "50." Another embodiment includes multiplying the modifier by the initial or previous offer. Other suitable mathematical operations or calculations may be performed or desired by the implementor. The addition of the modified offer 128 creates a modified or subsequent award offer 138 of 75 credits, which is displayed in the award offer display 113 as illustrated in FIGS. 3G and 3H.

The present invention includes enabling the player to accept the modified award offer 138 or reject it and continue to play the bonus game. FIG. 3H includes accept and reject indicators or buttons 140 and 142, respectively, enabling the player to register his or her decision. That is, the game enables the player to accept or reject an offer award after the first modified award offer. Another embodiment includes enabling the accept or reject function after the initial award offer, second or any subsequent modification. In the illustrated embodiment, the accept and reject buttons are labeled "STOP" and "GO."

Figure 3I:
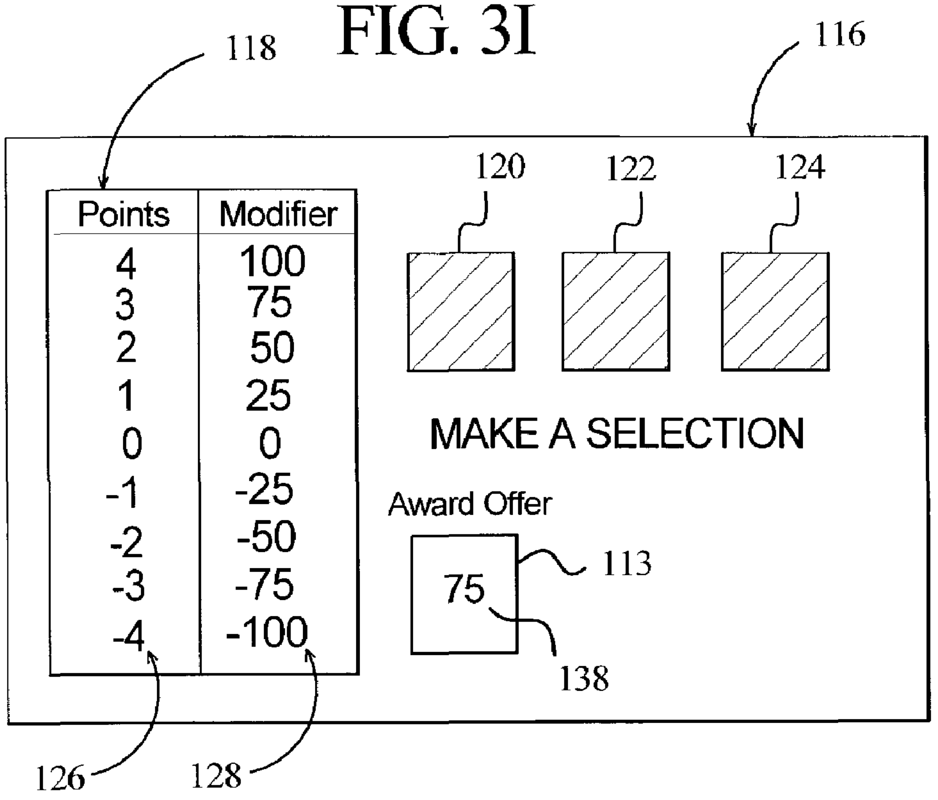
Figure 3J:
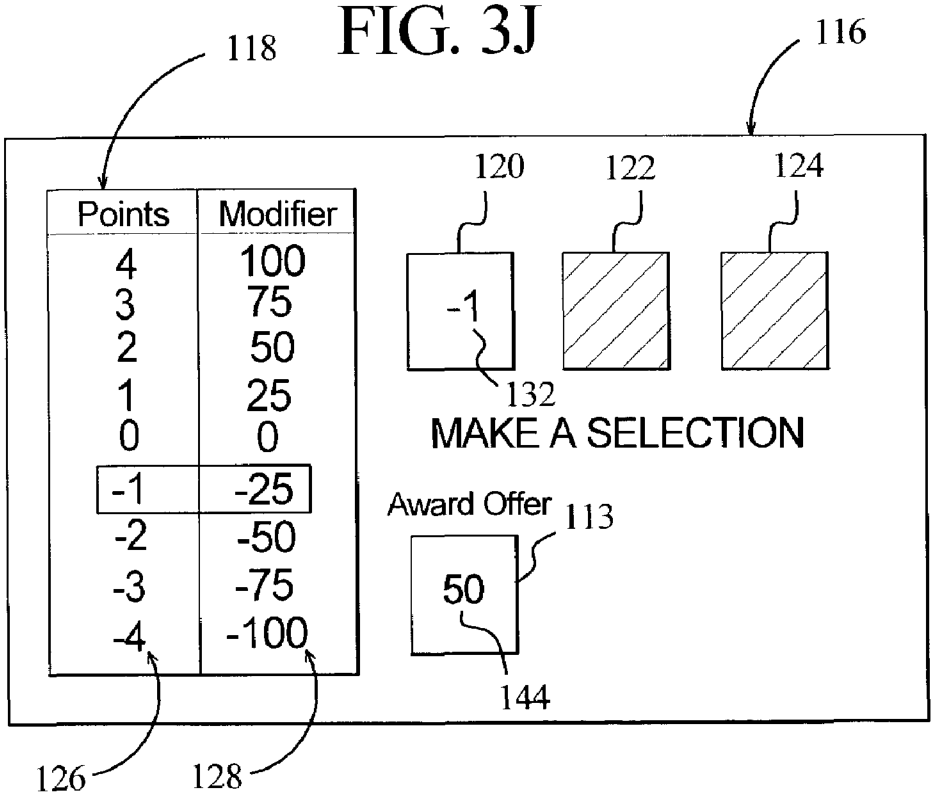

If the player accepts the subsequent award offer 138, the gaming device provides the player with the award offer and updates the player's total credits with the accepted or provided award offer. The gaming device preferably does not enable the player to obtain any more award offers and thereby terminates the bonus game. If the player rejects the modified award offer 138, thereby risking it for the chance at receiving a modified award offer of greater value, the gaming device enables the player to obtain a modified or subsequent award offer as illustrated in FIGS. 3I and 3J. The new or second subsequent award offer 144 is based on the immediately previous award offer 138 as illustrated in FIG. 3J, and a selected point 132 of "−1" which yields an offer modifier of "−25" credits, which decreases the previous award offer by 25 to award offer 144 of "50."

Thus, after the player rejects the first subsequent award offer 138, the gaming device enables the player to generate another offer modifier 128 in the same manner as described above. When the player selects a point 132 with a value of "−1", the game generates the offer modifier 128 of "−25" credits. The gaming device thereby reduces or modifies the player's previous award offer 138, resulting in a third award offer 144 of "50" credits as illustrated in FIG. 3J. The gaming device enables the player to accept this offer, terminating the bonus scheme, or continue as described previously. The game preferably ends after a predetermined number of award offers are rejected such as after three rejections or four total award offers made to the player.

In one preferred embodiment, the gaming device of the present invention further includes structuring the point pools such that later point distributions yield a greater chance of generating a negative number of points and thus credits for the player and generating a relatively high positive number of points and thus credits for the player. That is, the present invention includes later offers being potentially riskier and potentially yielding higher award offers.

Offer Replacement

Referring now to FIGS. 4A through 4L, another embodiment of the improved award offer bonus scheme of the present invention includes replacing award offers with related award offers. The award offers are related by an order of their values. The gaming device of this embodiment enables the player to individually select an initial award offer, similar to the above embodiment, from a plurality of masked award offer selections and thereafter receive a new or replaced award offer, which is based on the initial award offer. The replaced award offer may be greater than, less than or equal to the value of the previous award offer.

Figure 4A:
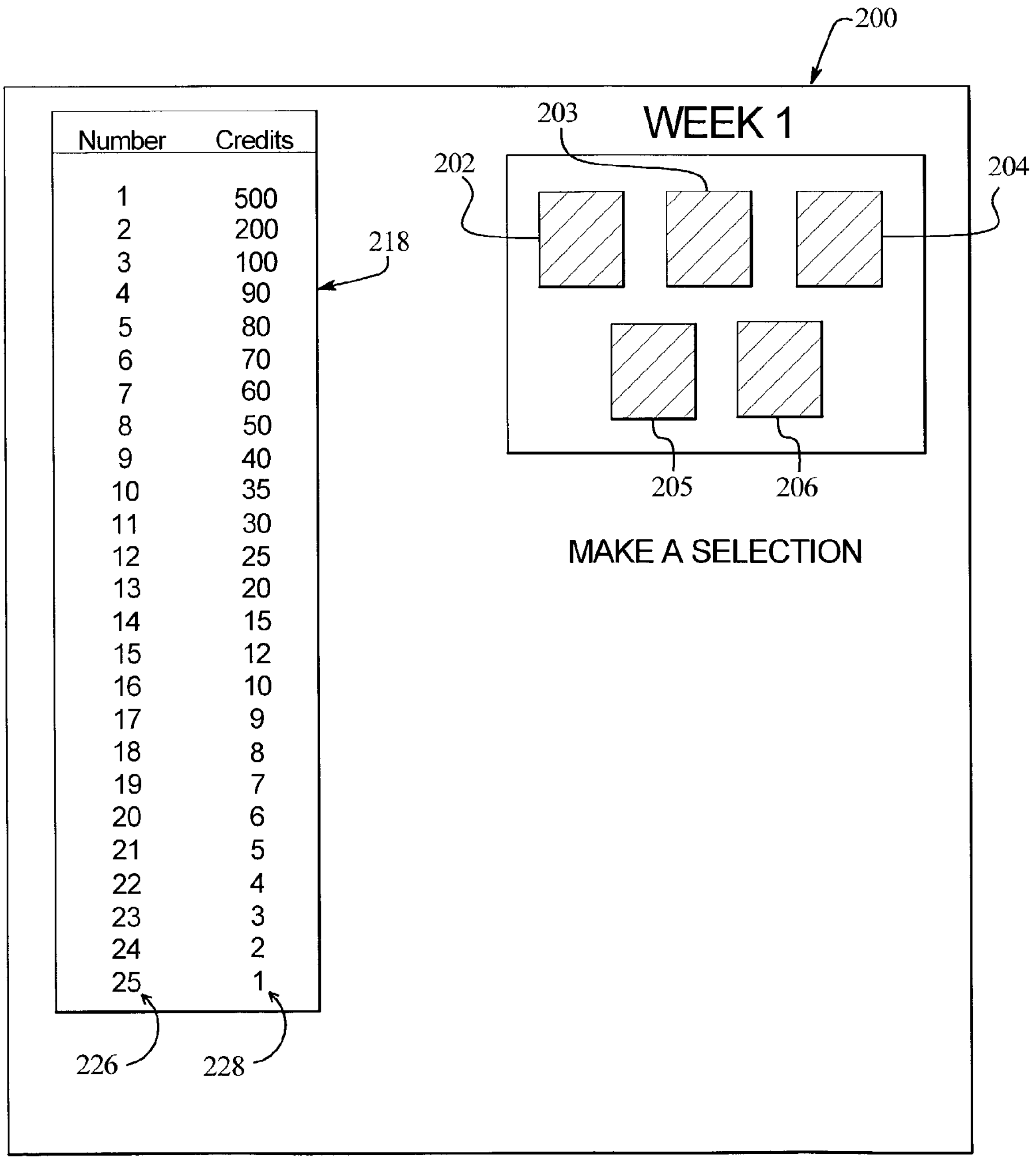
FIGS. 4A through 4C are front elevation views of the display of a preferred embodiment of the improved award offer bonus scheme illustrating the selection of an initial offer.
Figure 4B:
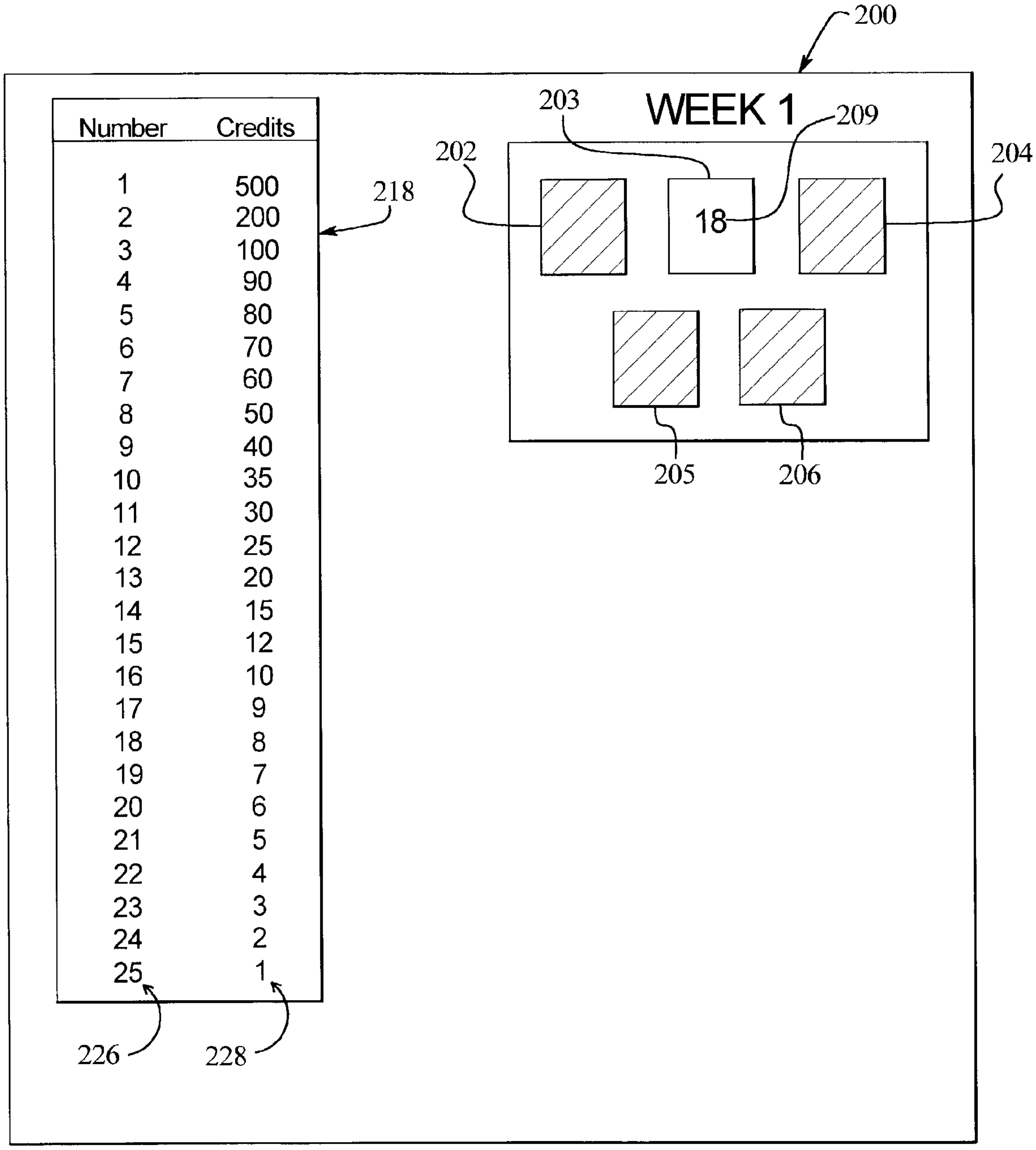
Figure 4C:
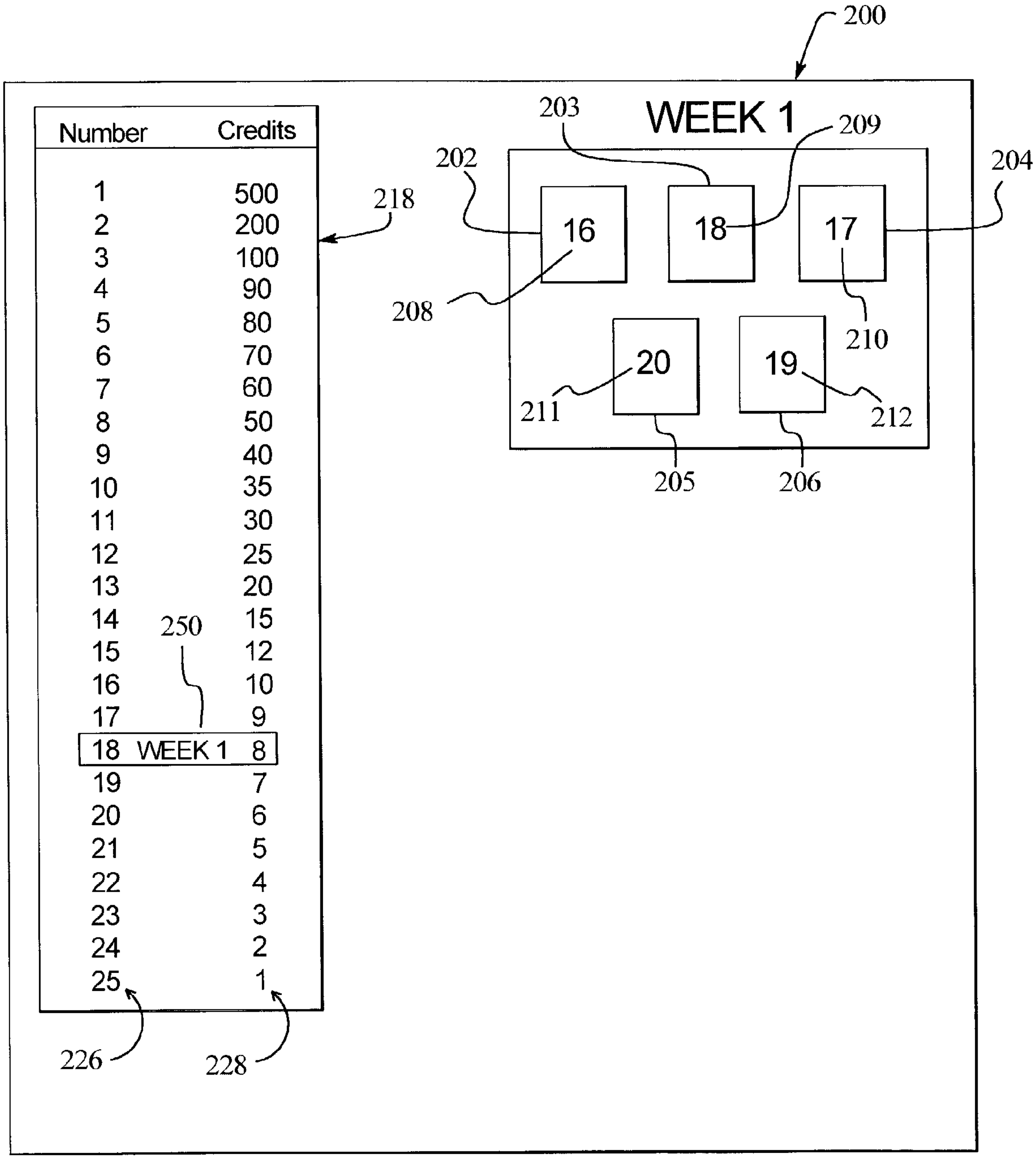
Figure 4D:
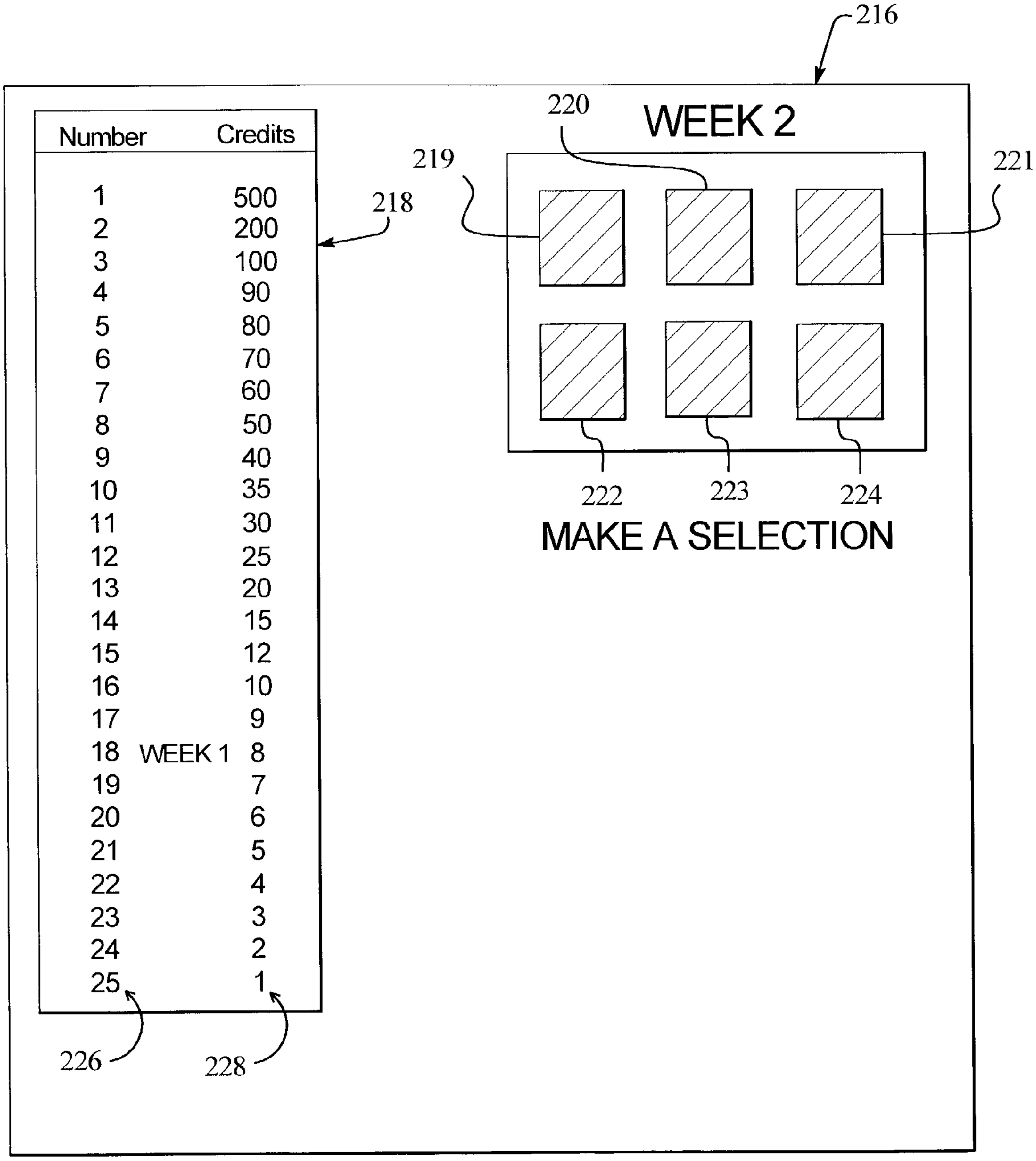
FIGS. 4D through 4L are front elevation views of the display of one preferred embodiment of the improved award offer bonus scheme illustrating the replacement of an existing offer.

In this embodiment, the display 200 includes the value display 218 and a plurality of masked selections 202, 203, 204, 205 and 206. The value display 218 includes a ranking of positions 226 and associated award offers 228, which differ from the offer modifiers 128 in the previous embodiment, which mathematically modify previous offers. The display 200 enables the player to select an initial number, ranking, point or position 226 which is associated with an initial award offer. The player picks from the five masked selections as illustrated in FIGS. 4A through 4C, although any suitable number of selections may be employed. In this embodiment, the ranking, points or positions 226 which are initially player selected designate award offers 228, and the award offers 228 replace the previously selected award offers instead of modifying the previous award offers.

In one preferred embodiment, the value display 218 is similar to a chart used to record and display best sellers such as book or record sales. The current number or position 226 represents the rank, place or spot on the chart (i.e., number 1 meaning a number one best selling book or record) and the award offers 228 are the game credits associated with that position on the chart. The object is to move to or as close to the number 1 rank or position as possible and thereby receive the highest number of credits. After establishing the initial rank or position on the chart that the game generates from the player's initial pick, as indicated above, the game enables the player to modify the player's current position on the value display 218. A positive number moves the player's position a number of positions closer to the number 1 position and a negative number moves the player's position 226 a number of positions away from the number 1 position.

After the player picks one of the masked initial positions or selections to generate an initial position such as position 209 of "18", the gaming device preferably reveals the other possible initial positions 208, 210, 211 and 212 associated with the selections 202, 204, 205 and 206, respectively (best seen in FIG. 4C). In this example, the player chooses the selection 203 which reveals the associated initial position 209 of "18" as illustrated in FIGS. 4B and 4C. The initial positions 208 through 212 may be any of the illustrated possible positions 226 including positions "1" to "25." The possible positions 226 in one implementation are weighted so that the game more likely generates less valuable positions, such as "18" or "24" than middle valued positions, such as "12" or high valued positions, such as "3."

The value display 218 preferably indicates or designates the initial position as illustrated in FIG. 4C. The value display also highlights or otherwise marks an associated award offer of eight credits. The value display 218 may display a label 250 such as "WEEK 1" which enhances the theme of the game by showing different positions at different times or stages of the game.

After establishing the initial position, the gaming device provides a second selection display 216 as illustrated in FIGS. 4D through 4L, which includes value display 218 and a plurality of masked selections 219, 220, 221, 222, 223 and 224. Although six selections are illustrated, two or more selections are contemplated.

Figure 4E:
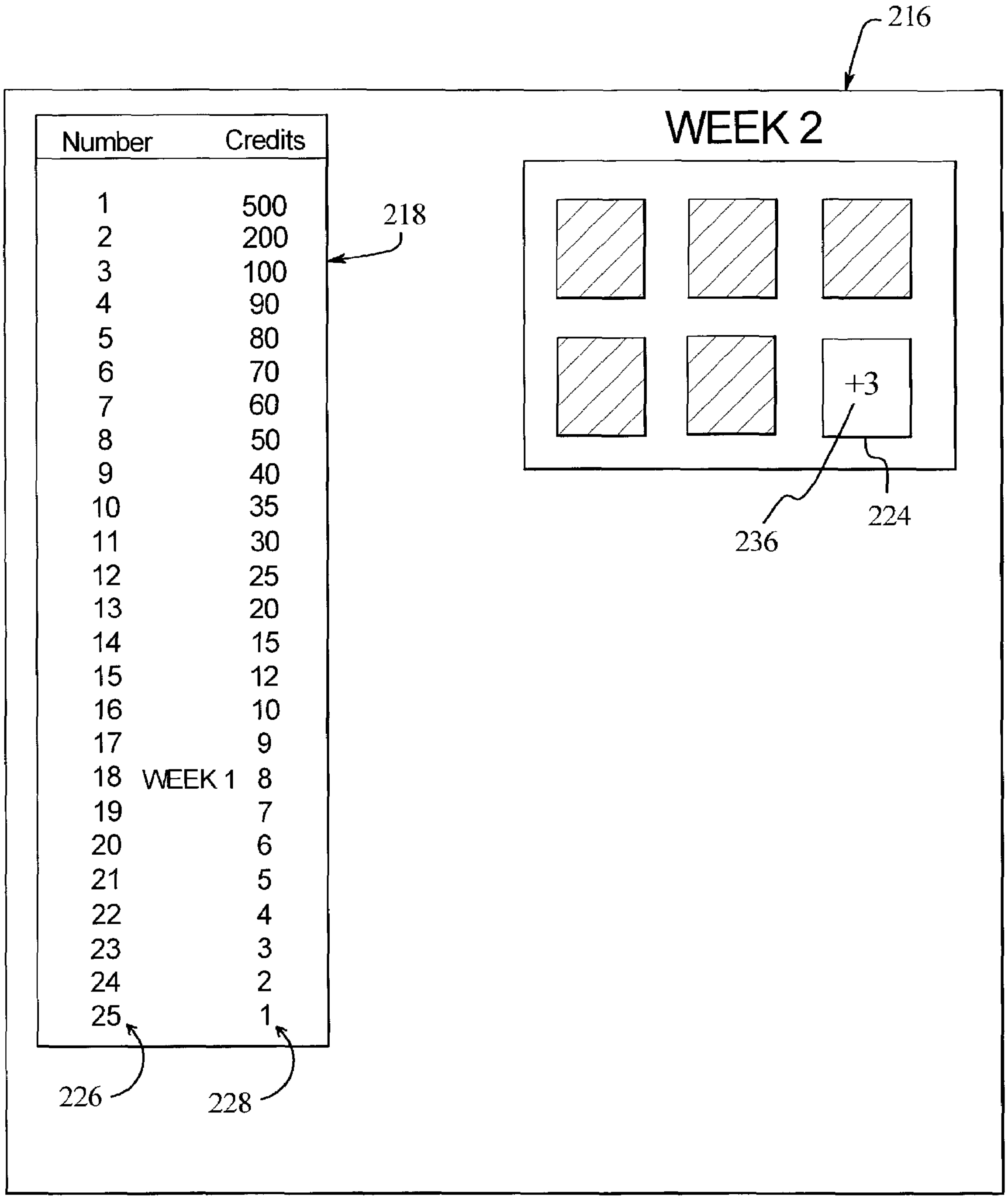

The player picks one of the masked selections. The gaming device reveals a number, rank or position move or point associated with such selection. In this example, the player chooses selection 224 revealing position move or point of "+3" as illustrated in FIG. 4E. It should be appreciated that the selected point 236 is not a new award offer or credit amount. Rather the point 236 is used to determine the modification of the player's current position or spot on the value display 218, which corresponds to an award offer that replaces the original offer. The position could also be associated with an award modification as explained above.

Figure 4F:
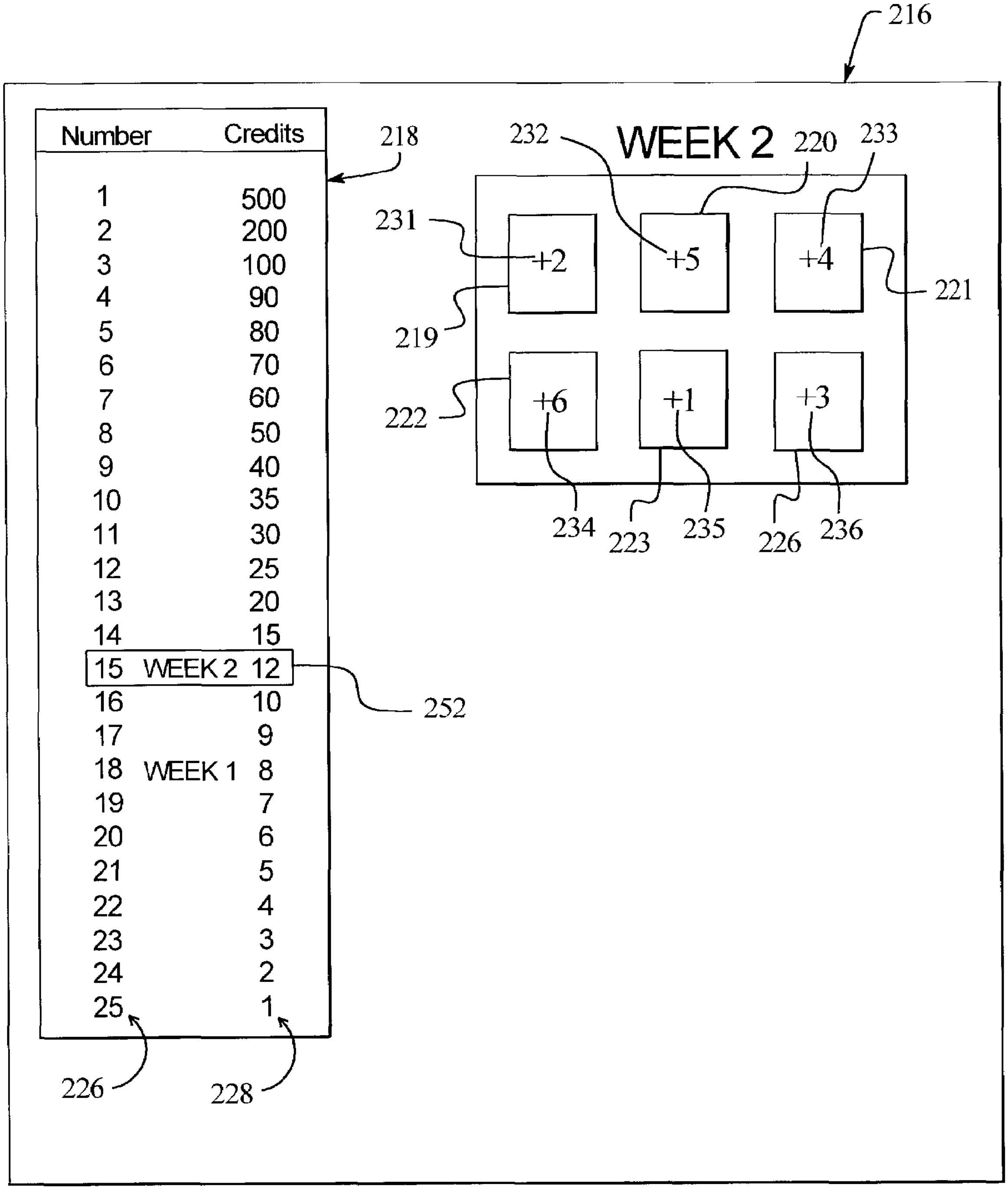

In this example, the player selected an initial position of "18", which has a corresponding award offer of eight as illustrated in FIG. 4C. The player subsequently selects the move 236 of "+3." The game accordingly changes the initial position by three places or positions closer to position 1, creating a new position of 15 and a new offer of twelve as illustrated in FIG. 4F. That is, the player's position changes three spots towards the number 1 position. The new award offer 228 of twelve is displayed by the value display 218 and marked by the label 252 as "WEEK 2" as illustrated in FIGS. 4E and 4F. It should be appreciated that the value display 218 may display the initial and new position 250 and 252, respectively, simultaneously or only the new position 252. The gaming device preferably reveals or unmasks the remaining non-chosen points 231, 232, 233, 234 and 235 associated with the remaining selections 219, 220, 221, 222 and 223, respectively, as illustrated in FIG. 4F.

Figure 4G:
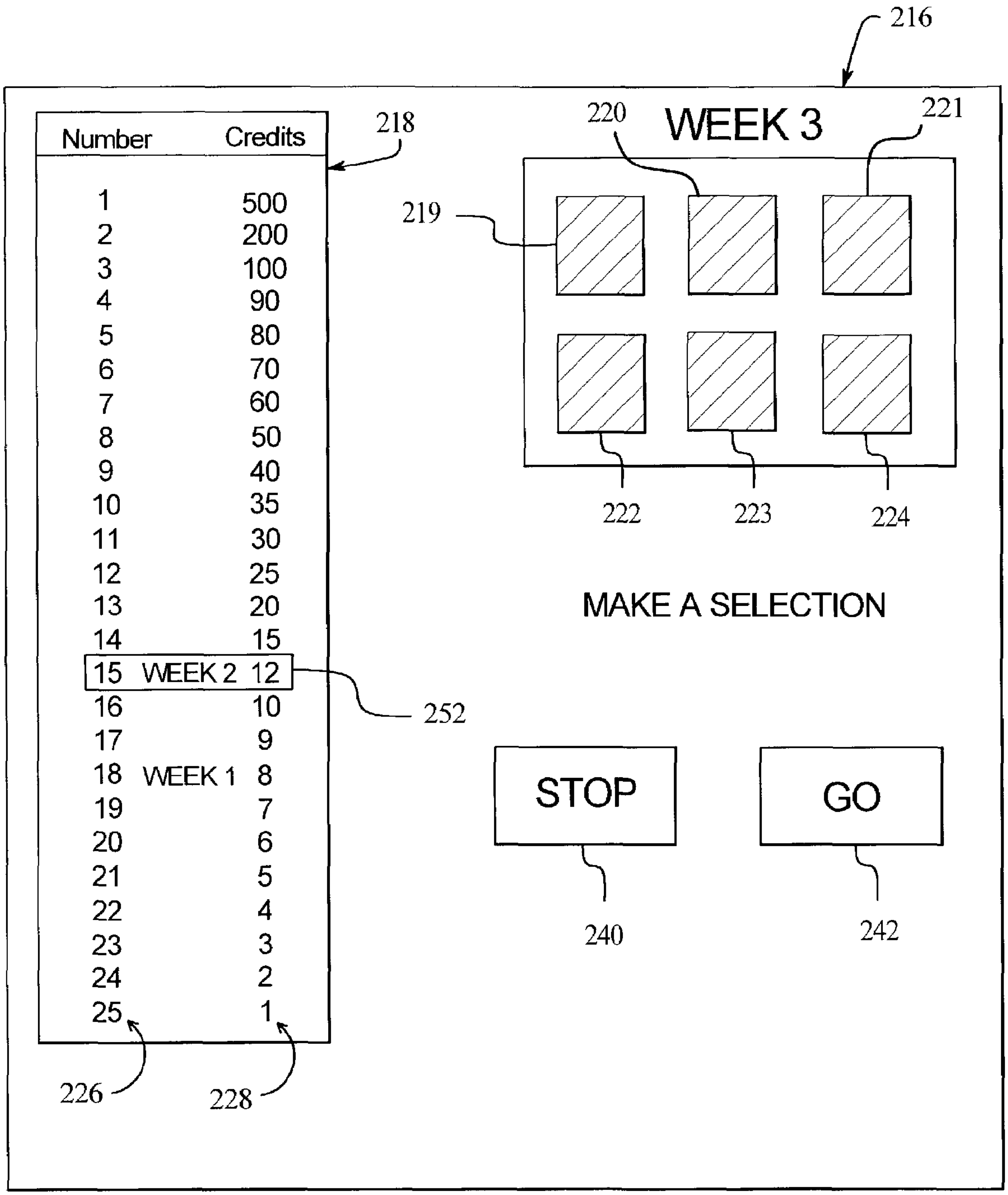

The preferred embodiment includes enabling the player to accept the new award offer or reject the award offer and continue to play the bonus game. The gaming device provides the previously described accept and reject indicators or buttons 240 and 242 respectively labeled “STOP” and “GO”, as illustrated in FIG. 4G.

Figure 4H:
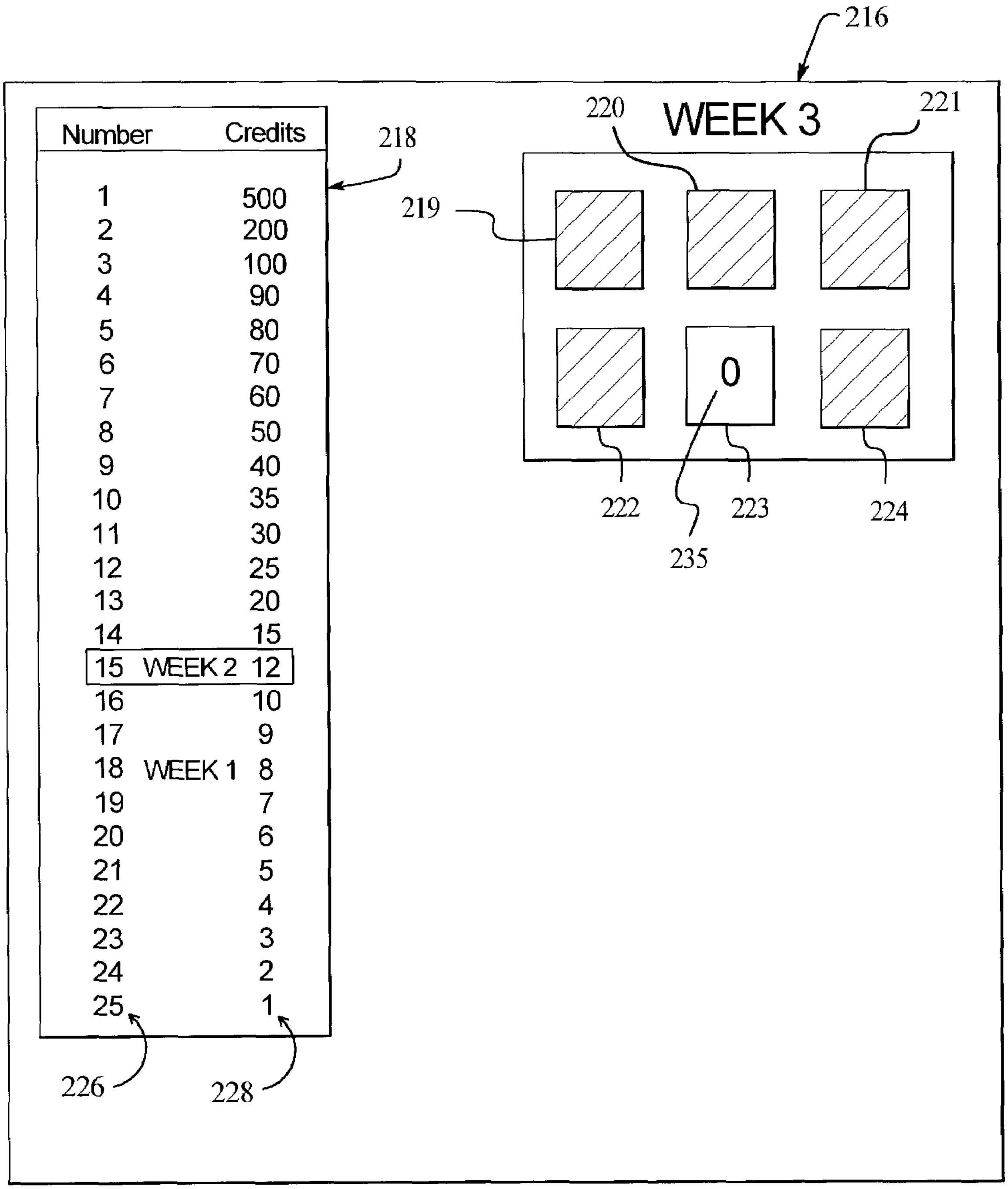
Figure 4I:
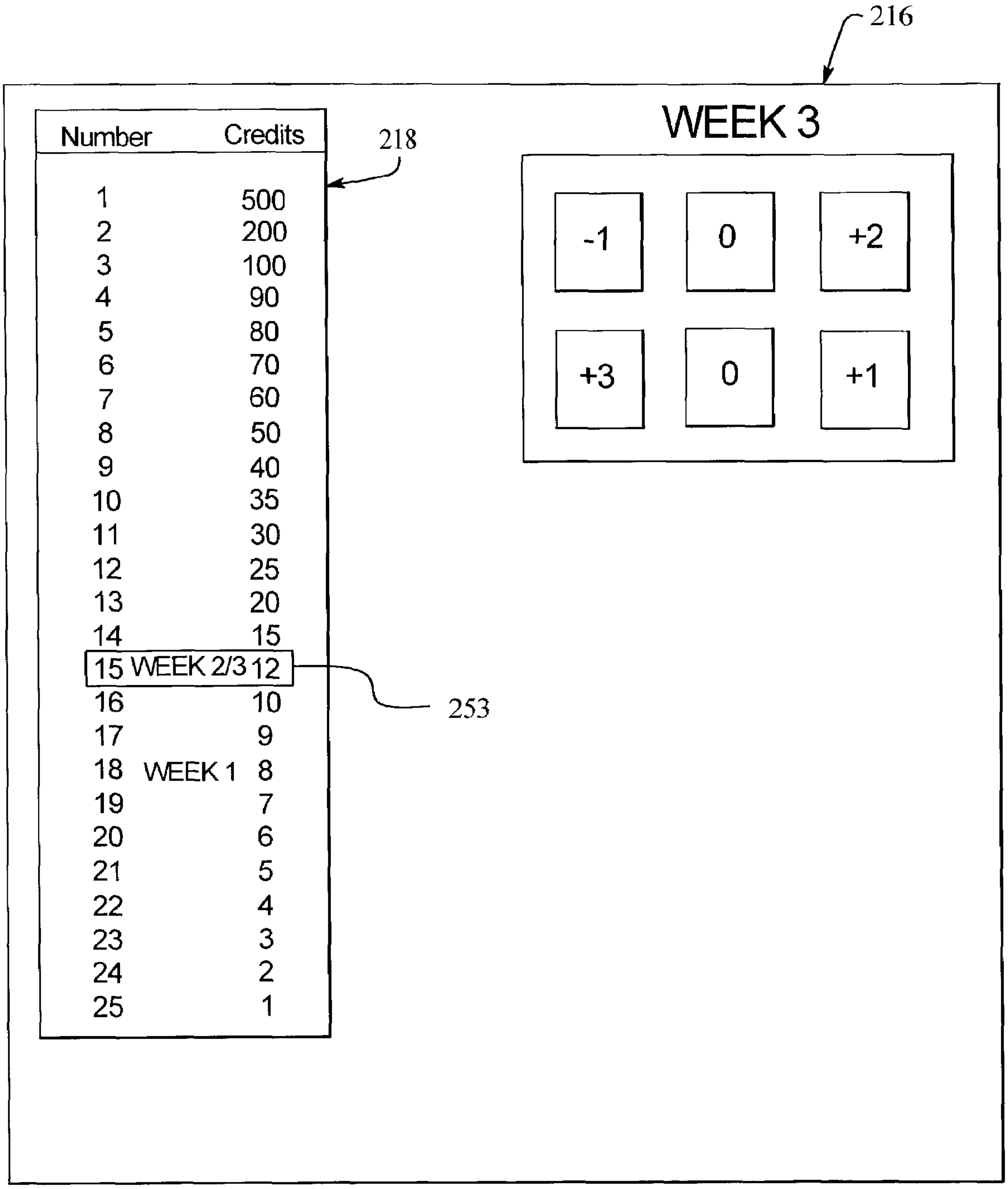
Figure 4J:
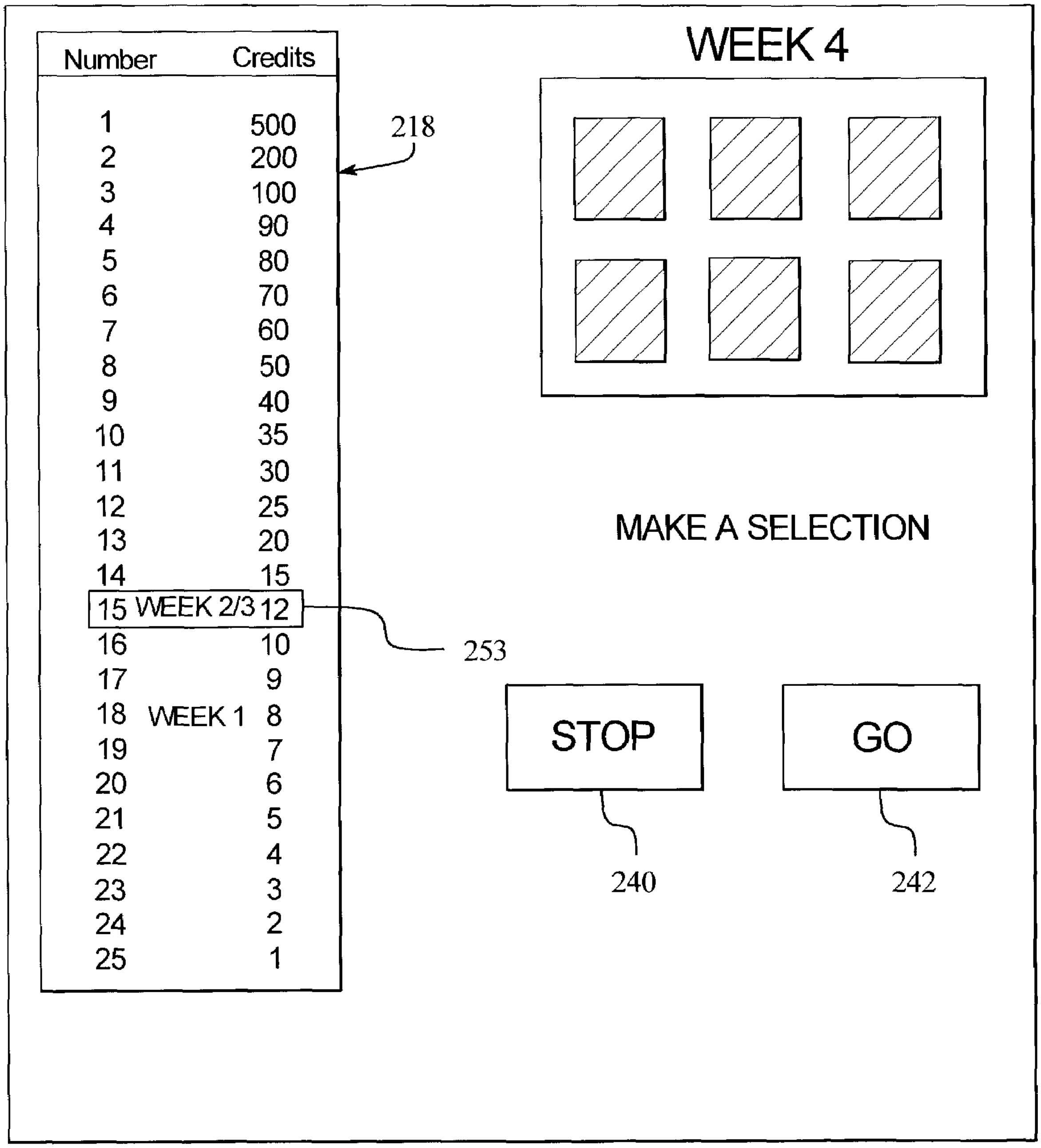

If the player accepts the new award offer, the gaming device provides the player with the new award offer and terminates the bonus game. If the player rejects the new award offer, the bonus game continues in like fashion, wherein in this example: (i) the player picks one of the masked selections from the group of selections 219 through 224 as illustrated in FIGS. 4G and 4H; and (ii) the gaming device reveals position move 235 of zero as illustrated in FIG. 4H, such that the player’s position on the display does not change after the third offer as illustrated by position 253 in FIG. 4I. The game also reveals the other position moves as illustrated in FIG. 4I. At this point, again the player may accept or reject the award offer as illustrated in FIG. 4J.

In one embodiment of the present invention, the game automatically rejects the award offer 228 if there is no risk to the player, e.g., when the current award offer is the lowest possible offer illustrated here as one credit in association with the twenty-fifth position. This auto-executing feature occurs only when the current award offer is not the final offer, that is, when the game will provide another award offer to the player.

Figure 4K:
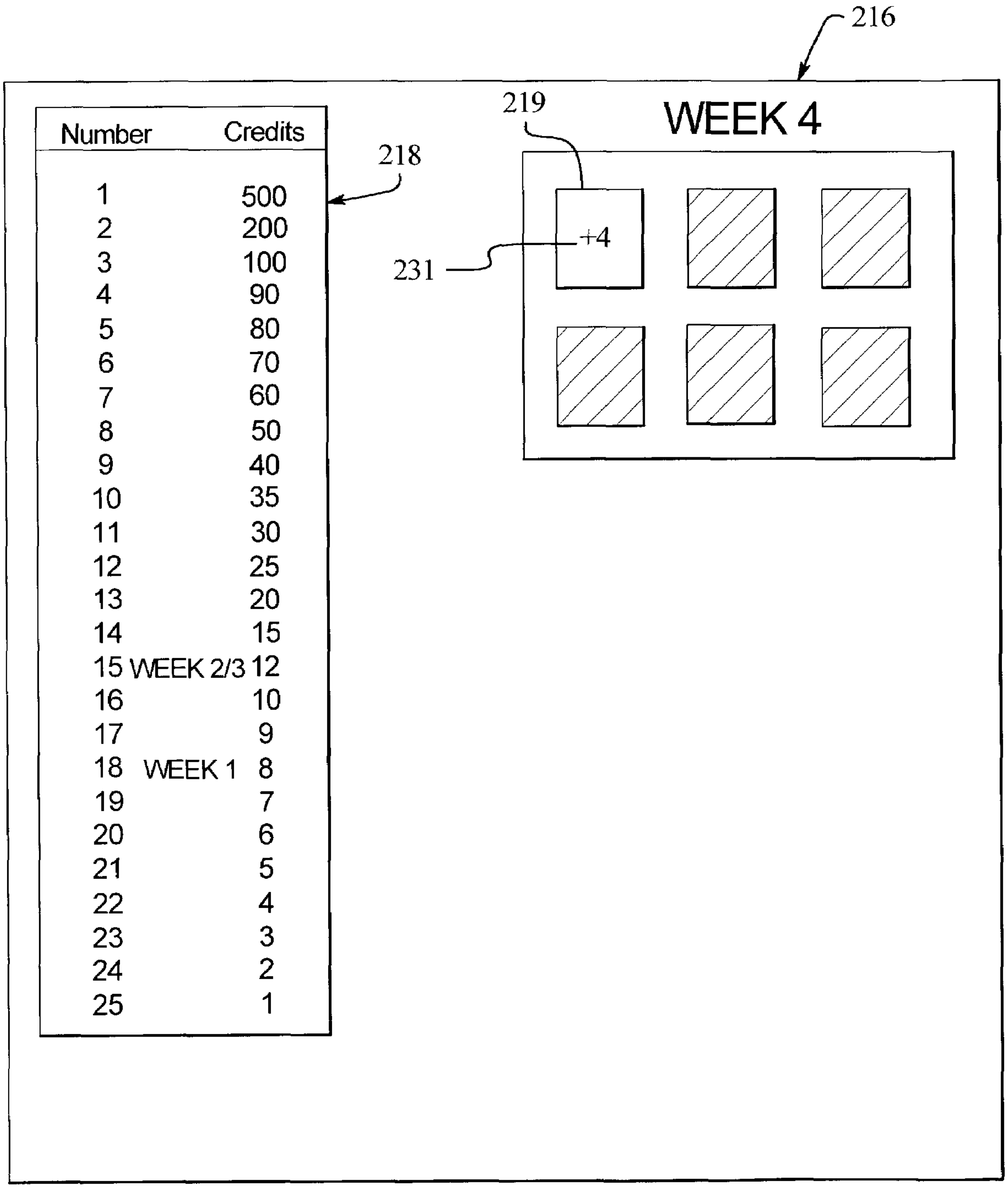
Figure 4L:
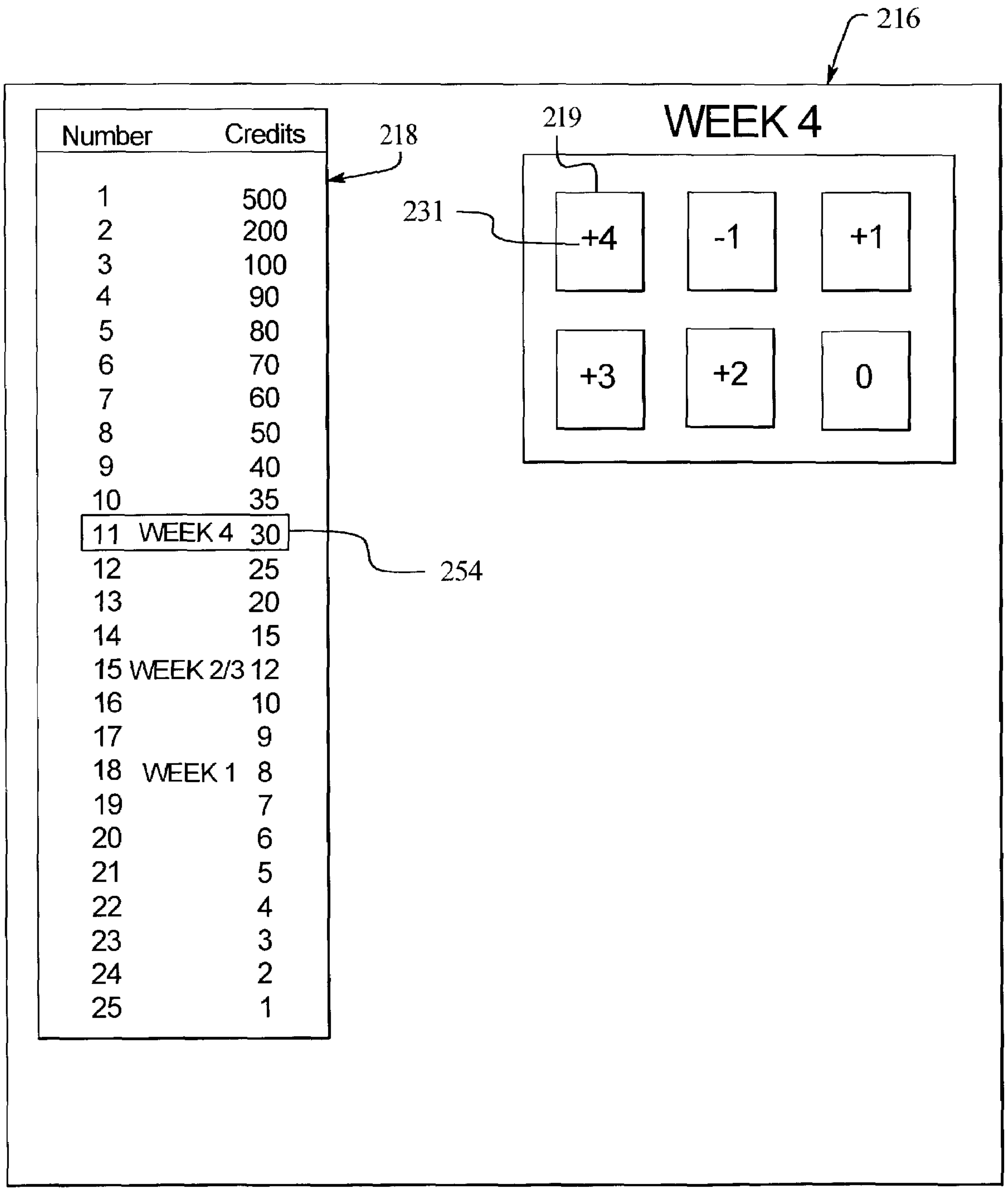

As illustrated in FIG. 4K, the player selects selection 219 which provides a +4 position move 231. The game changes the position by four places or positions closer to position 1, creating a new position of 11 and a new offer of 30 as illustrated in FIG. 4L. The offer of 30 is displayed by the value displayed 218 and marked by the label 254 as “WEEK 4” as also illustrated in FIG. 4L. The gaming device also reveals the remaining non-chosen points associated with the remaining masked selections as further illustrated in FIG. 4L. The player may then either reject the offer if there are any more remaining offers or accept the offer and end the bonus game. If there are no more remaining offers, the player’s award is 30. It should be appreciated that this multi-step bonus game provides an interesting and exciting bonus game for players.

It should also be appreciated from previous example that the present invention includes positive position moves, negative position moves and no position moves. The present invention further includes assigning the masked selection values to make advancement more difficult or less difficult or more hazardous or less hazardous as the game advances. That is, the implementor may make advancement more difficult by increasing the number of negative moves and/or lower positive moves. The implementor may make advancement more hazardous by increasingly placing larger positive and negative moves or points in the selection groups, whereby the average value of the points stays the same, but the potential for obtaining high negative position moves as well as high positive position moves increases with each selection. It should also be appreciated that the gaming device may provide the player a replay of the game if the player achieves a certain level such as the first position. In such instance, the player would get the awards achieved in both the initial play and any replays.

Figure 5A:
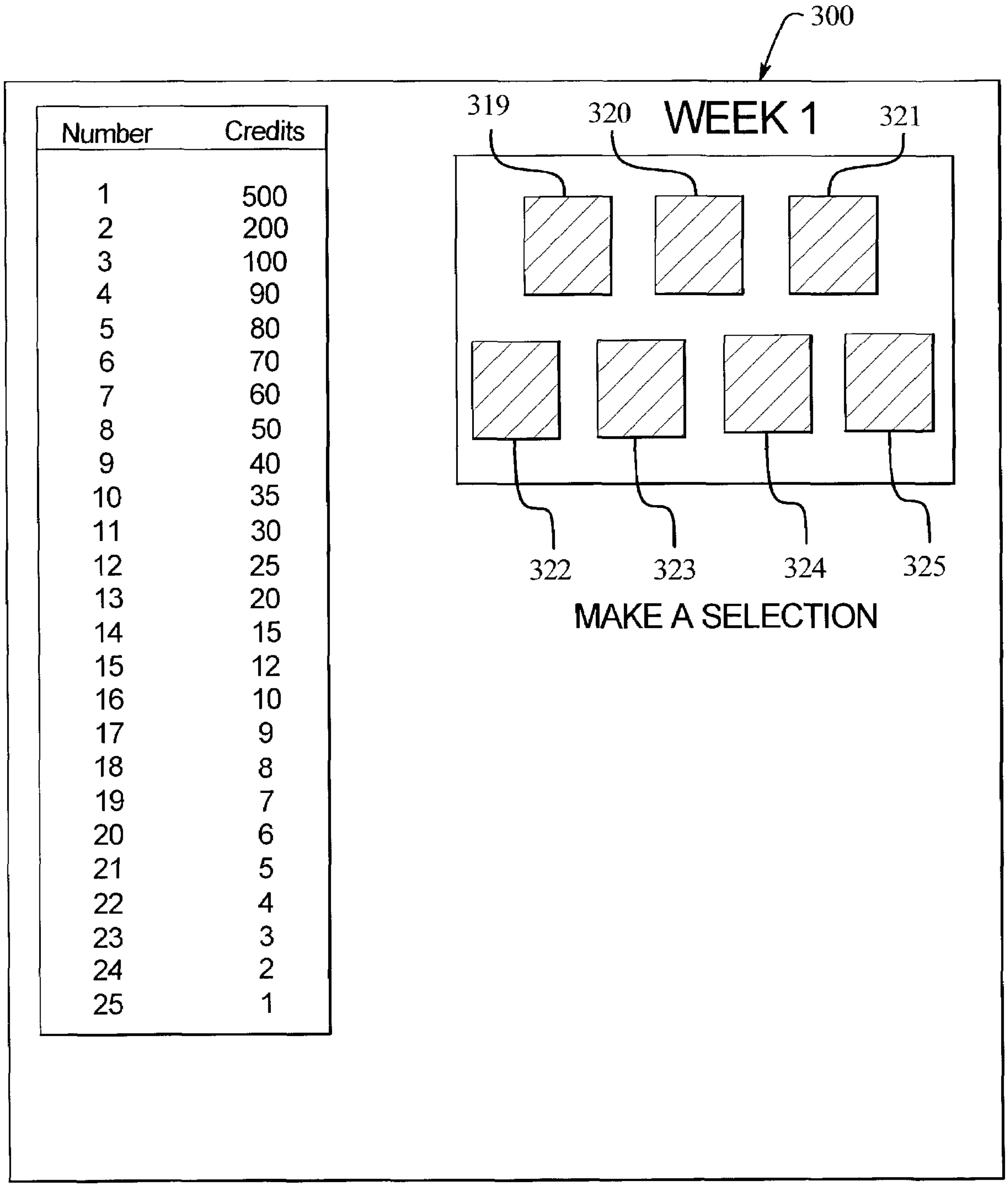
FIGS. 5A through 5F are front elevation views of the display of another embodiment of the improved award offer bonus scheme having a varying number of selectable masked choices.
Figure 5B:
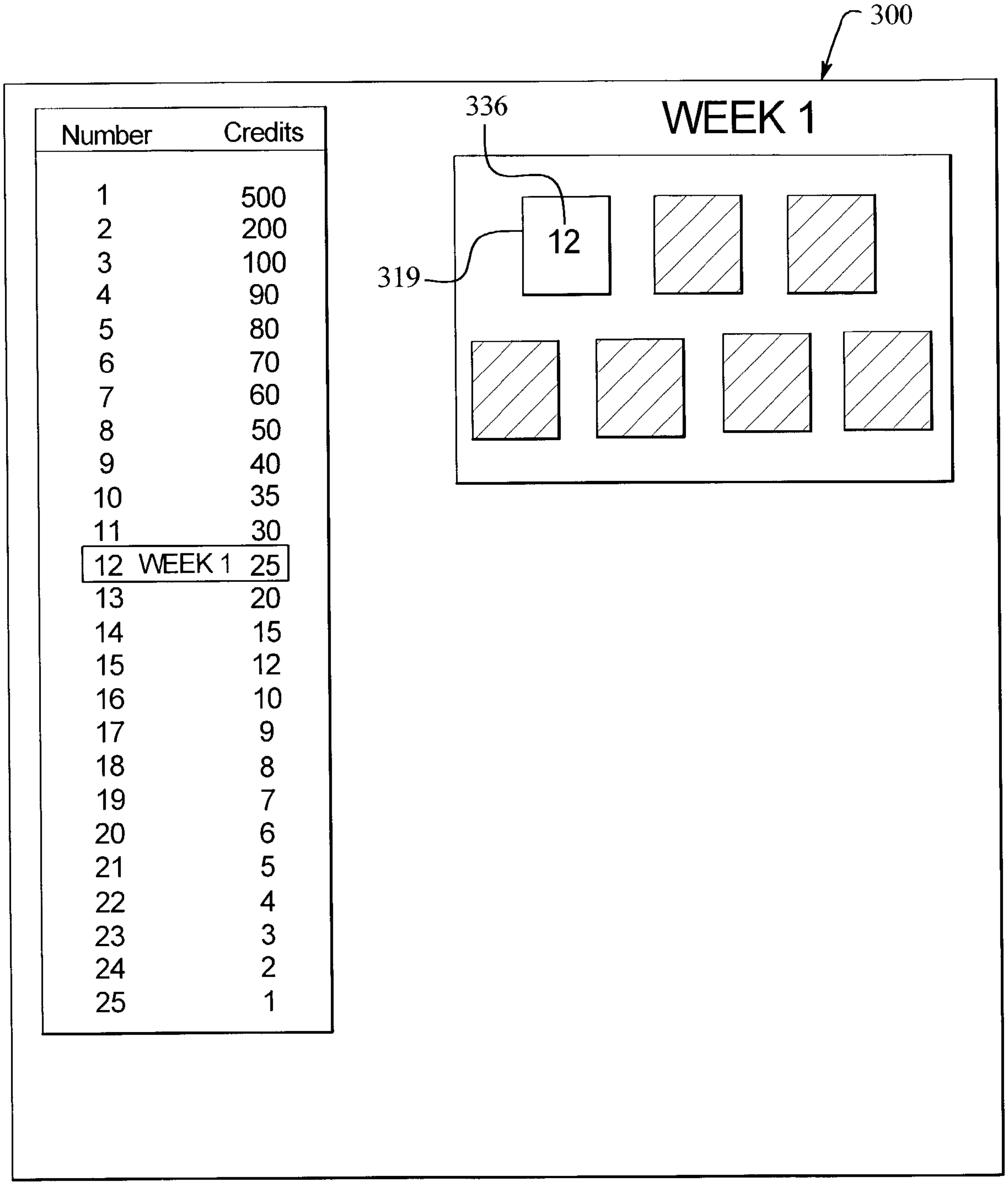
Figure 5C:
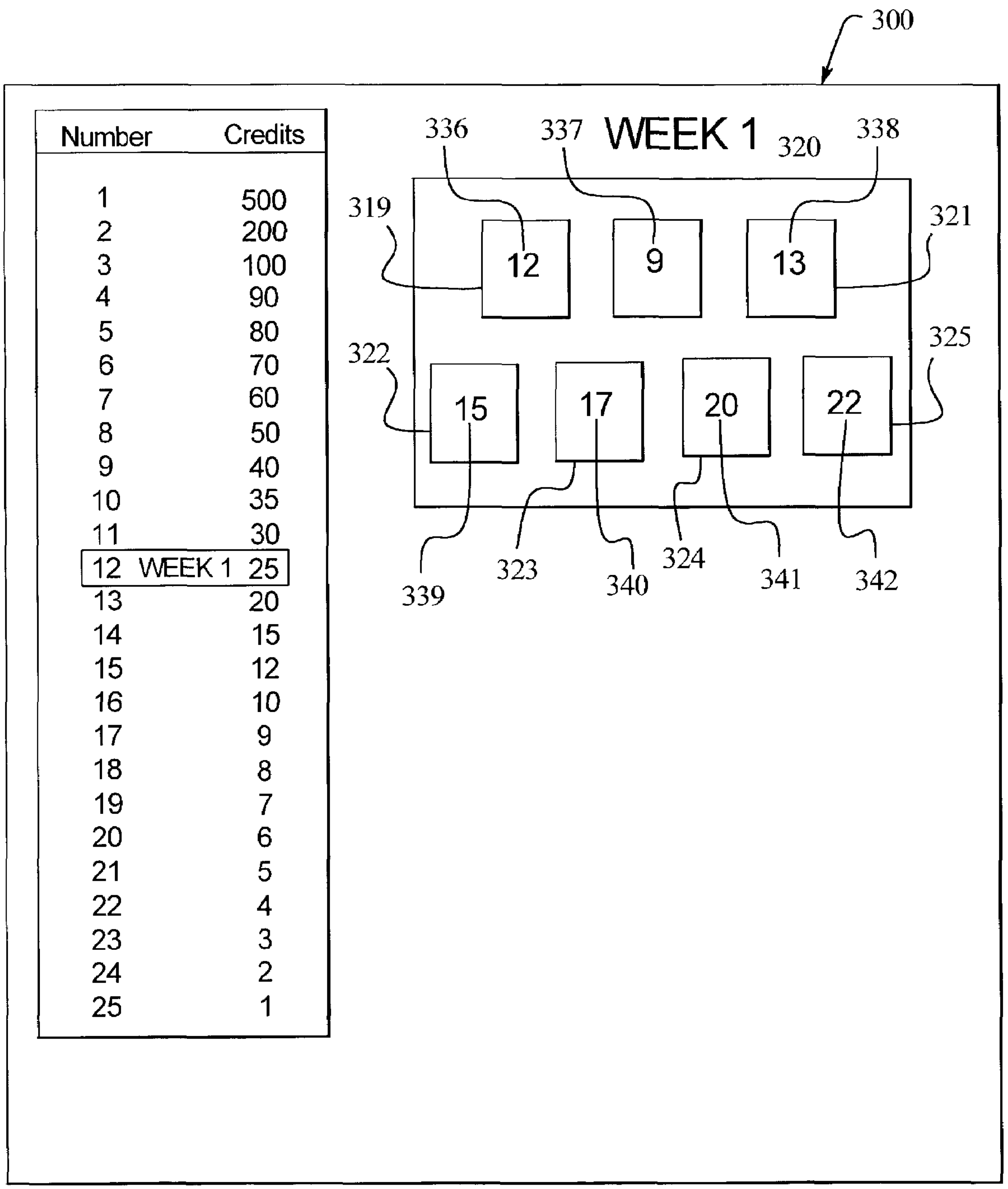

In the embodiment of FIGS. 4A to 4L, the number of masked selections increased from 5 in FIGS. 4A to 4C to 6 in FIGS. 4D to 4L. It should be appreciated that the number of masked player selections can remain constant throughout the bonus scheme. In a further embodiment illustrated in FIGS. 5A through 5F, the number of player selectable choices or masked selections may decrease or otherwise vary during the bonus game. In FIG. 5A, the gaming device provides a display 300 having seven masked selections 319, 320, 321, 322, 323, 324 and 325. The player picks one of the masked selections. The gaming device reveals the position associated with such selection. In FIG. 5B, the player chooses the selection 319 revealing the initial position 336 of 12 as illustrated in FIG. 5B. The gaming device preferably reveals or unmasks the remaining non-chosen positions 337 to 342 associated with the remaining selections 320, 321, 322, 323, 324 and 325, respectively, as illustrated in FIG. 5C.

Figure 5D:
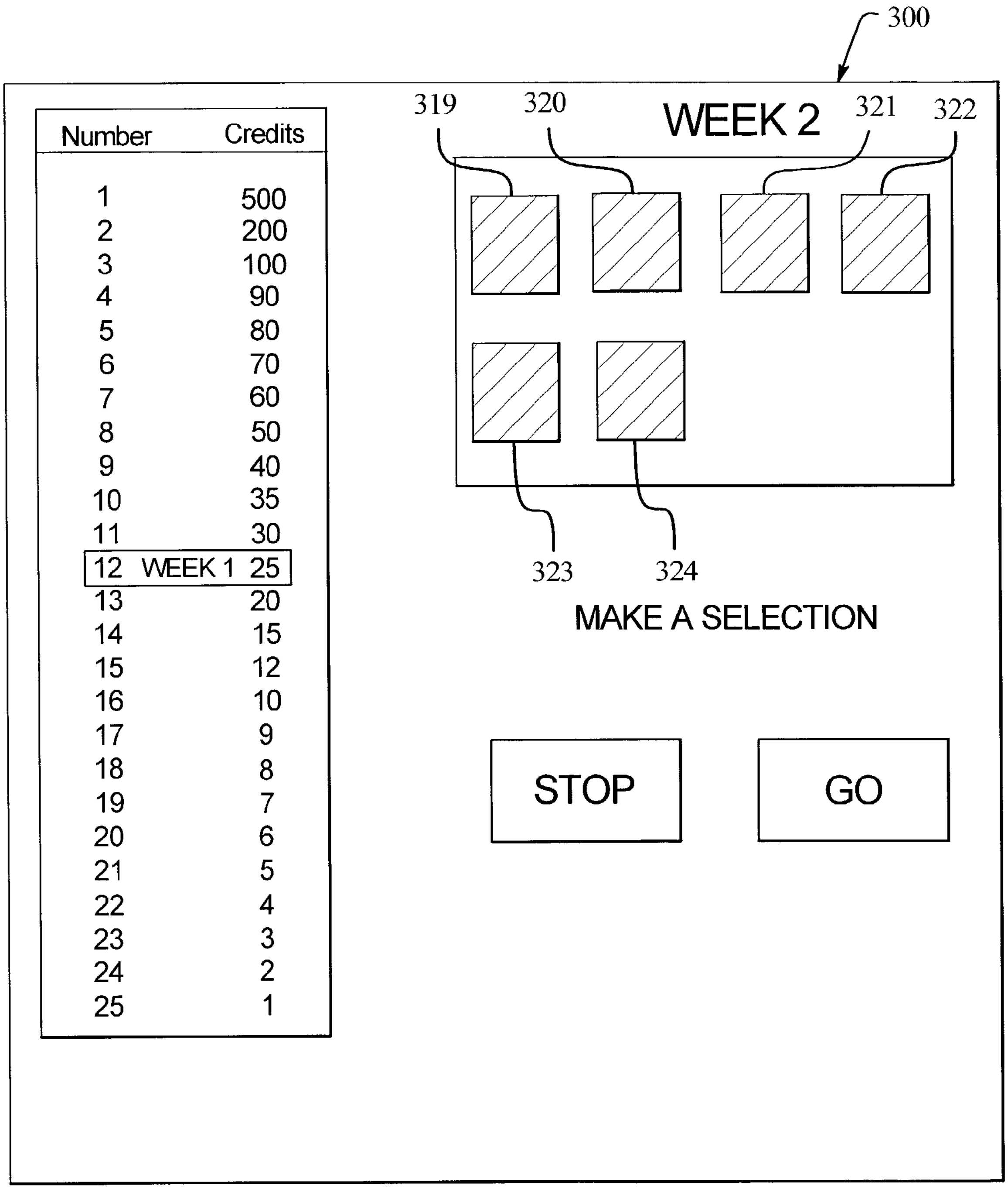
Figure 5E:
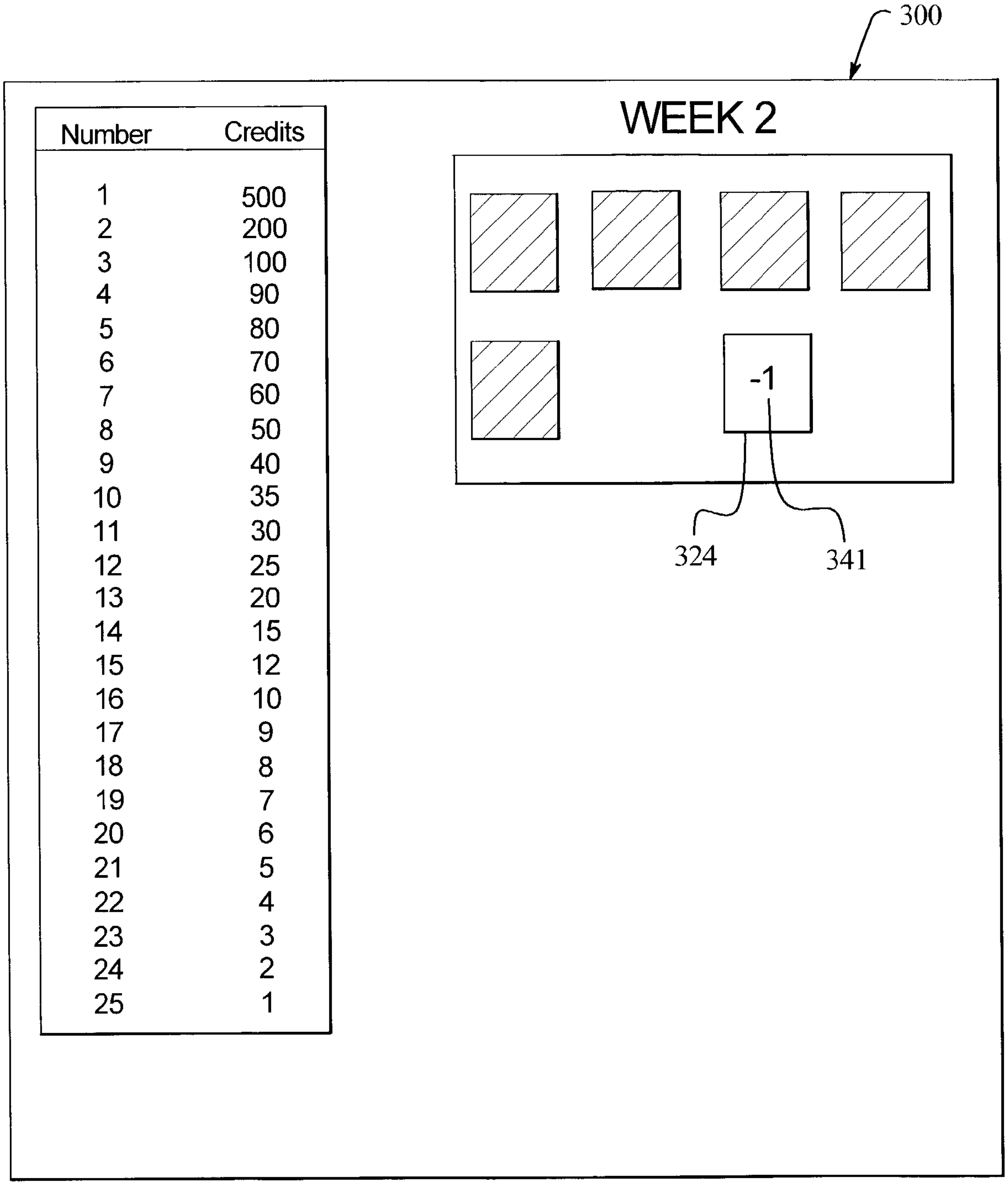
Figure 5F:
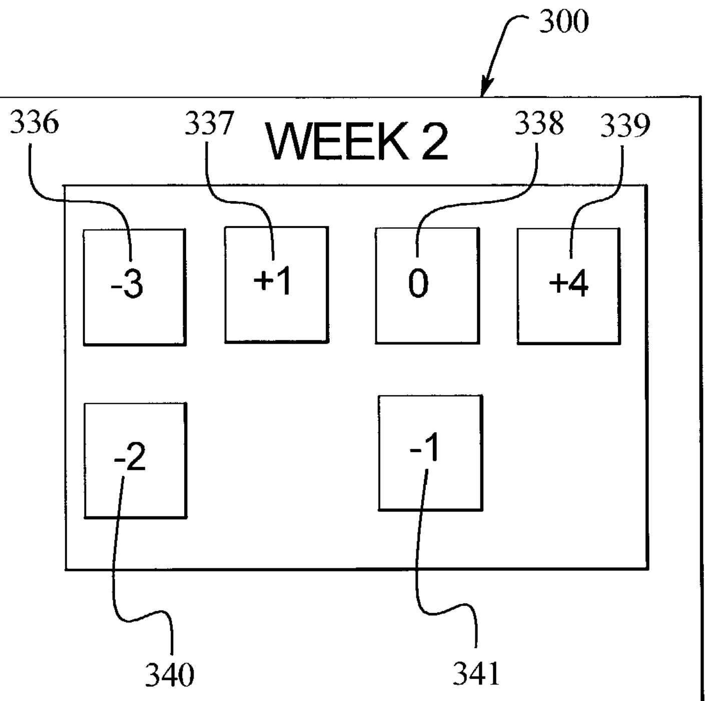

In the next round of the bonus game illustrated in FIGS. 5D through 5F, the gaming device provides six masked selections 319, 320, 321, 322, 323 and 324. The player picks one of the masked selections. The gaming device reveals the position moves or points associated with such selection. In the illustrated example, the player chooses selection 324 revealing the position move point 341 having a value of −1 as illustrated in FIG. 5E. The gaming device preferably reveals or unmasks the remaining non-chosen position moves or points 336, 337, 338, 339 and 340 associated with the remaining selections 319, 320, 321, 322 and 323, respectively, as illustrated in FIG. 5F.

Figure 6:
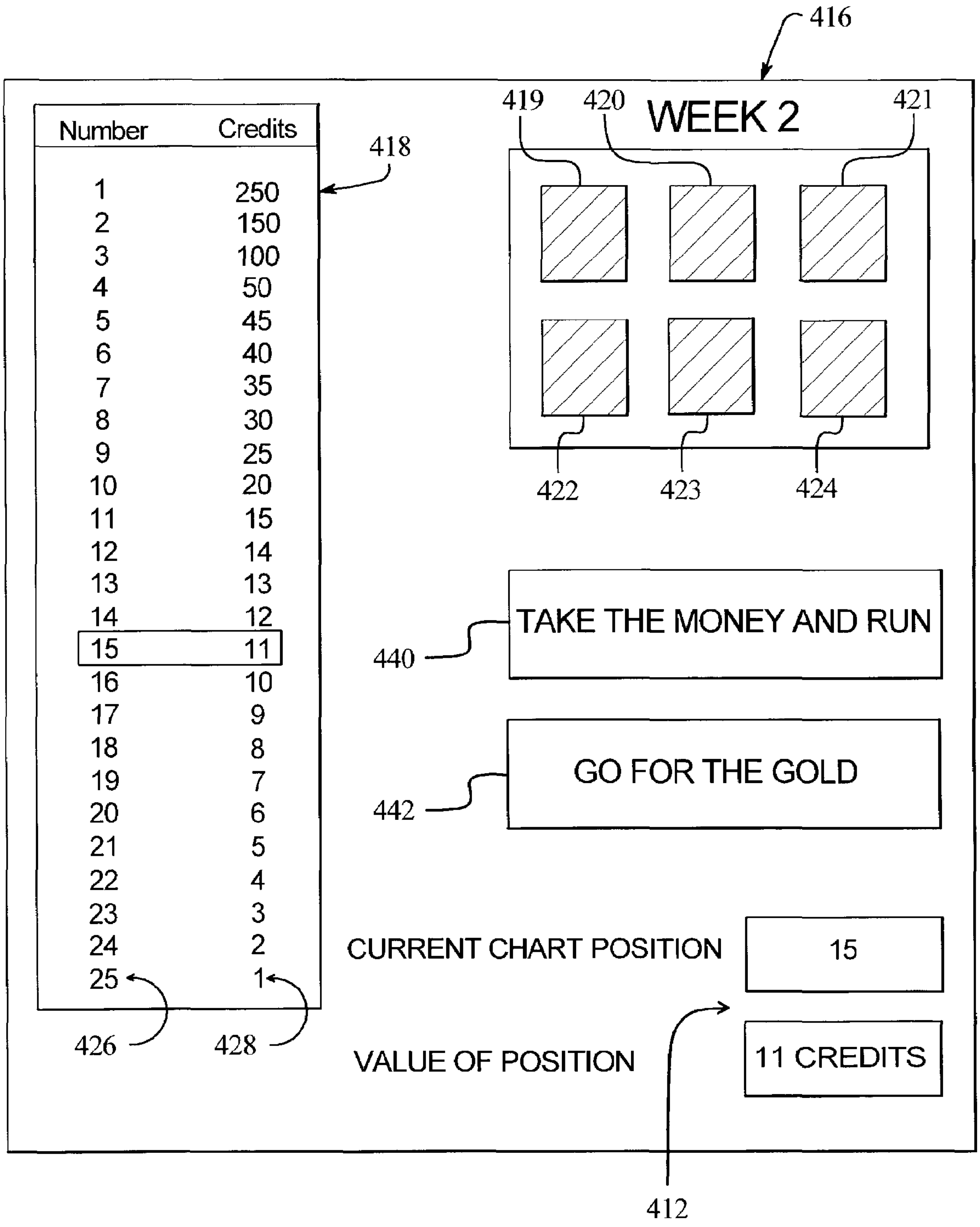
FIG. 6 is a front elevation view of the display of a further embodiment of the improved award offer bonus scheme having an additional offer display.

A further alternative embodiment is illustrated in FIG. 6. This embodiment includes the value display 418, the positions 426, the associated offers 428 and the accept and reject buttons 440 and 442 as described previously. However, in this embodiment, the bonus game includes an award offer display 412 showing the various replaced positions 426 and offers 428 associated with the positions 426.

It should be appreciated that the alternative embodiments of the improved award offer bonus scheme of the present invention can be simultaneously implemented in a single bonus round or each implemented individually in different bonus rounds. The determination of when to implement such alternative embodiments could also be randomly determined.

Offer Ranges

Referring now to FIGS. 7A through 7E, in another embodiment of the present invention, the game is adapted to: (i) replace or modify a player’s current offer with higher award offers when the player’s offer resides within a particular offer range; and (ii) replace or modify a player’s current award offer with higher or lower award offers when the player’s offer resides within another award offer range. In one preferred implementation, the player upgrades the award offers through the range where the award offers can only increase until obtaining an award offer in a second range, wherein the player has to decide whether it is worth risking the current award offer and potentially receiving a lower award offer. The multiple ranges may be implemented with an award offer modification embodiment illustrated in FIGS. 3A through 3J, or with an award offer replacement embodiment illustrated in FIGS. 4A through 4L. For purposes of illustration, only an award offer replacement embodiment is illustrated and described below.

Figure 7A:
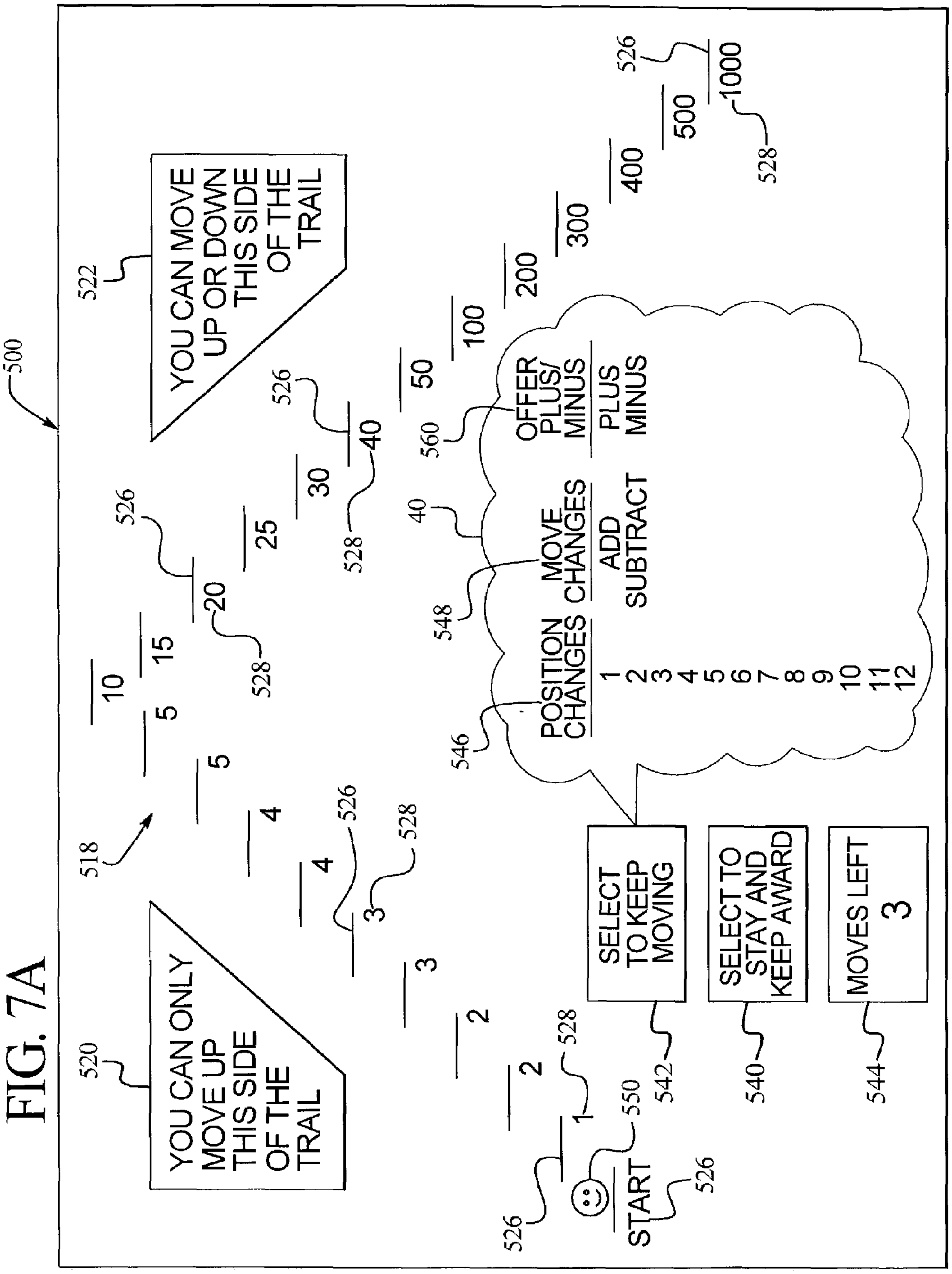
FIGS. 7A through 7E are front elevation views of the display of another embodiment of the improved award offer bonus scheme having offer ranges in which the offer replacement or modification changes when the offer enters a different range.
Figure 7B:
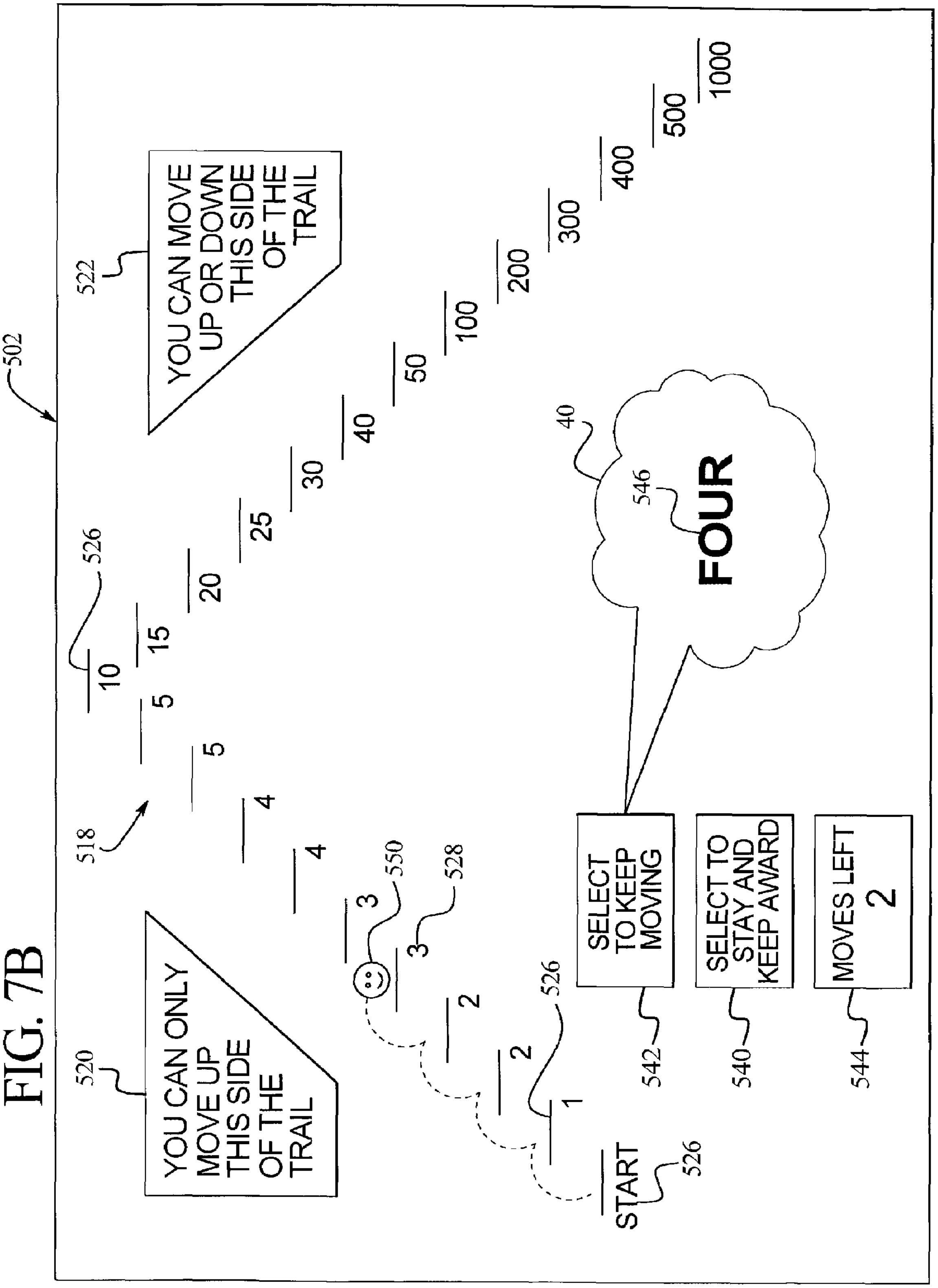

In FIG. 7A, the display 500 includes an award offer display 518 that has a plurality of ranks or positions 526 and a displayed award offer 528 associated with each rank or position. This example provides twenty-two ranks positions 526 and award offers 528 spanning from one to one thousand. As illustrated, the same award offer 528 may be associated with two or more positions 526. The display 500 also includes an accept button 540 and a reject button 542, which have the functionality described above. The display 500 also includes an offers or moves remaining indicator 544, which shows the player how many more times the player may reject a current award offer and obtain a new award offer.

In one implementation, the award offer display 518 includes a trail or path that a marker 550, representing the player, moves along as the player generates new award offers. This particular trail includes an upward slope, wherein the marker 550 moves upwardly, and a downward slope, wherein the marker 550 moves downwardly. The slopes are differentiated by different audio, visual or audio-visual messages 520 and 522.

This embodiment may provide messages, such as messages 520 and 522, which describe the different risks of playing while the player's offer exists in a particular range. Alternatively, the game does not provide this information. The message 520, corresponding to the nine positions on the upward slope (not including the top position), informs the player that the player's offer 528 only moves up if the player selects to keep moving while the marker 550 resides in one of the upward slope positions. The message 522, corresponding to the thirteen downward slope positions 526 (including the top position), informs the player that the player's offer 528 can move up or down if the player selects to keep moving while the marker 550 resides on the top position or on one of the downward slope positions 526.

In one embodiment of the present invention, the gaming device includes an area in the memory device 40 that stores one or more tables having position changes 546 one through twelve, move changes 548 that add or subtract moves from the moves remaining indicator 544 and an offer plus/minus indicator 560, which the game generates when the player's current offer resides on the downward slope. When the player picks the keep moving button 542, an input is sent to the processor 38, whereby the processor randomly generates either a position change 546 or a move change 548. If applicable, the processor also generates an offer plus/minus indicator 560.

The display 500 may be adapted to inform the player of the actual values stored in the memory device 40. Either or both the position 546 or move change 548 generation or the plus/minus indicator 560 generation may be weighted so that, e.g., the game generates one of the move changes 548 less than 1/7th of the time, or the game generates an offer increase fifty-five percent of the time, etc.

As illustrated in the display 500 of FIG. 7A, in one implementation the player begins with three moves and at the start position. The message 520 informs the player that the player can only increase the offer by selecting the keep moving button 542. In the display 502 of FIG. 7B, after the player picks the keep moving button 542 a first time, the game generates a position change 546 of four from the memory device 40 but does not generate a plus/minus indicator 560. The marker 550 moves four positions upward along the path of the offer display 518 so that the player's new award offer is three. The moves remaining display 544 shows one less move. Since the player's award offer still resides on the uphill side of the display 518, the player would wisely pick the keep moving button 542 again.

Figure 7C:
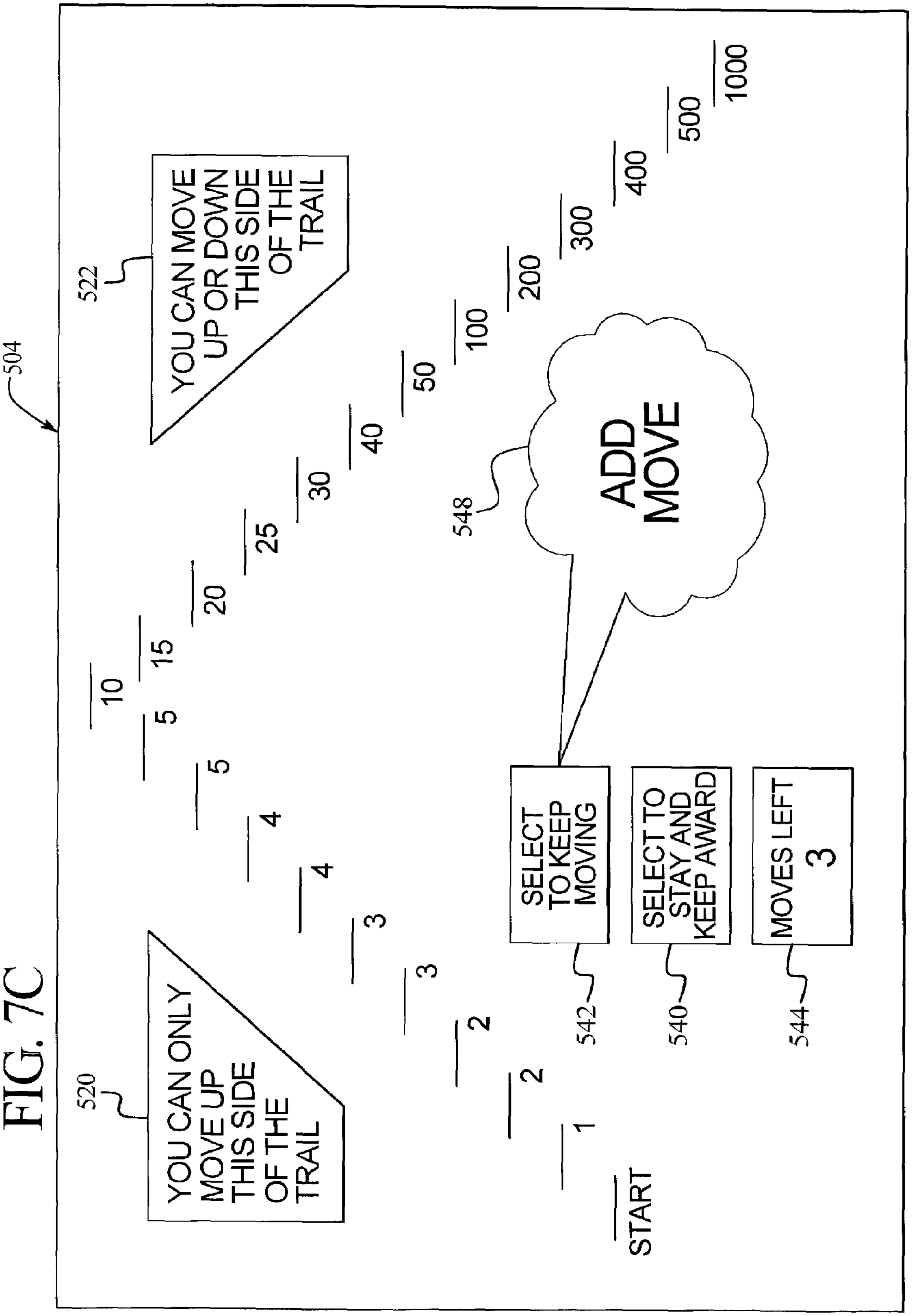

In the display 504 of FIG. 7C, after the player picks the keep moving button 542 a second time, the game generates a move change 548 of "add move" from the memory device 40. The plus/minus indicator 560 is inapplicable here because the game does not generate a position change. That is, even on the downhill side the game does not generate an indicator 560 when it generates a move change 548. The marker 550 stays in the same position 526 so that the player's award offer remains three. The moves remaining display 544 shows one additional move. Since the player's offer still resides on the uphill side of the display 518, the player would again wisely pick the keep moving button 542 again.

Figure 7D:
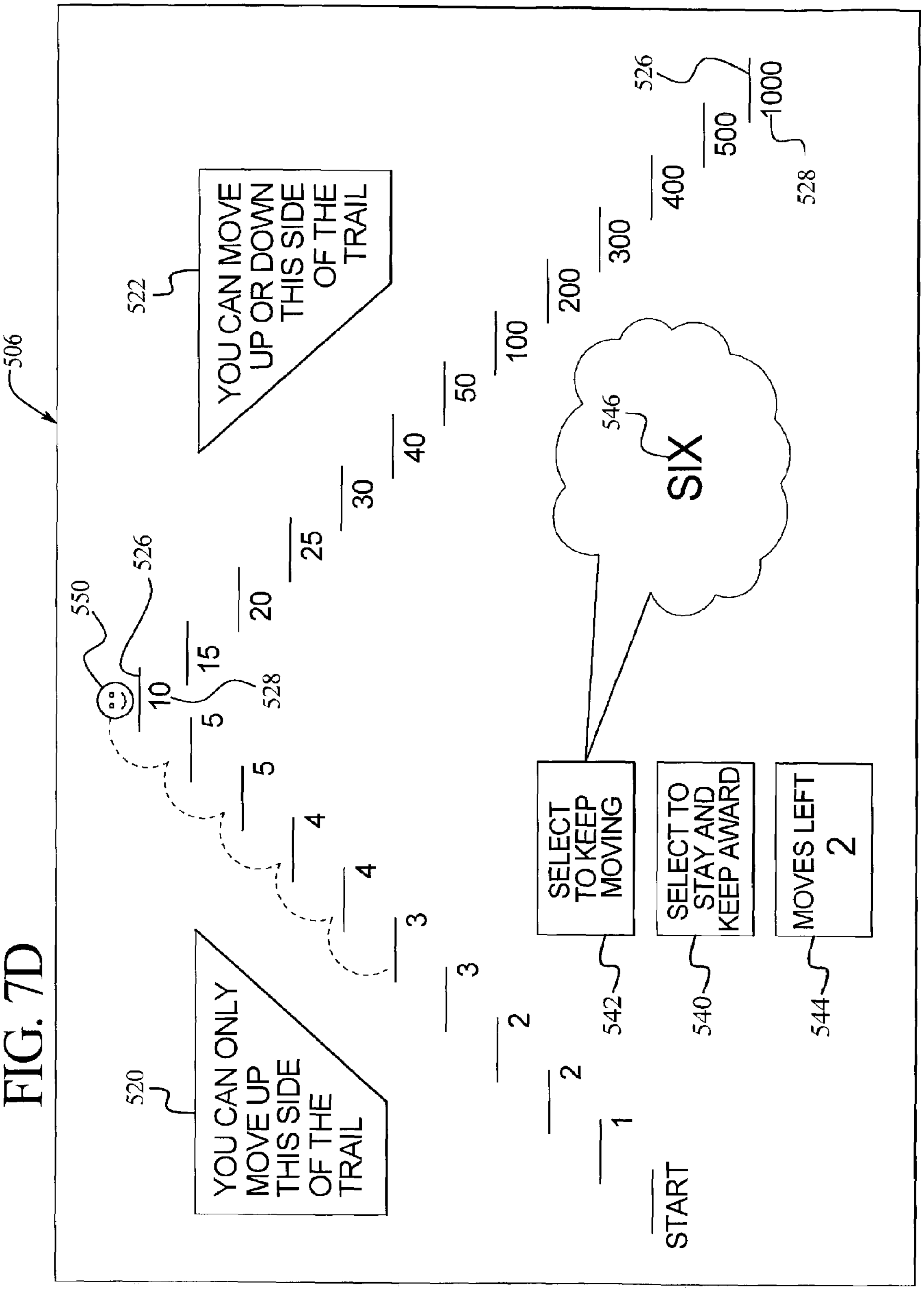

In the display 506 of FIG. 7D, after the player picks the keep moving button 542 a third time, the game generates a position change 546 of six from the memory device 40, but does not generate a plus/minus indicator 560. The marker 550 moves six positions 526 upward along the path of the offer display 518 so that the player's new award offer is ten. The moves remaining display 544 shows one less move. Since in this implementation, the uppermost position 526 is considered to be on the downhill side of the display 518, the player has to weigh the risk of picking the keep moving button 542 again. In alternative implementations as discussed below, the uppermost position 526 may be considered to be on the uphill side of the display 518 or as a separate range altogether in which the offer 528 always decreases, so that the player has to backtrack positions 526 to move past the top position.

Figure 7E:
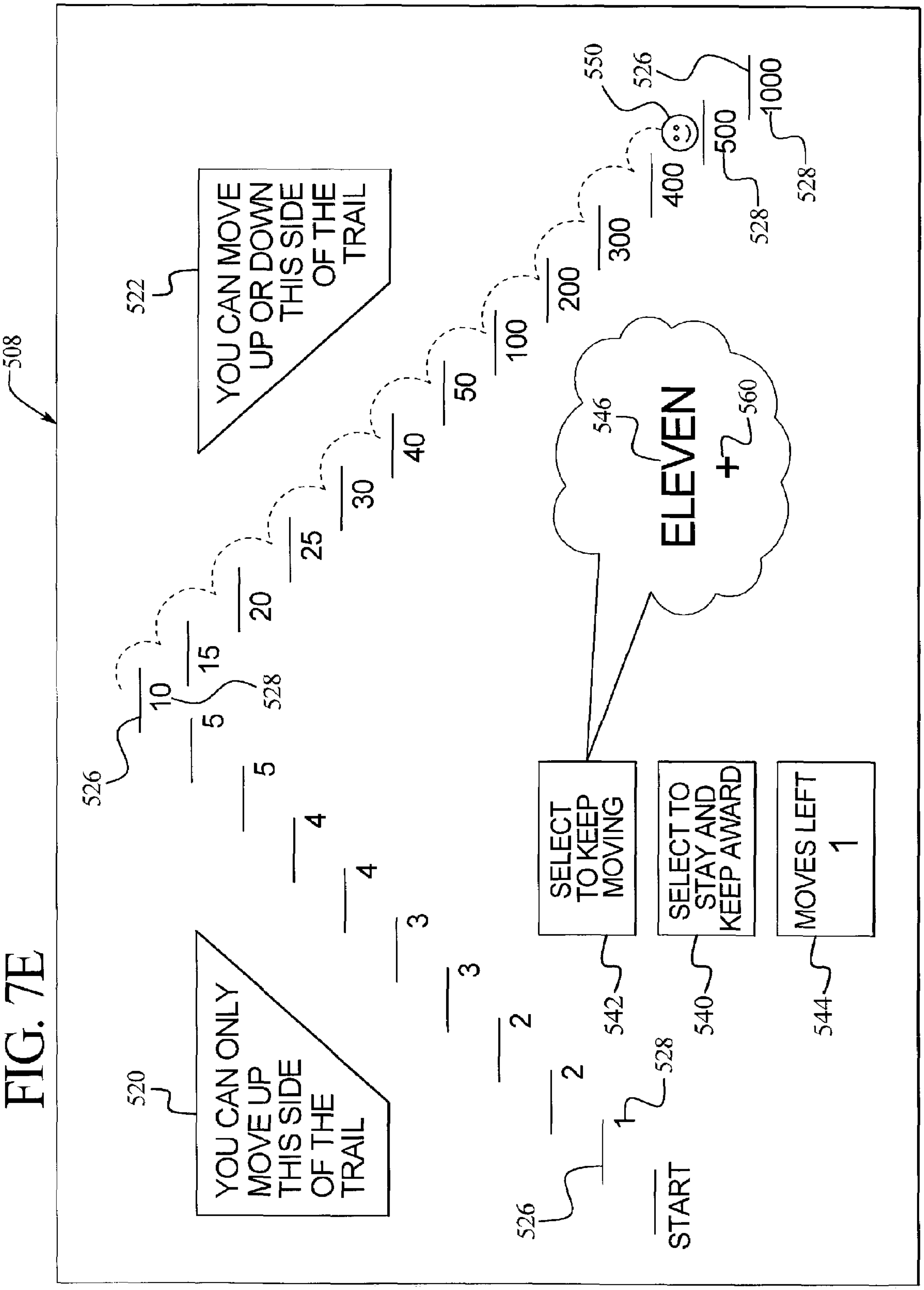

In the display 508 of FIG. 7E, after the player picks the keep moving button 542 a fourth time, the game generates a position change 546 of eleven from the memory device 40 and additionally generates the plus indicator 560. The marker 550, therefore, moves eleven positions downward, i.e., creating a positive change in the player's offer 528, which is now five hundred. If the game had generated a minus eleven position 526 change, the marker would move ten positions to the start position and stop.

Likewise, if the player generates a position change 546 that exceeds the last and most valuable position, e.g., corresponding to the one thousand offer 528, the game in one implementation just provides the last offer. Thus, in the player's current position 526 having an associated offer 528 of five hundred, any positive position change 546 results in the player's achievement of the highest offer 528. The moves remaining display 544 again shows one less move. Since in this implementation, the position 526 associated with the five hundred award 528 is on the downhill side of the display 518, the player again has to weigh the risk of picking the keep moving button 542.

In another implementation, the game may be adapted to weight the position moves 546 as a function of the player's current position 526. That is, the game has, e.g., one weighting system for when the player keeps moving after achieving one of the offers 528 fifteen through fifty and another weighting system for when the player keeps moving after achieving one of the offers 528 one hundred through five hundred. In this implementation, the offer plus/minus indicator 560 can be weighted to generate negative changes 546 more often than positive changes 546, and/or the changes 546 can also be weighted to generate higher numbers so that the game tends to set the player back further to a lesser position 526. In any of these weighting systems, the move changes 548 may be weighted as desired by the implementor.

Although one implementation for providing varying offer ranges has been illustrated, the varying offer ranges may be combined differently than as illustrated in FIGS. 7A to 7E. As described above, in one implementation, a third range having only decreasing offers is mixed in with one or more increase only and/or increase/decrease ranges. In another implementation, an increase/decrease range occurs first, followed by an increase only range. In another implementation, a decrease only range occurs at the end of the positions, so that the player must back up to try for a higher position. Any type of range may be adapted to include one, more than one or all of the positions 526, so that each position 526 in one implementation includes a different type of range. In any of these combinations, a positive and or negative move changes 548 may be included in the selection pool as desired by the implementor.

Referring now to FIGS. 8A through 8G, in another embodiment of the present invention the game is adapted to: (i) replace or modify a player's current offer with a higher award offer; (ii) replace or modify the maximum award offer with a higher maximum award offer; (iii) replace selected position changes with termination symbols or terminators; and (iv) enable the player to accept or reject each modified award offer. This modified award offer embodiment may be implemented with an award offer modification embodiment as illustrated in FIGS. 3A through 3J or with an award offer replacement embodiment as illustrated in FIGS. 4A through 4L. For purposes of this application, only an award offer replacement embodiment is illustrated and described below.

Figure 8A:
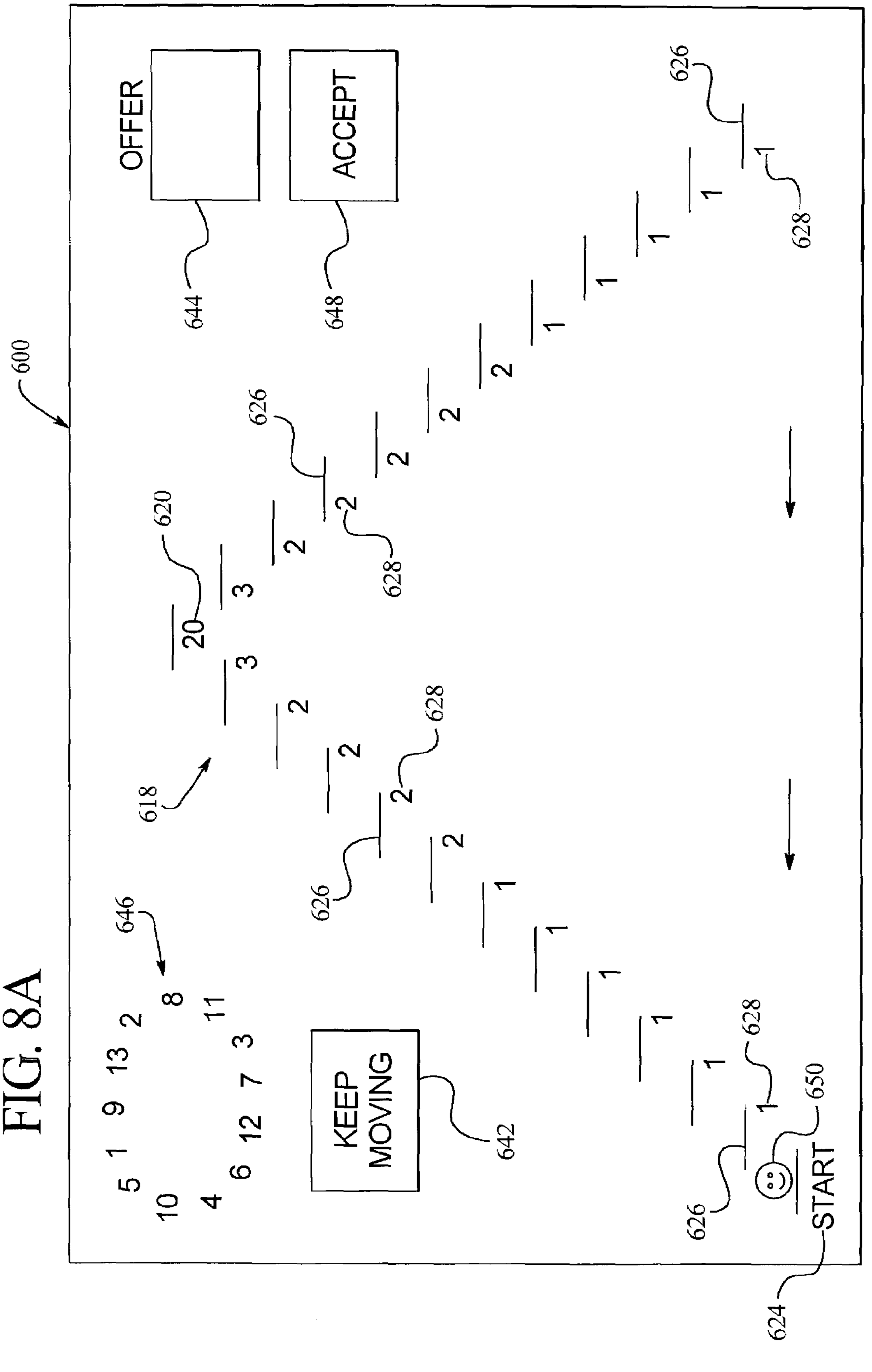
FIGS. 8A through 8G are front elevation views of the display of another embodiment of the improved award offer bonus scheme having a plurality of offers associated with a plurality of positions and a plurality of terminators associated with a plurality of position changes.

In FIG. 8A, the display 600 includes an award offers display 618 which has a plurality of ranks or positions 626 and a displayed award offer 628 associated with each rank or position. This examples provides twenty-four positions 626 and award offers 628 initially spanning from one to twenty. It should be appreciated that any suitable number of positions and award offers are contemplated by the present invention. As illustrated, the same award offer may be associated with two or more positions. In this embodiment, the display 600 includes an offer display 644 which displays the current award offer, an accept award offer indicator or button 648, and a reject award offer indicator or button 642 which have the functionality described above.

In one embodiment of the current invention, the award offer display 618 includes a trail or path having a marker 650 representing the player. The marker moves along as the player generates modified award offers. The illustrated trial includes an upward slope wherein the marker 650 moves upwardly toward a peak position associated with the maximum award offer 620 and a downward slope wherein the marker 650 moves downwardly. It should be appreciated that the maximum award offer 620 may be associated with any position of the trail, path or sequence. In this embodiment, the award offers associated with the plurality of positions increase up the upward slope and decrease down the downward slope. The slopes may be differentiated by different audio, visual or audiovisual messages.

In one embodiment of the present invention, the gaming device includes an area in the memory device 40 that stores one or more tables having a plurality of position changes 646 which are illustrated on the display 646. Each position change represents the number of positions along the award offer path or sequence 618 that the marker 650 will be moved. It should be appreciated that these position changes may or may not be display. It should also be appreciated that weighted probabilities may be associated with the position changes. At the initiation of the bonus scheme and when the player uses the reject award offer indicator 648, an input is sent to the processor 38, whereby the processor randomly selects one of the position changes 646. In the illustrated embodiment, the gaming device displays the plurality of position changes and indicates to the player the selected position change.

In this embodiment, upon the triggering of the bonus scheme, the gaming device randomly selects a position change from the plurality of position changes 646. The marker 650 is subsequently moved along the path the number of positions corresponding to the selected position change. After the gaming device has moved the marker 650 the number of positions corresponding to the selected position change, the selected position change is associated with a termination symbol or terminator. The player is offered the offer associated with the current position indicated by the marker as the players initial award offer. In one embodiment, the maximum award offer 620 is modified by combining the initial offer with the prior maximum award offer. The player may either accept or reject the initial award offer. If the player accepts the initial award offer, the gaming device provides the player the award offer, the player cannot obtain any more award offers and the bonus game ends. If the player rejects the award offer, the gaming device selects another position change. If the gaming device subsequently selects a position change with an associated termination symbol or terminator, the bonus game ends and the player may receive a consolation award. If the subsequently selected position change is not associated with a termination symbol or terminator, the marker is moved the number of positions corresponding to the selected position change. As described above, after the marker 650 is moved, the randomly selected position change is associated with a termination symbol or terminator. The players award offer is modified by combining the prior award offer with the offer associated with the markers current position. The maximum award offer 620 is further modified by combining the prior modified maximum award offer with the offer associated with the markers current position. The player may accept the modified award offer, thereby ending the bonus game or reject the modified award offer in an attempt to obtain a higher award offer or the maximum award offer. The game proceeds as described above until either the player obtains the maximum award offer or the gaming device selects a position change associated with a termination symbol or terminator. If the marker is moved to the peak position, the gaming device provides the player the maximum award offer, the player cannot obtain any more award offers and the bonus scheme ends.

Figure 8B:
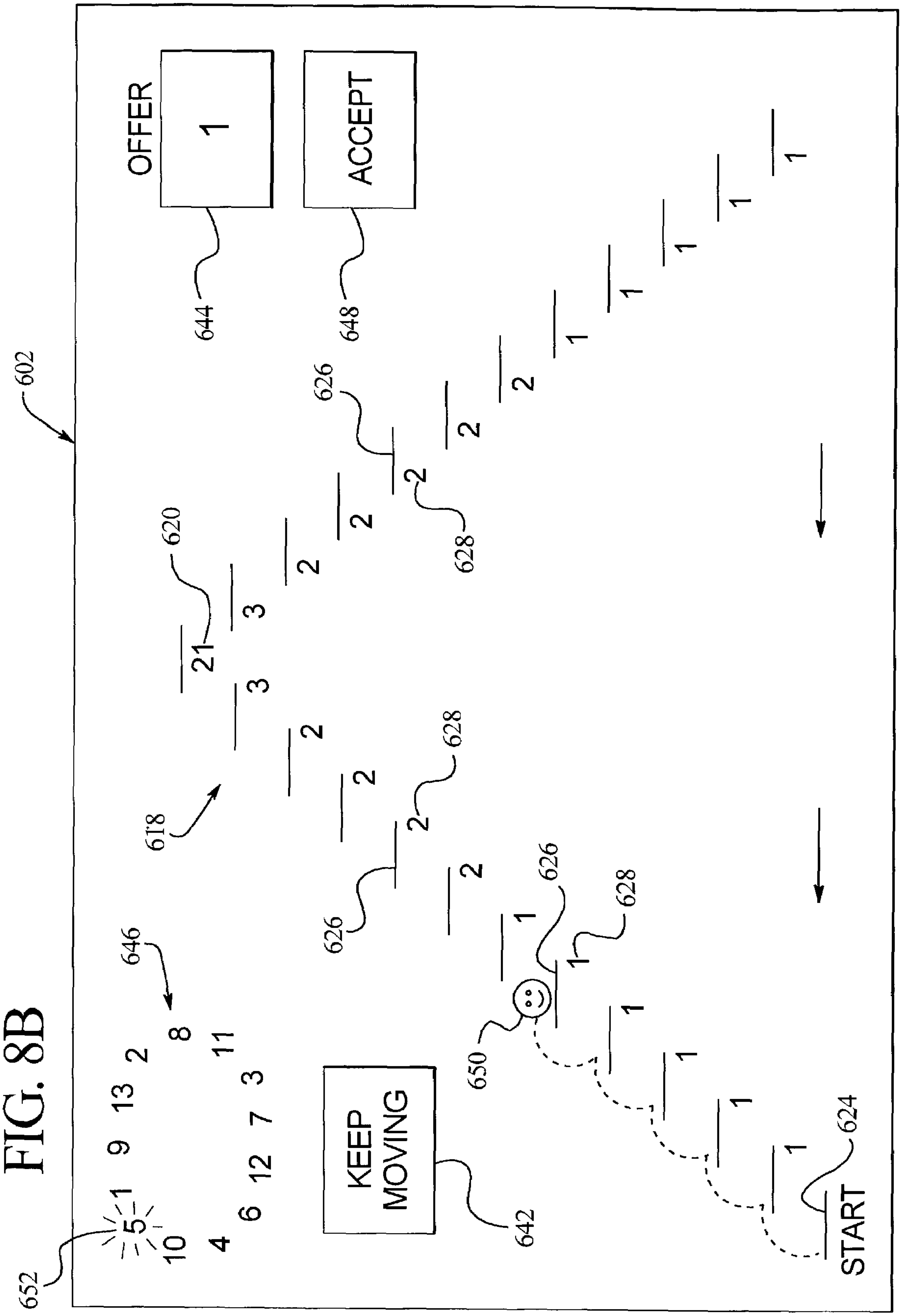

In one example, as illustrated in the display 600 of FIG. 8A, the player begins at the start position 624. In the display 602 of FIG. 8B, upon the initiation of the bonus scheme, the gaming device randomly selects a position change of five 652 from the plurality of position changes 646. The marker 650 moves five positions upward along the path of the offer display 618 so that the player's initial award offer is one as illustrated in FIG. 8B. The initial award offer is indicated in the award offer amount display 644. The maximum award offer 620 is modified by combining the players initial award offer with the initial maximum award offer. As illustrated in FIG. 8B, the maximum award offer is modified to twenty-one by combining the players initial award offer of one with the initial maximum award offer of twenty. Furthermore, as described above, the position change of five positions is associated with a termination symbol or terminator 654 for subsequent position change selections. In an alternative embodiments, the maximum award offer does not have to be modified, the modification could be randomly determined or could be modified based on number of moves.

In this embodiment, the player may either accept the initial award offer using the accept indicator 648 or reject the initial award offer using the reject award indictor 642. In an alternative embodiment the player is not able to accept the initial award offer. In this embodiment, the gaming device will automatically select another position change and the game will proceed as described above. In another embodiment, the gaming device automatically rejects any award offer if subsequent or potential award offers are at least of an equal value to the initial award offer.

Figure 8C:
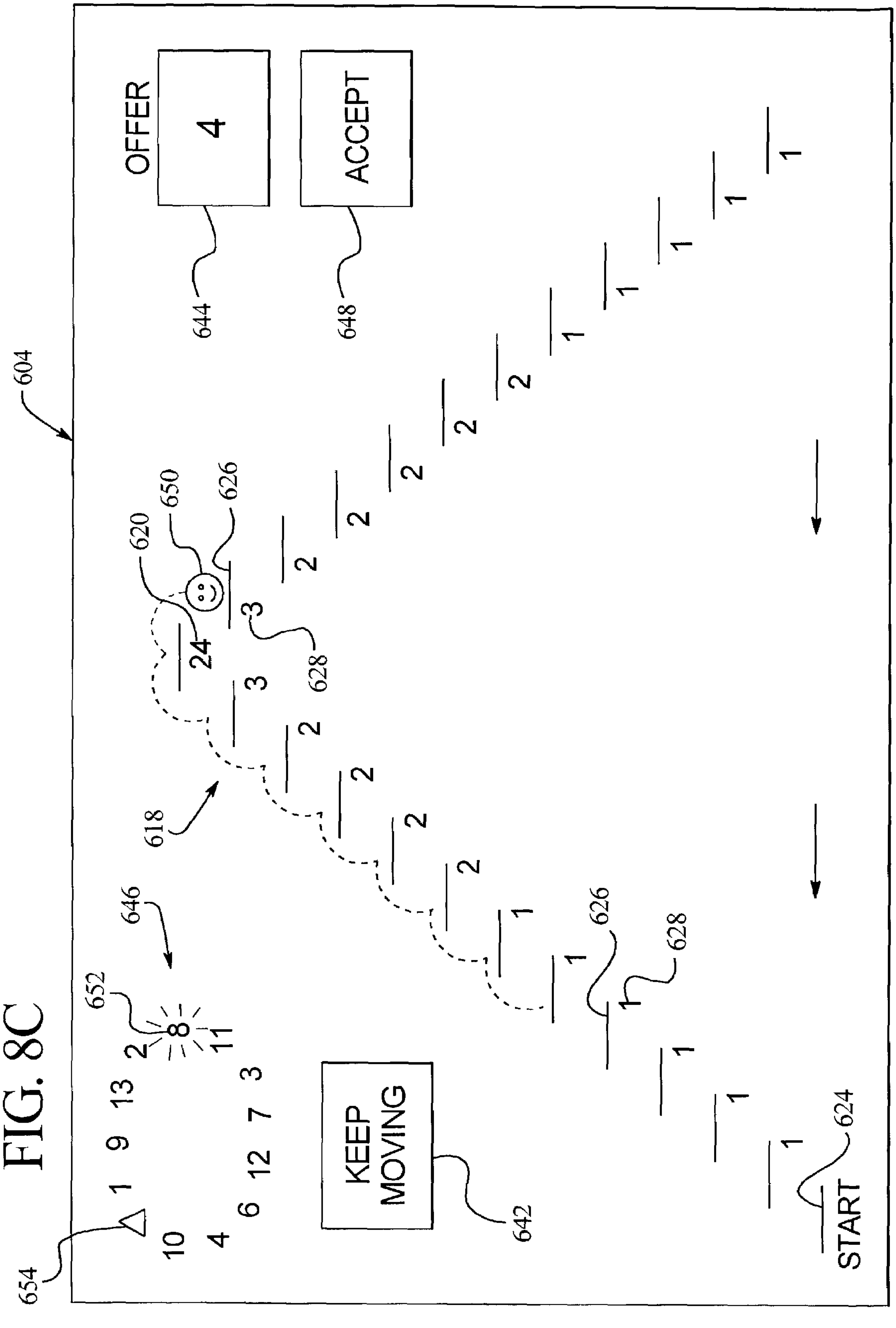

Referring to the display 604 of FIG. 8C, upon the player using the reject indicator 642 to reject the initial award offer, the gaming devices randomly selects another position change from the plurality of position changes 646. The gaming device randomly selected the position change of eight 652. The marker 650 moves eight positions upward along the path of the offer display 618 over the peak position and downward along the path to a position with an associated award offer of three. As described above, the position change of eight is associated with a termination symbol or terminator for subsequent position change selections. It should be appreciated that the prior selected position change remains associated with a termination symbol or terminator. The player's award offer is modified to four by combining the prior award offer of one with the award offer of three associated with the markers current position. The gaming device displays the modified award offer 644. The maximum award offer 620 is also modified to twenty-four by combining the prior maximum award offer of twenty-one with the award offer of three associated with the markers 650 current position. The player may either accept or reject the modified award offer of four as described above.

Figure 8D:
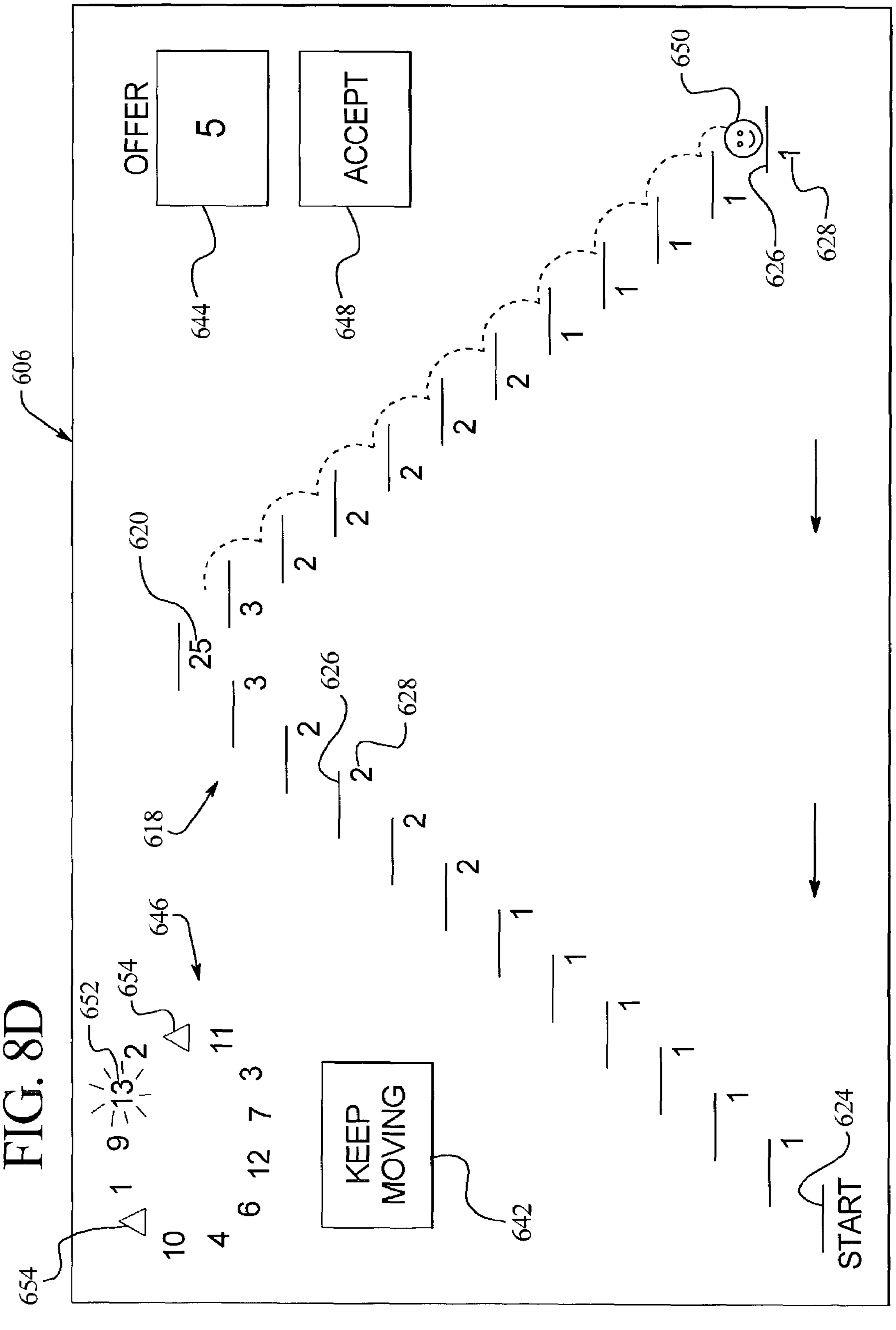

As seen in the display 606 of FIG. 8D, using the reject indicator 642, the player rejected the modified award offer. The gaming device randomly selected another position change from the plurality of position changes. The gaming devices selects the position change of thirteen 652, and the marker 650 is moved thirteen positions downward along the path of the offer display to a position with an associated award offer of one. The position change of thirteen is associated with a termination symbol or terminator for subsequent position change selections. The players award offer is modified to five by combining the prior award offer of four with the current award offer of one. The offer display 644 displays the new modified award offer. The maximum award offer 620 is also modified to twenty-five by combining the prior maximum award of twenty-four with the current award offer of one.

Figure 8E:
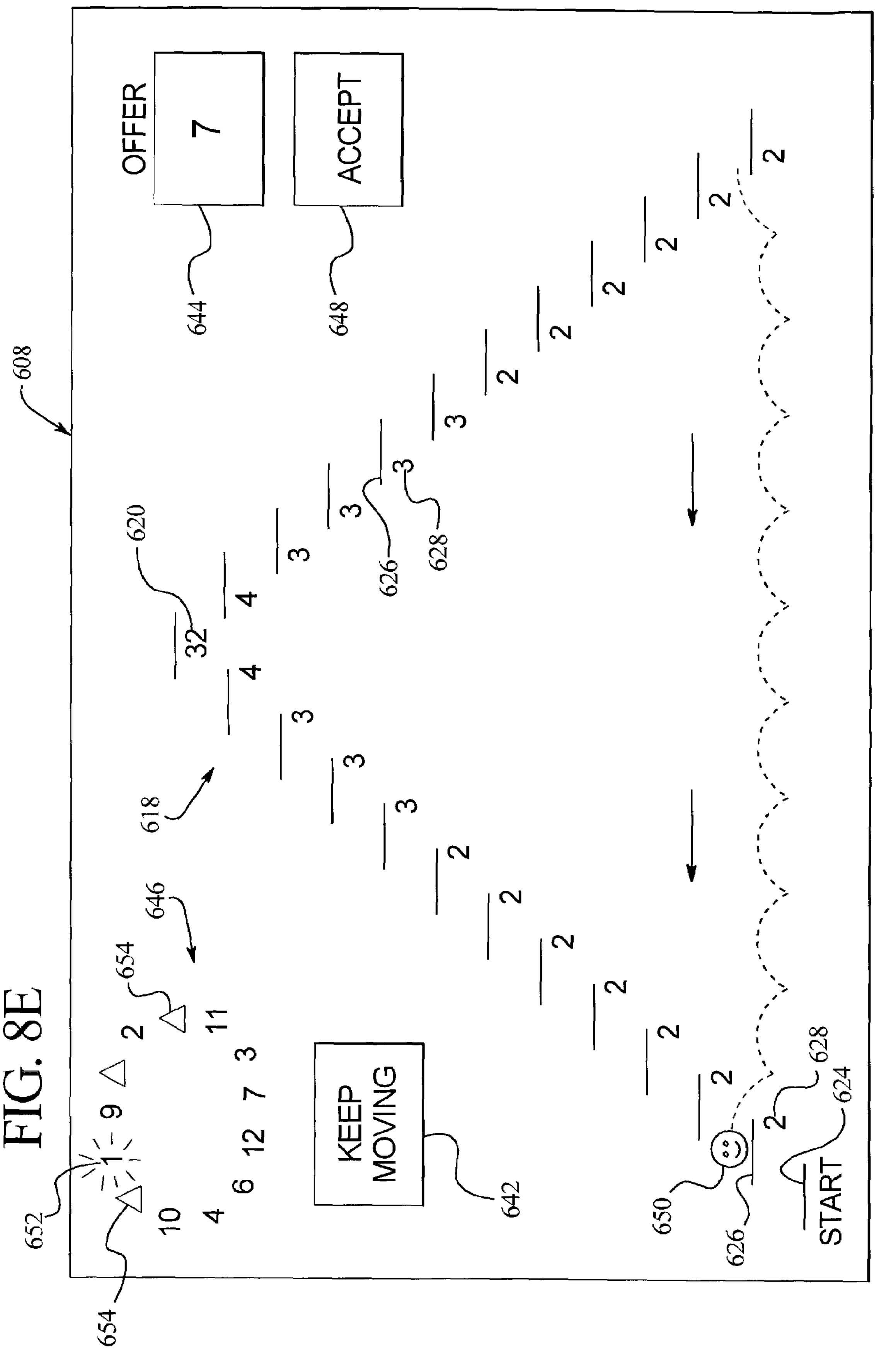

As illustrated in the display 608 of FIG. 8E, the player chose to reject the award offer of five. Accordingly, the gaming device randomly selected the position change of one. Having completed the download slope of the path of the offer display 618, the marker 650 circles back to the upward slope of the path. The position change of one is associated with a termination symbol or terminator for subsequent position change selections.

In one embodiment, for completing one cycle of the offer display path the award offers 628 associated with each position on the path are modified. In this embodiment, the award offers associated with the non-peak positions increase by one, and the maximum award offer associated with the peak position increased by five to thirty. It should be appreciated that the award offer associated with each position may be randomly increased or increased according to some pre-determined mathematical formula. In an alternative embodiment, the award offers associated with a plurality of positions may increase. In another embodiment, the offers associated with a plurality of positions may increase, decrease, remain the same or any combination thereof.

As illustrated in FIG. 8E, the award offer associated with marker's new position 626 is two. Accordingly, the player's award offer is further modified to seven by combining the prior modified award offer of five with the current award offer of two. The offer display 644 reflects this modification. Additionally, the maximum award offer 620 is further modified to thirty-two by combining the prior modified maximum award offer of thirty with the current award offer of two. The player may either accept or reject the award offer of seven as described above.

Figure 8F:
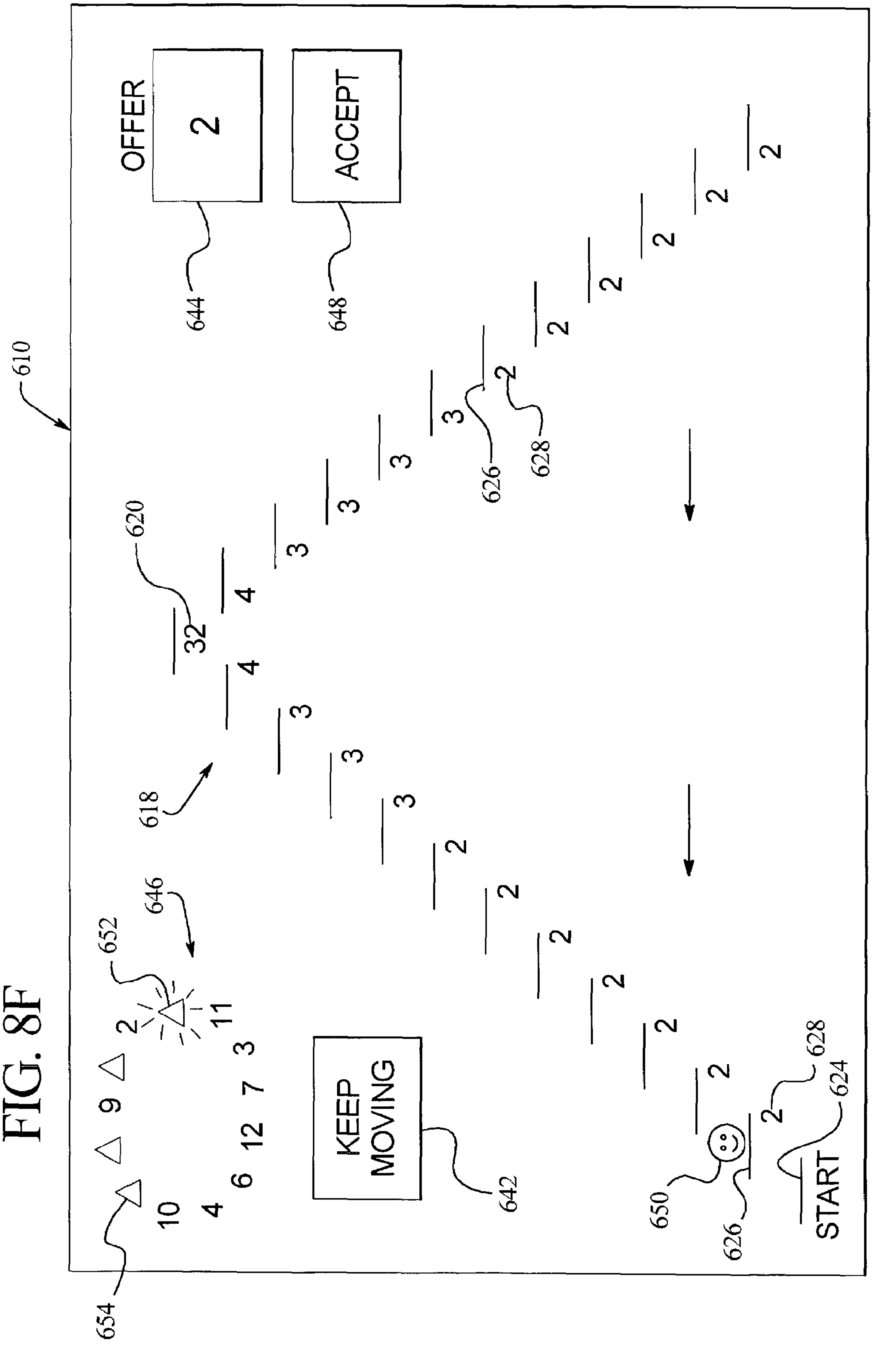

As seen in display 610 of FIG. 8F, the player rejected the award offer of seven and the gaming device randomly selected another position change. The selected position change is associated with a termination symbol or terminator 654 and the bonus game ends. In this embodiment, with the selection of a position change with an associated termination symbol or terminator, the player receives a consolation prize of two credits.

Figure 8G:
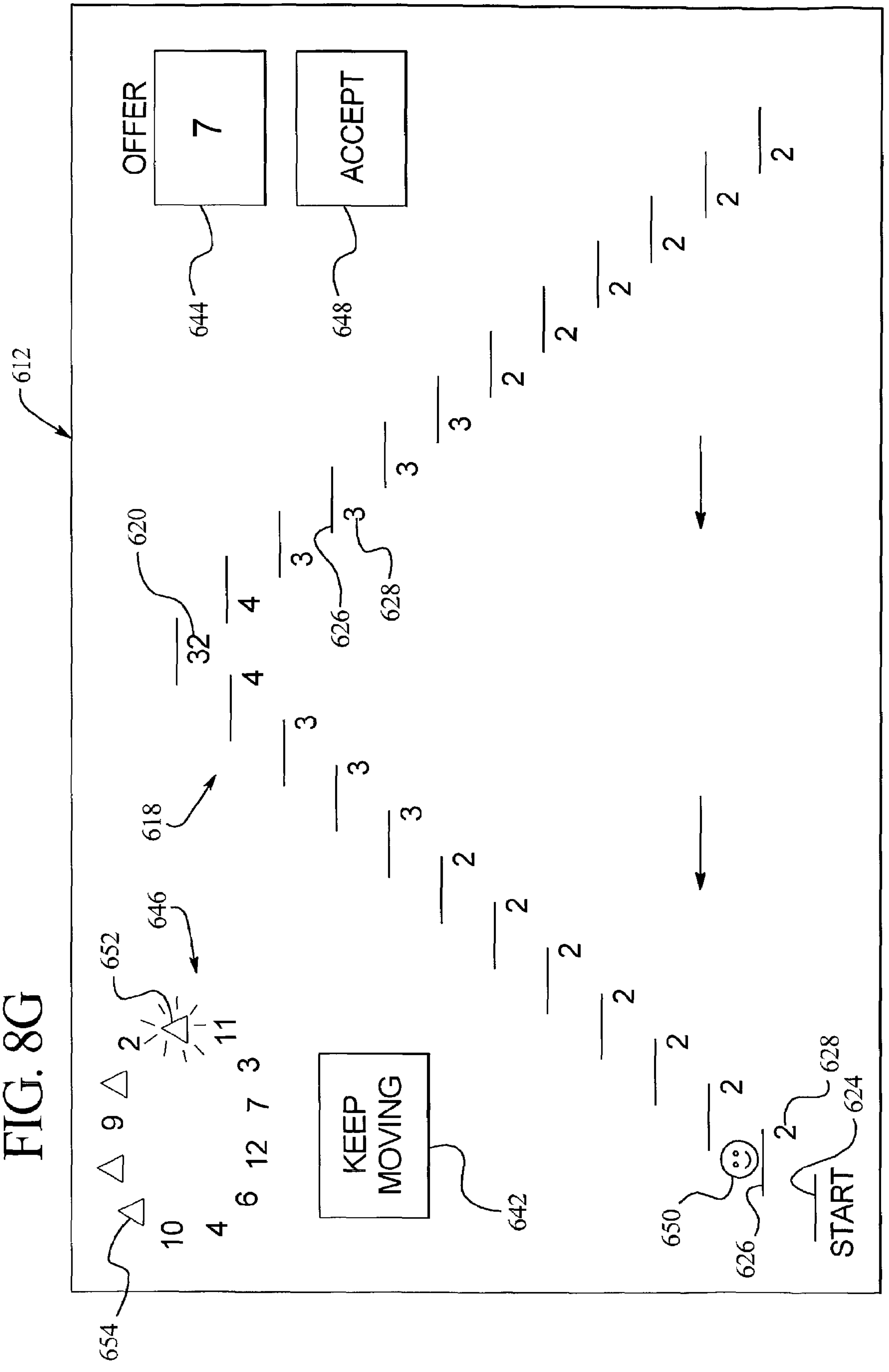

In an alternative embodiment, when a position change with an associated termination symbol or terminator is selected, the bonus game ends and the player obtains no award. In another embodiment, the player obtains the award offer associated with the marker's 650 last position. In another embodiment, as illustrated in FIG. 8G, the player obtains the last modified award offer, in this case seven. In this embodiment, since the player does not risk losing a modified award offer by the selection of a termination symbol or terminator, the player is motivated to continue rejecting award offers until either a terminator symbol is obtained or the maximum award offer is obtained.

Referring to FIGS. 9A through 9D, in an alternative embodiment of the present invention, when the player rejects the offer associated with the markers current position 626, the rejected position is associated with a termination symbol or terminator. In this embodiment, if the marker is subsequently moved to a prior visited position with an associated termination symbol or terminator, the bonus game ends. The additional feature of this embodiment provides increased risks and entertainment to the player because the player must avoid termination symbols or terminators not only in the plurality of position changes but also on the path of award offers itself.

Figure 9A:
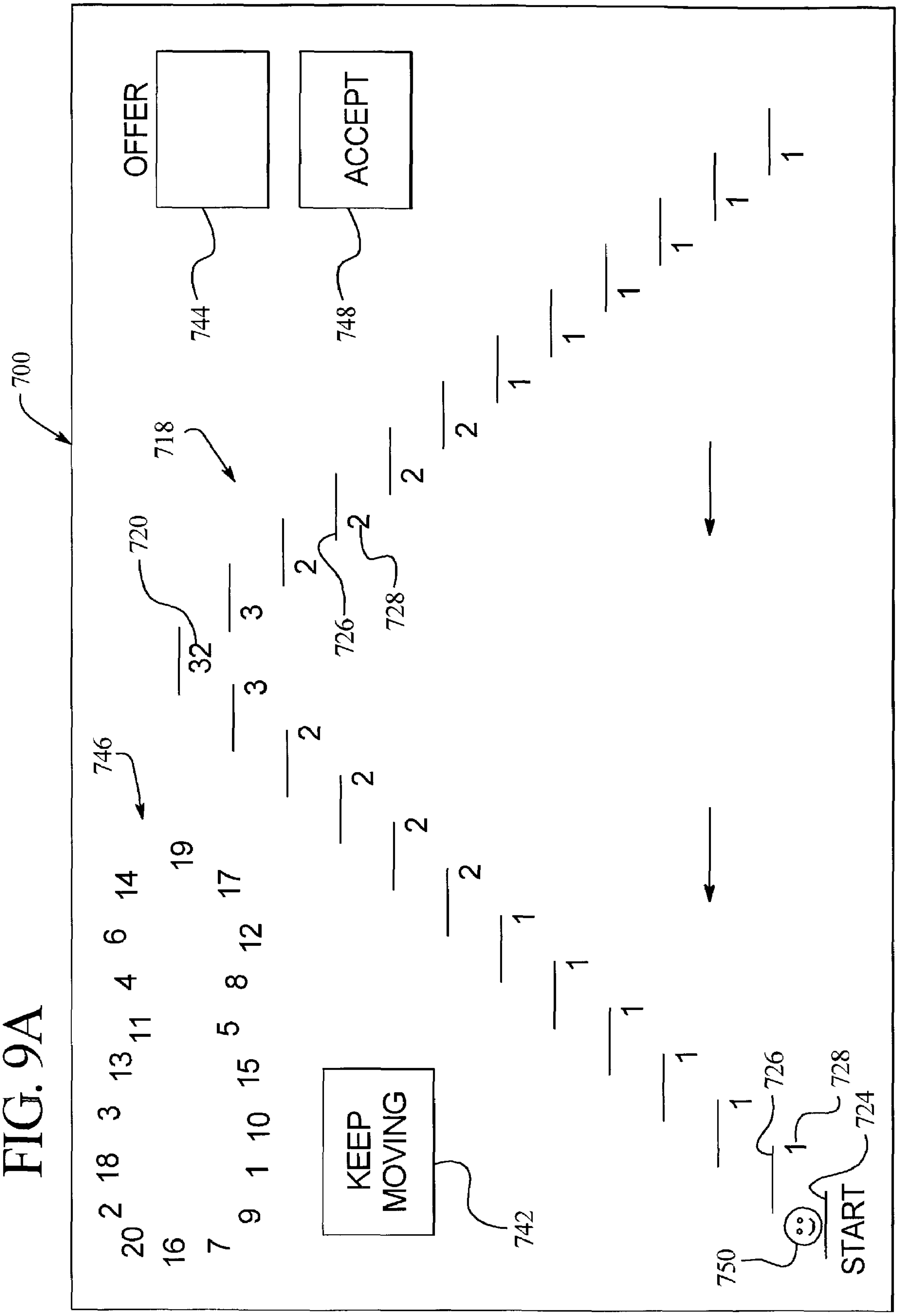
FIGS. 9A through 9D are front elevation views of the display of another embodiment of the improved award offer bonus scheme having a plurality of terminators associated with a plurality of position changes and a plurality of positions.
Figure 9B:
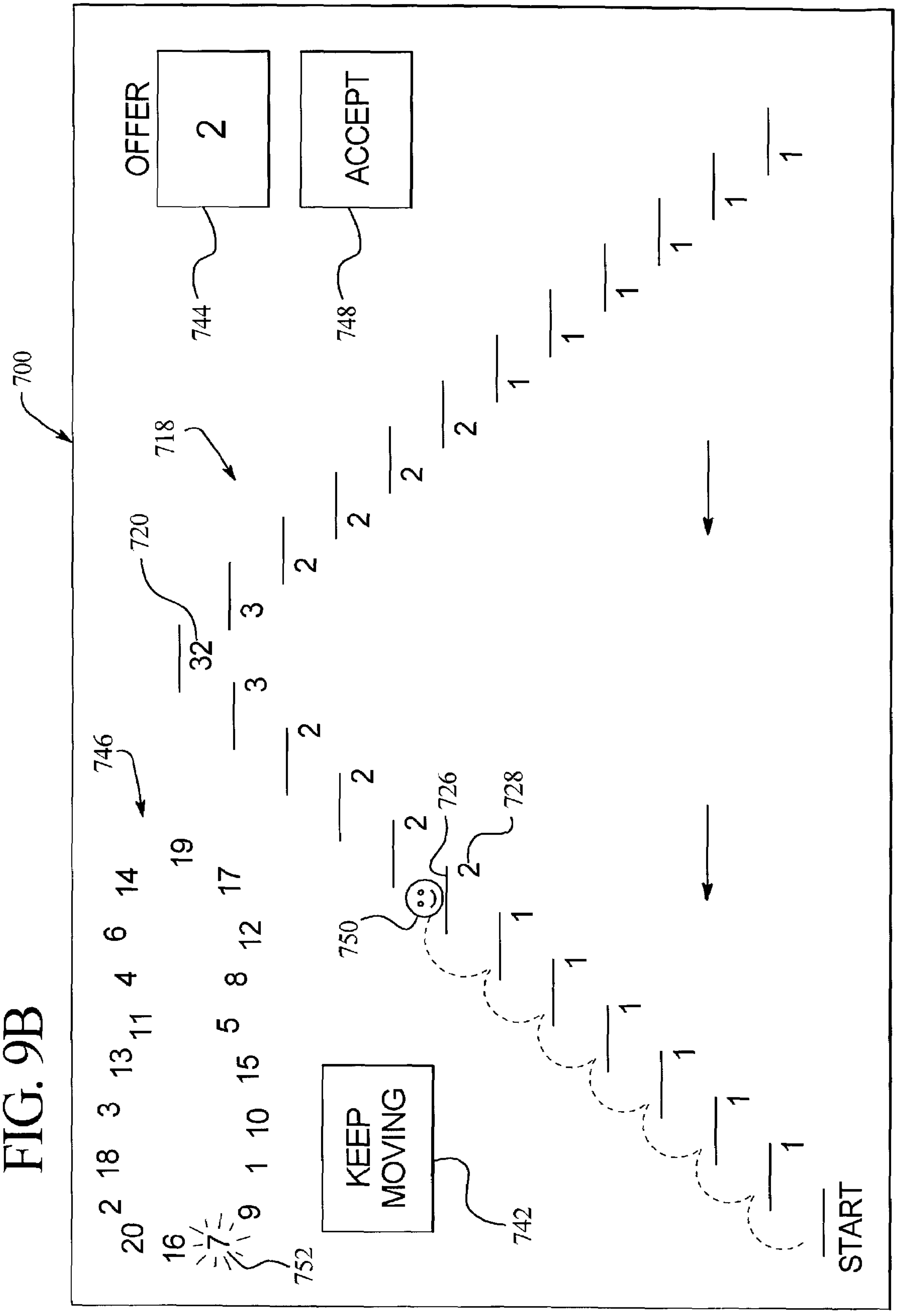

Referring now to FIG. 9A, upon the initiation of the bonus scheme, as described above, the gaming device randomly selects the position change of seven. Accordingly, the marker 750 moved from the start position, upward along the path of the offer display 718 to a position seven moves away as illustrated in FIG. 9B. The selected position change of seven is associated with a termination symbol or terminator. The award offer of two associated with the seventh position of the offer display 718 is the players initial award offer. The award offer of two is displayed in the award offer display 744. The maximum award offer 720 is modified to twenty-two by combining the initial maximum award offer of twenty with the players initial award offer of two. As described above, the player may either accept or reject the initial award offer.

As also illustrated in FIG. 9B, the initial award offer is rejected. As described above, the gaming device selects another position change from the plurality of position changes and, if no termination symbol or terminator is selected, moves the marker 750 the corresponding number of positions on the path of the offer display. After the marker 750 is moved, the prior visited position is associated with a termination symbol or terminator. Accordingly, as illustrated in FIG. 9C, the seventh position on the path is no longer associated with an award offer of two, but is now associated with a termination symbol or terminator 756.

Figure 9C:
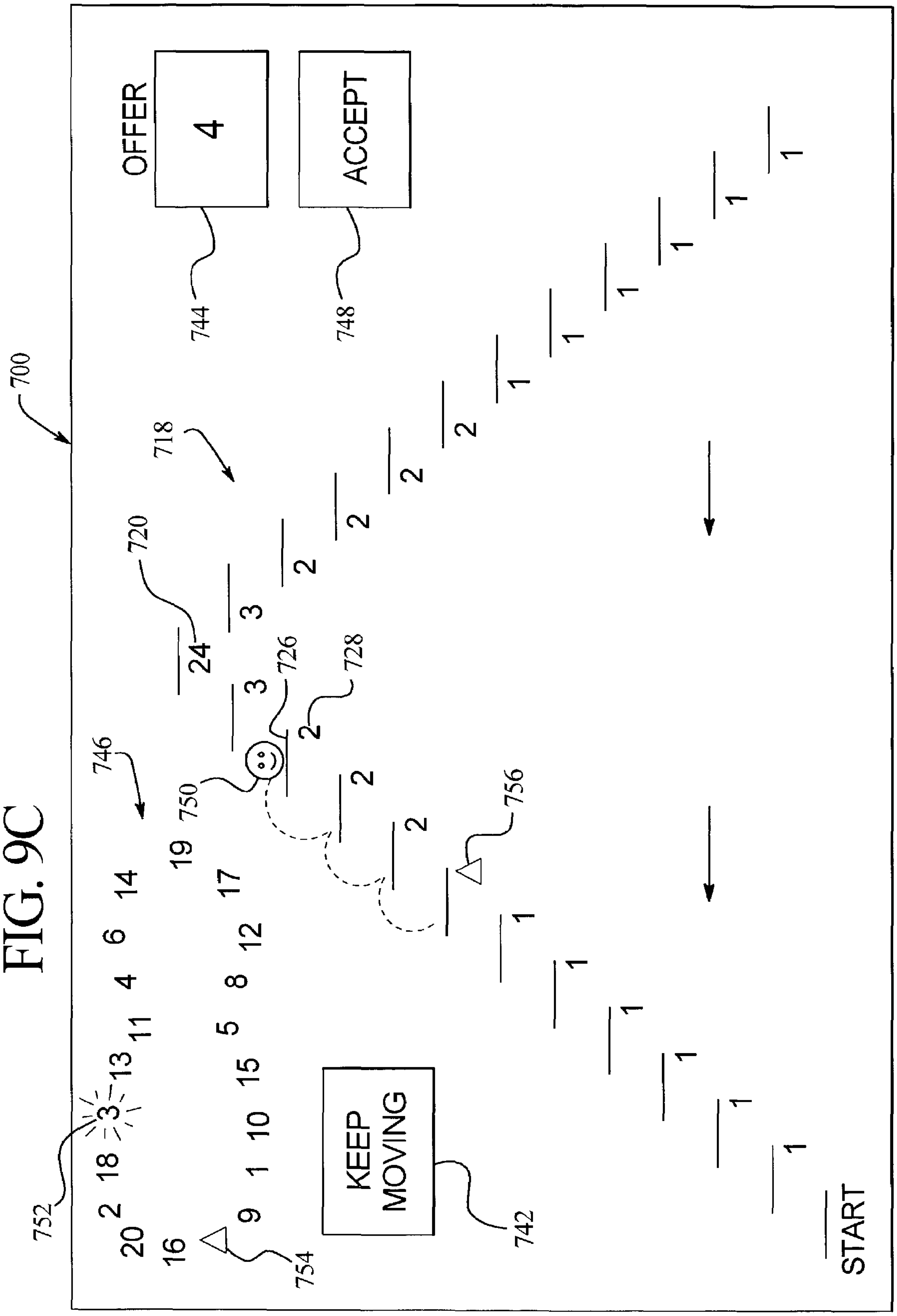

As illustrated in FIG. 9C, the gaming device selected a position change of three and the marker 750 moved three positions upward along the path to the tenth position of the offer display. The tenth position is associated with an award offer of two. As described above, the player's initial award offer is modified to four by combining the prior award offer of two with the current award offer of two. The modified award offer is displayed in the award offer display. Additionally, the maximum award offer 720 is modified to twenty-four as described above. The player may either accept or reject the modified award offer. In this case, the player rejects the modified award offer and the gaming device randomly selects another position change. A terminator becomes associated with the markers 750 prior visited position.

Figure 9D:
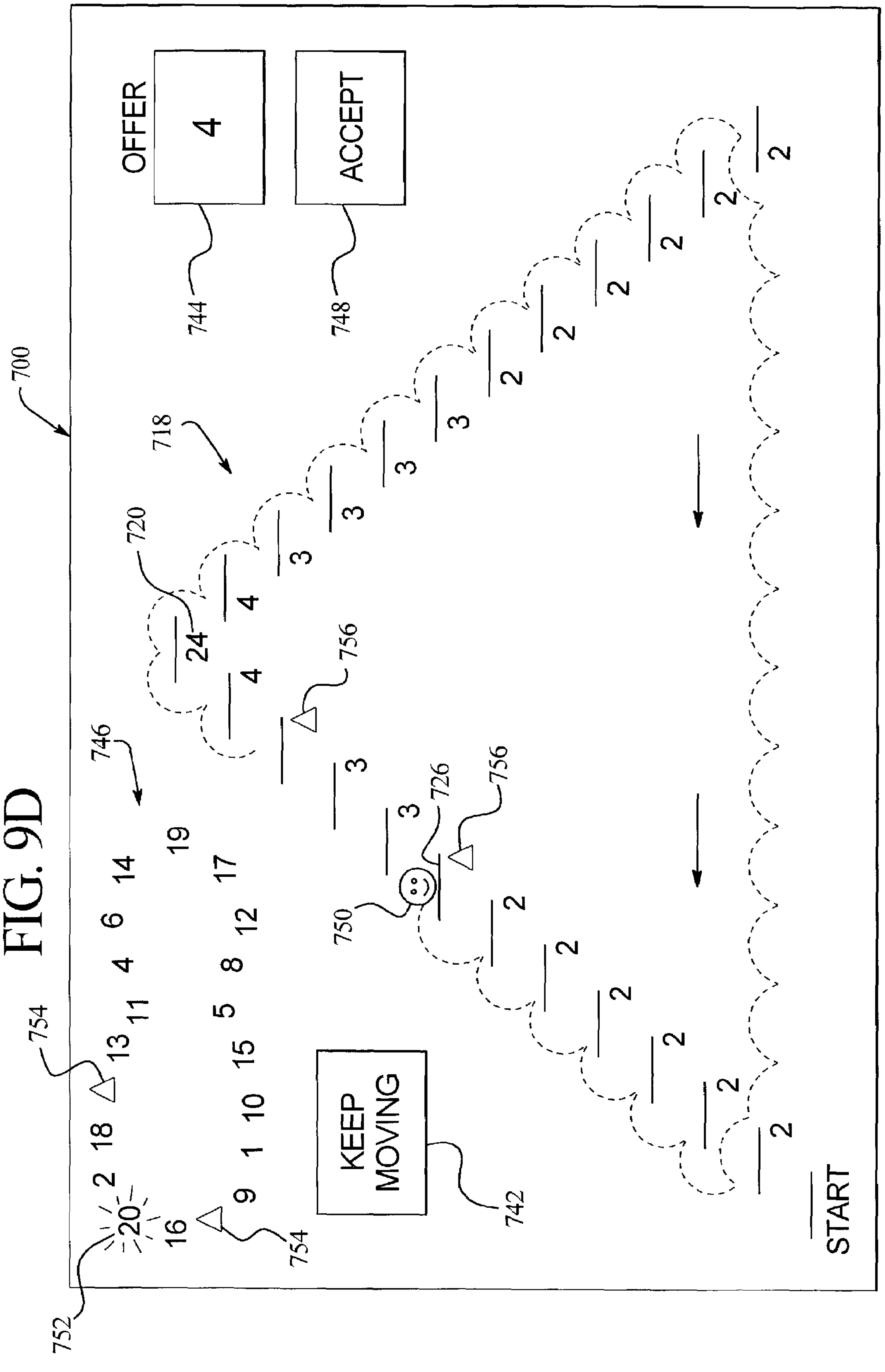

As illustrated in FIG. 9D, the gaming device randomly selected the position change of twenty and the marker was moved twenty positions. As described above, as the player completes one cycle of the award offer path, the offer amount associated with each position is increased. It should be appreciated that the increase in the associated offer amount has no effect on the positions that have become associated with termination symbols or terminators. As illustrated in FIG. 9D, the position the marker 750 landed on had an associated termination symbol or terminator and the bonus game ends. In this embodiment, the player obtains the last modified award offer.

Figure 10A:
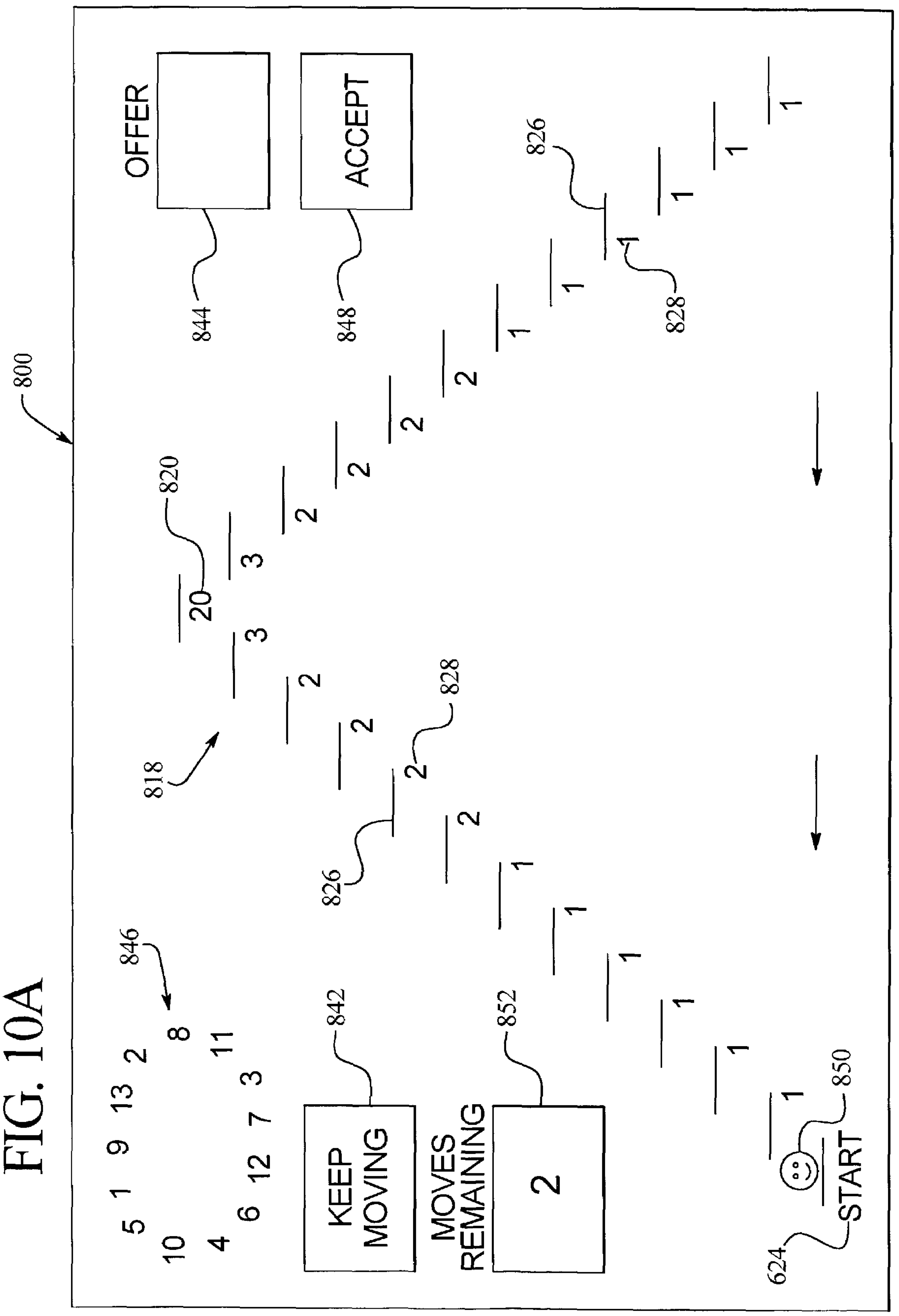
FIGS. 10A through 10B are front elevation views of the display of another embodiment of the improved award offer bonus scheme having offer ranges in which the number of offer replacements or modifications changes when the offer enters a different range.

Referring to FIG. 10A, in another embodiment of the present invention, the gaming device provides the player a plurality of marker moves. Each marker move represents one time the player may move the marker along the path to a new position. The number of marker moves remaining is displayed in the moves remaining indicator 852. In this embodiment, each time the player rejects a current award offer, the marker moves remaining is decreased by one. If the player has no marker moves remaining, then the gaming device provides the last modified offer, the player cannot obtain any more offers and the bonus game terminates. It should be appreciated that in this embodiment, the bonus game terminates when either the player accepts an award offer, the player obtains the maximum award offer, or the player has no marker moves remaining.

Figure 10B:
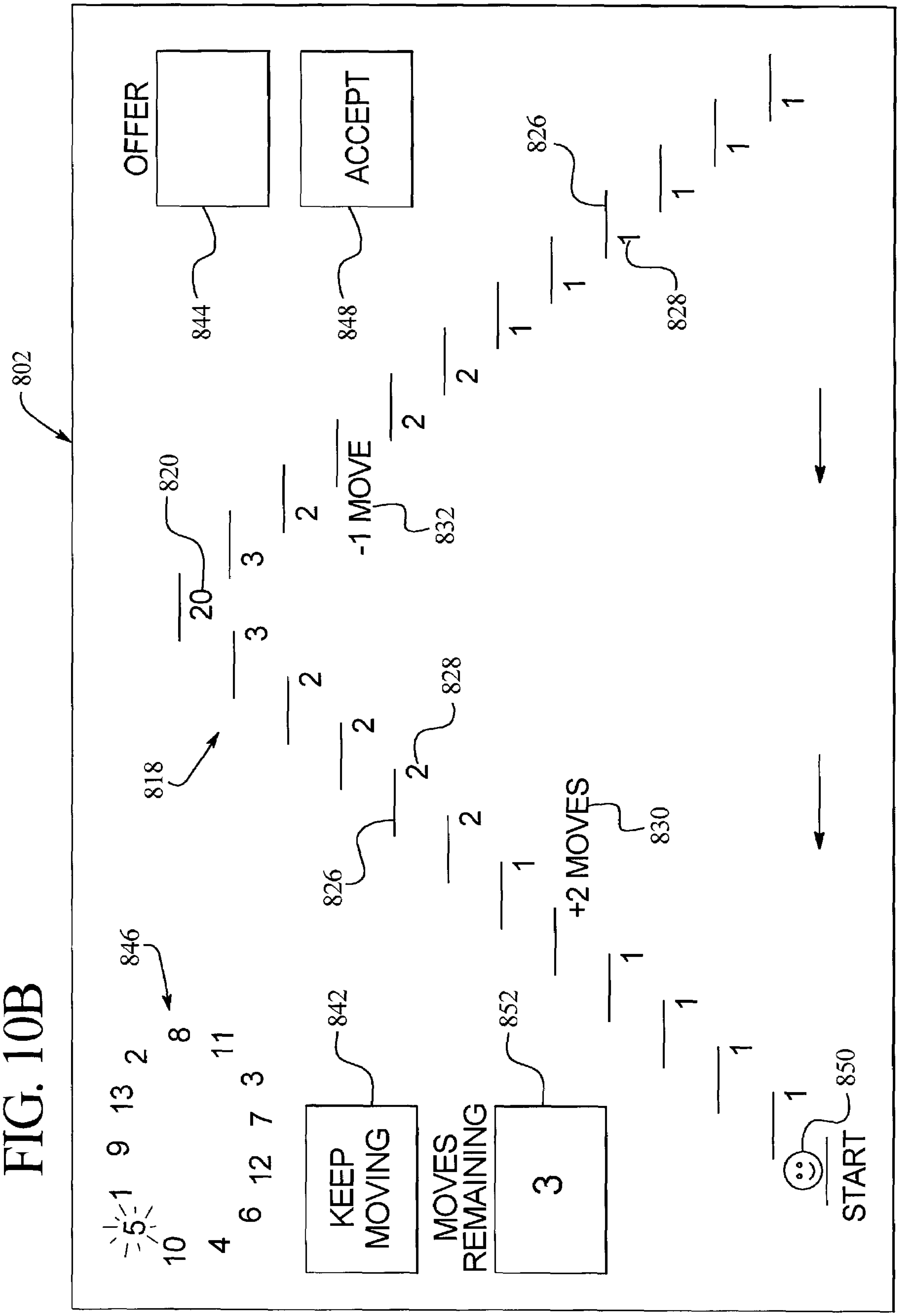

In a further embodiment including marker moves, as illustrated in FIG. 10B, a plurality of positions are associated with a plurality of move changes that modify the number of remaining marker moves. The modified number of marker moves is displayed in the moves remaining indicator. It should be appreciated that the move changes, if any, associated with each position may be masked or displayed to the player. If the move change is masked, then the move change is revealed when the marker is moved to that position. In this embodiment, the positions are separated into two ranges. The first range begins at the marker start position and proceeds up the upward slope of the path and ends at the peak position. The second range includes positions on the downward slope of the path. In this embodiment, the plus move changes 830 are associated with the positions from the first range and the minus move changes 832 are associated with the positions from the second range. In an alternative embodiment, the minus move changes 832 are associated with positions from the first range and the plus move changes 830 are associated with the positions from the second range. In an alternative embodiment, plus move changes 830 and minus move changes 832 may be associated with positions from either range. In this embodiment, if the marker current position is associated with a move change, the players number of moves remaining is modified according to the associated move change.

In a further alternative embodiment of the present invention, a reverse could be associated with one or more of the positions. If the marker lands on a position having an associated reverse, the direction of the marker movements changes or reverses.

Residual Points and Residual Picks

Figure 11A:
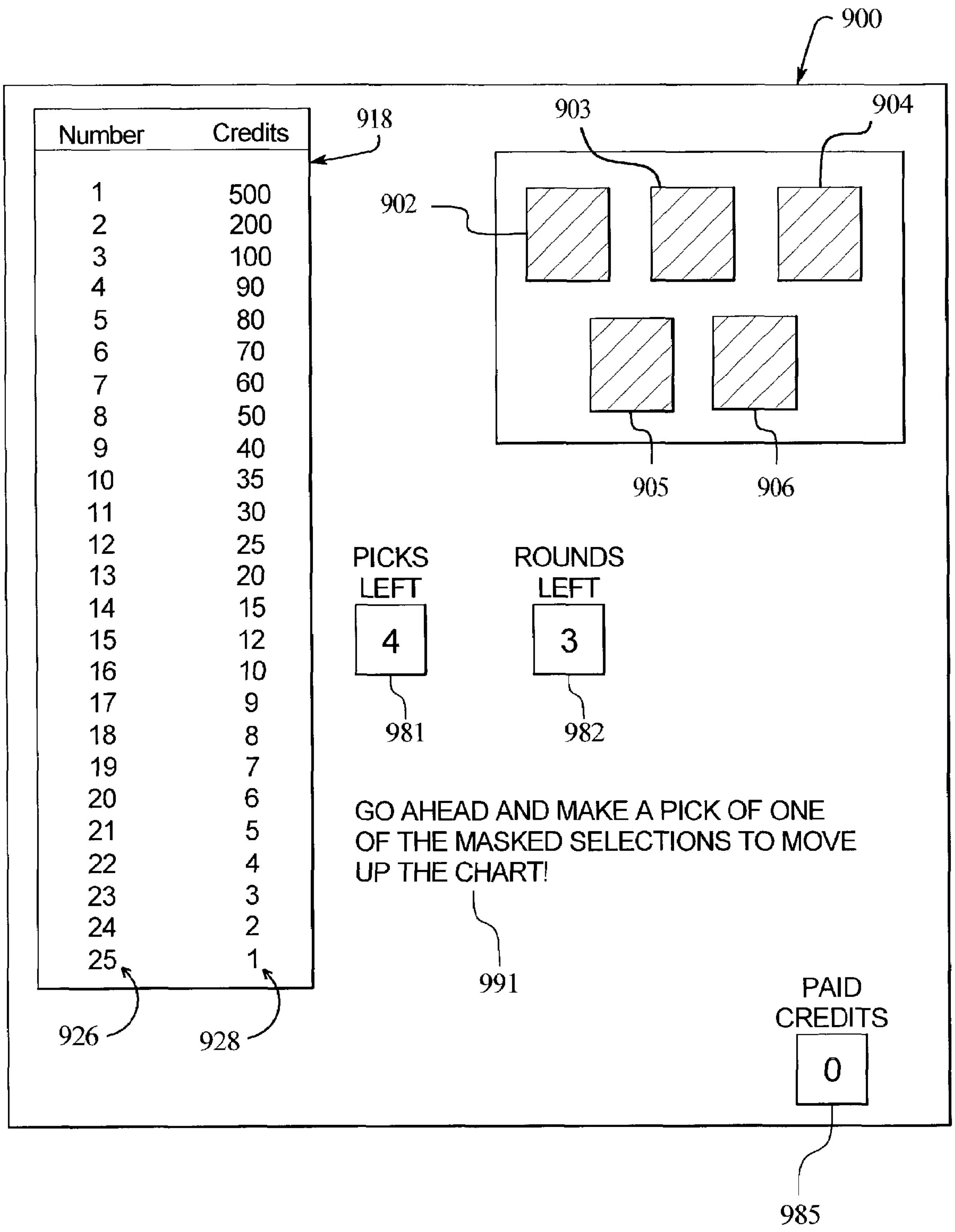
FIGS. 11A through 11O are front elevation views of the display of one embodiment of the present invention illustrating the carryover of residual points to another round of the bonus game.

Referring now to FIGS. 11A though 11V, one embodiment of the present invention includes carrying residual award upgrade points over from one round of the bonus game to another or different round. In this embodiment, the bonus scheme includes a number of rounds, such as four rounds, and each round allows a number of picks, such as four picks, by the player. Any suitable number of rounds and picks may be employed. In one embodiment, a player's advancement to the next round may be conditioned upon the attainment of a designated position, e.g., the first or ultimate position, during the previous round. Alternatively, the advancement to the next round may be automatic after the player has completed a number of picks in the round.

It is contemplated that the gaming device may generate an initial position in each round automatically at random without an input by the player. Gaming device alternatively generates an initial position depending on an input by the player or generates an initial position depending on the outcome of a preceding round. The initial position in a subsequent round can also be effected by an outcome of any one, some or all of the preceding rounds. In an alternative embodiment, the starting position can be fixed or predetermined or otherwise suitably determined. For instance, the starting position could be based on the player's wagers in a primary game.

Figure 11B:
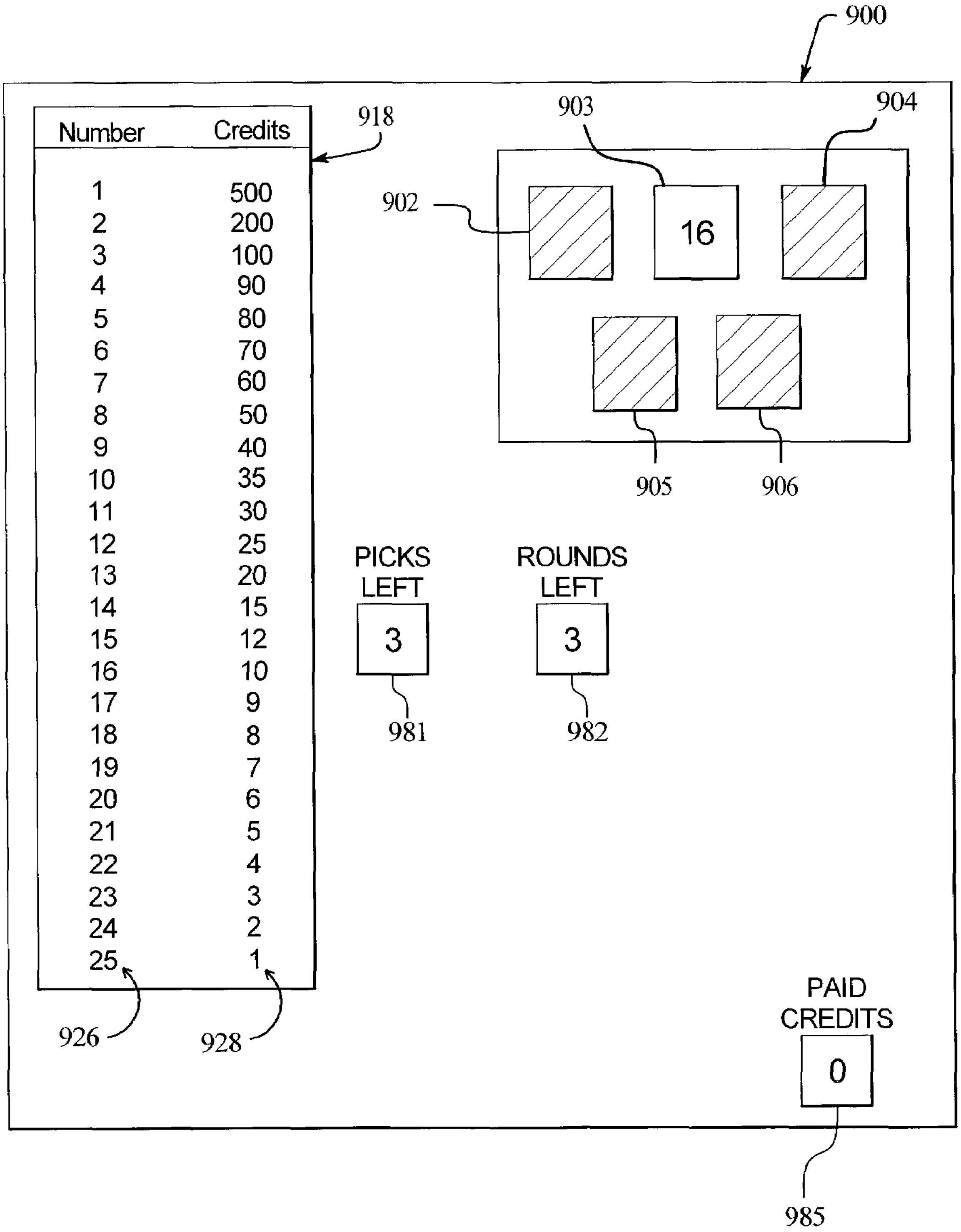
FIGS. 11P through 11V are front elevation views of the display of another embodiment of the present invention illustrating the carryover of residual picks to another round of the bonus game.
Figure 11C:
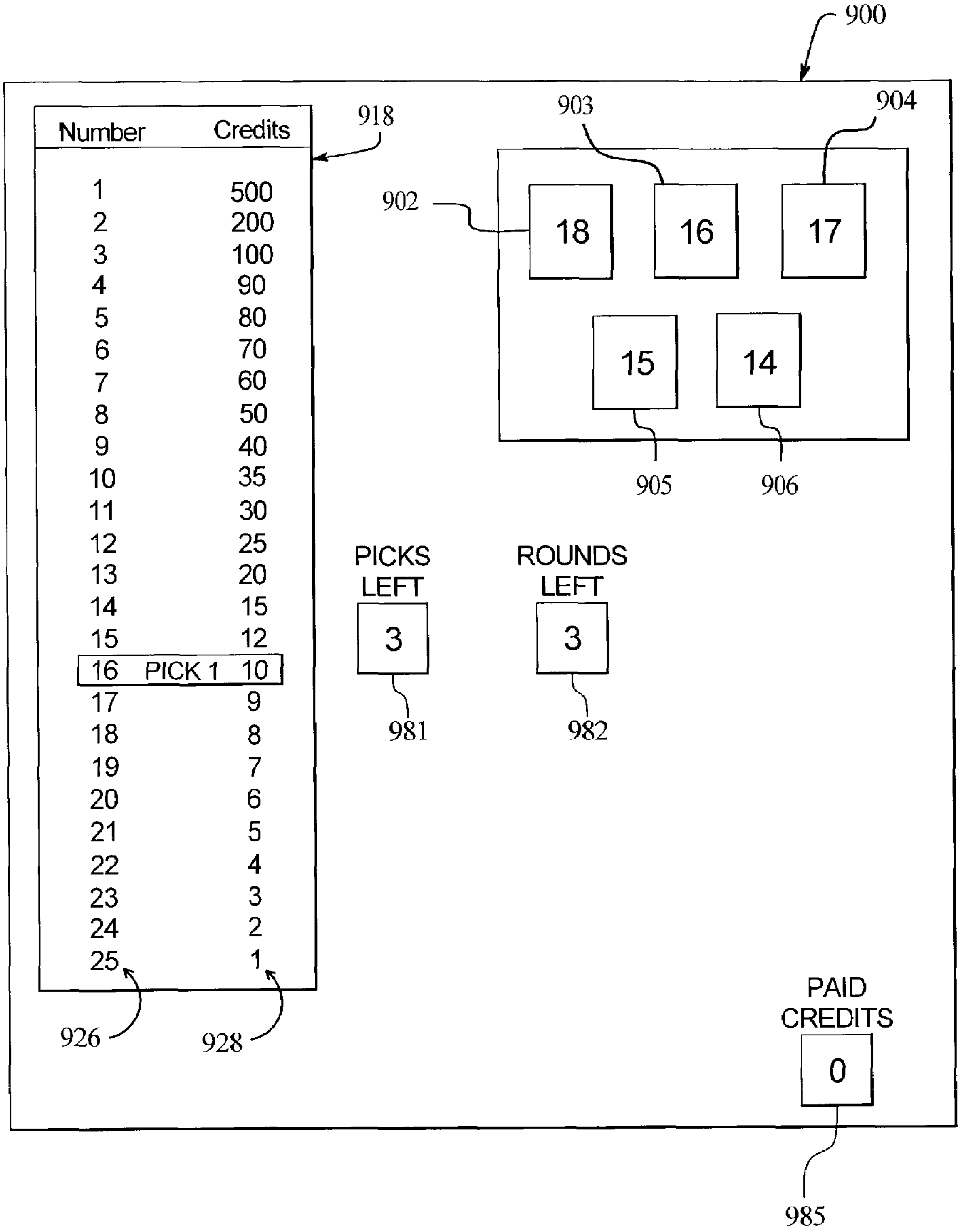

FIGS. 11A through 11C illustrate a first pick during a first round of the bonus game. In FIG. 11A, gaming device provides a display 900 having a value display 918 and five masked selections 902, 903, 904, 905 and 906 that mask initial positions, although any suitable number of selections may be employed. Selections 902 to 906 show one possible arrangement of the selections in the game. Selections 902 to 906 include any suitable type of arrangement desired by a game implementor and in accordance with a theme of the game. To make a pick, the player activates an input device such as by pushing an electromechanical button, touching a touch screen selection displayed on the screen, or clicking a mouse, etc.

As illustrated in FIG. 11A, the gaming device provides a display 981 indicating that there are four picks left in that round and a display 982 indicating that there are three rounds left unplayed. In FIG. 11A, the gaming device provides a message 991 that asks the player to "go ahead and make a pick of one of the masked selections to move up the chart!" Such a message could be a visual message, an audio message, or an audiovisual message. The gaming device may also provide a paid display 985 showing the amount of awards the player has received, as illustrated in FIG. 11A.

In FIG. 11B, the player picks the selection 903, revealing the initial position of sixteen. Display 981 indicates that there are now three picks left in that round. The gaming device records the selection by the player on the value display 918, for example, by displaying "pick 1", as illustrated in FIG. 11C. In one embodiment, the gaming device reveals or unmasks the remaining non-picked positions associated with the remaining selections 902, 904, 905 and 906, respectively, as illustrated in FIG. 11C. Alternatively, the gaming device does not reveal or unmask the remaining non-picked selections and either prompts the player to pick within the remaining non-picked selections in the same group or provides a new group of selections.

Figure 11D:
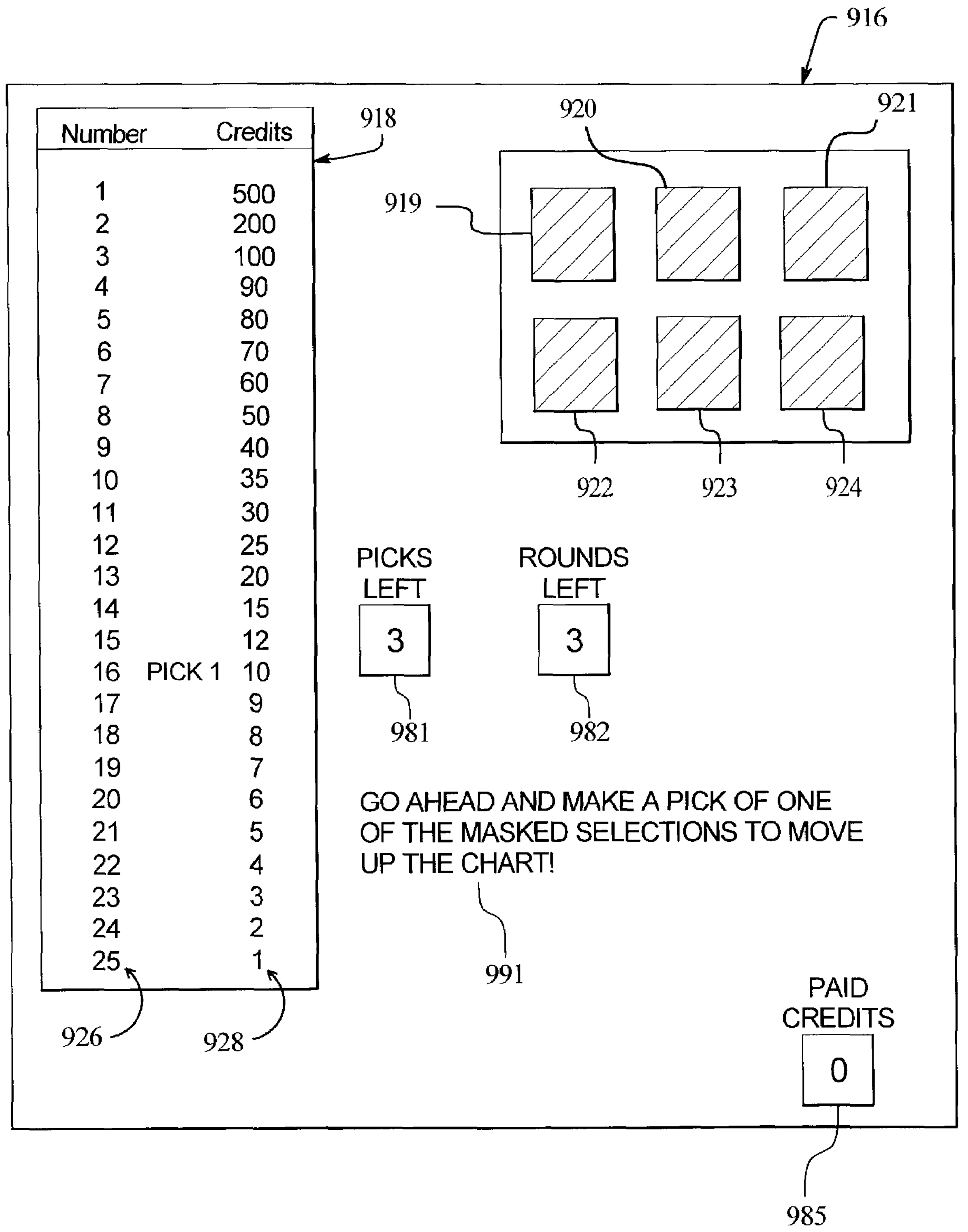
Figure 11E:
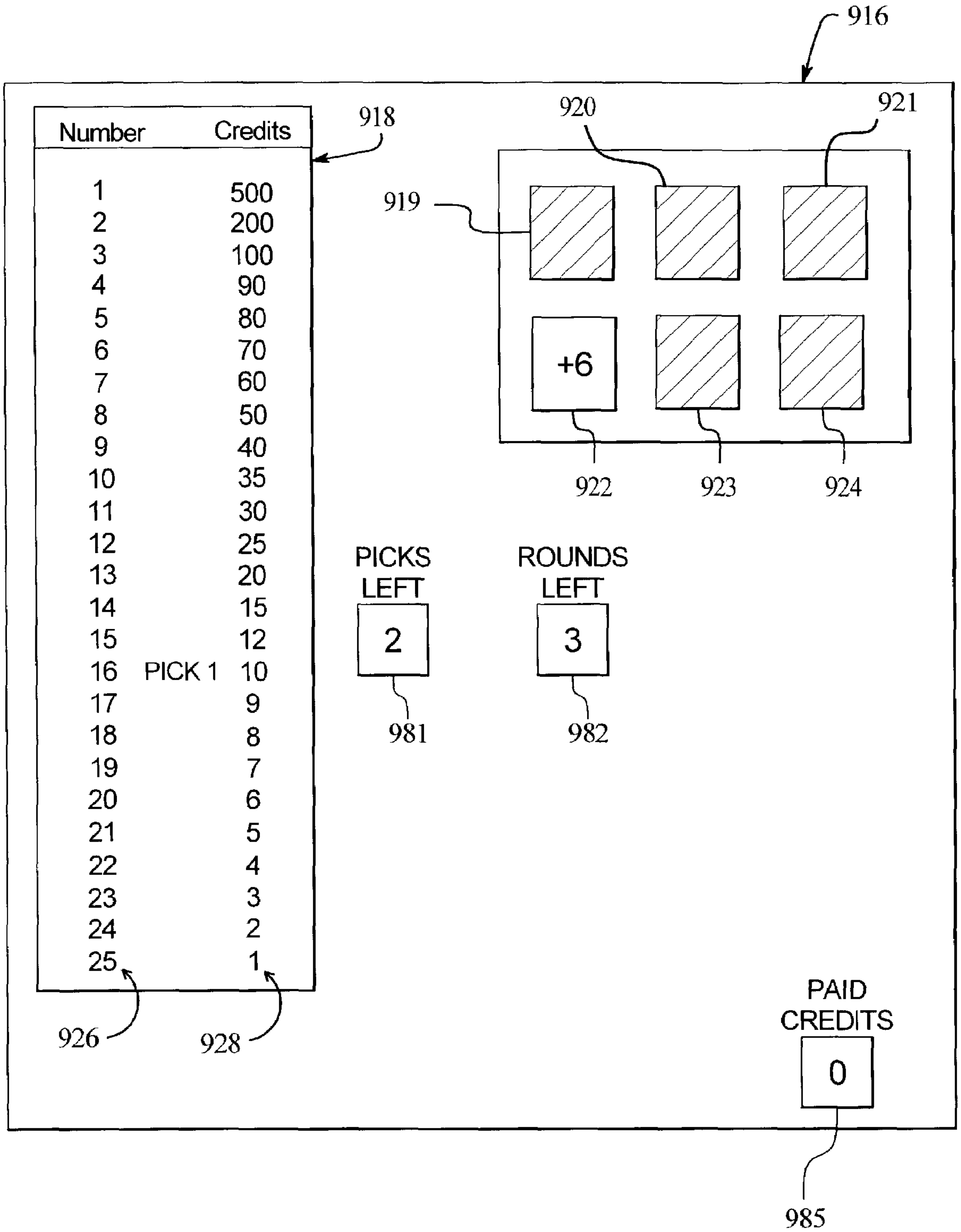
Figure 11F:
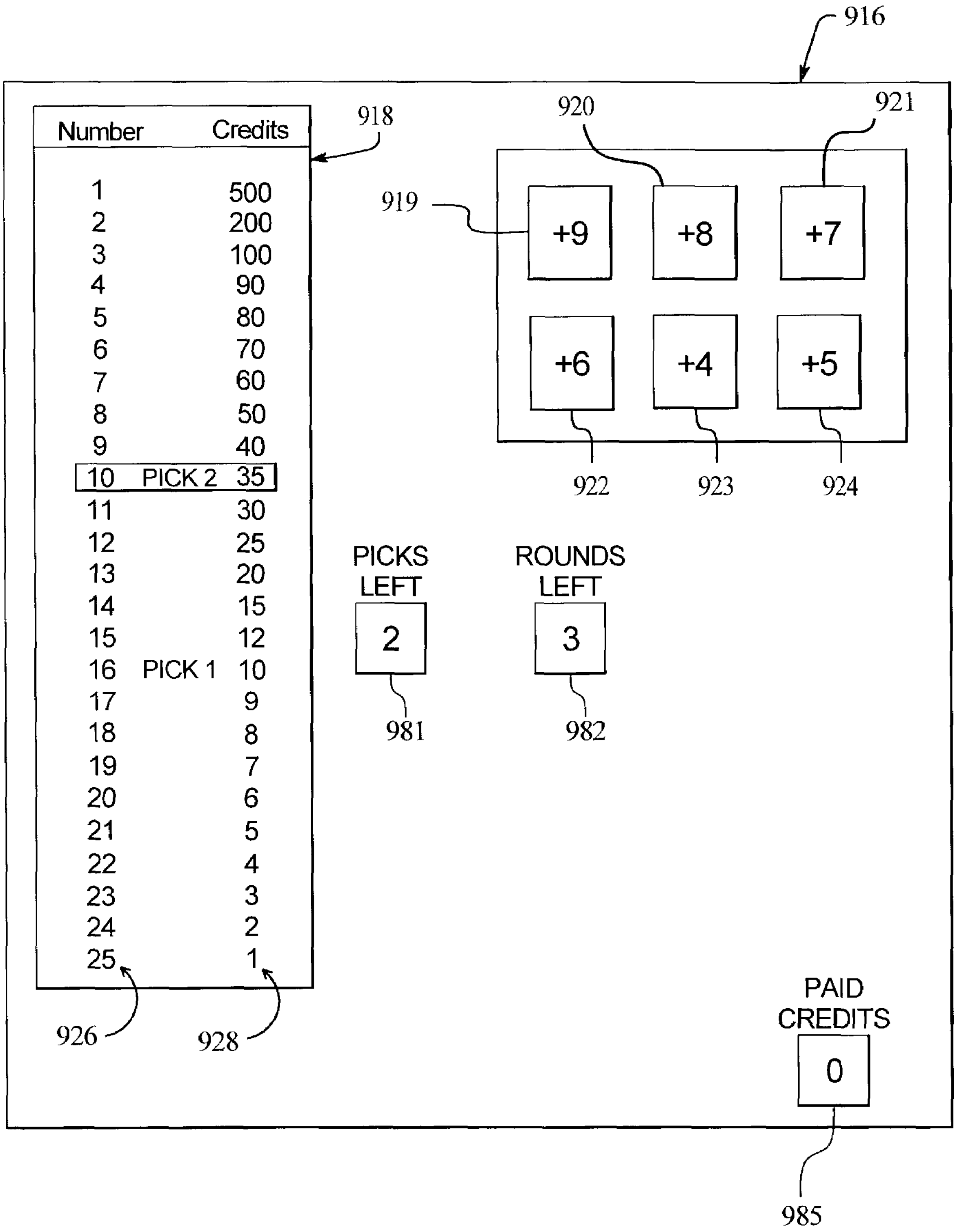

After the first pick by the player, the gaming device provides a second pick display 916 as illustrated in FIGS. 11D through 11F. As illustrated by FIG. 11D, the gaming device provides again a number of masked selections associated with position moves. The position moves of the present invention can be of positive, negative or zero value to move forward, move back or to not move the position obtained by the player during a previous pick. The position moves in one preferred embodiment are each of a positive value in order to provide the player with higher awards. This embodiment, unlike certain of the previous embodiments described herein (see FIGS. 5D, 6, 7A to 7E, 8A to 8G, 9A to 9D and 10A to 10B) is not an offer/acceptance game. Therefore, the gaming device preferably does not lower the player's amount without a player input indicating willingness to assume the risk of such lowered award.

FIG. 11D illustrates six masked selections 919, 920, 921, 922, 923 and 924, although any suitable number of selections may be employed. Selections 919 to 924 show one possible arrangement of the selections in the game. As illustrated in FIG. 11D, display 981 indicates that there are three picks left for this round and display 982 indicates that there are three rounds of the bonus game left. In FIG. 11D, the gaming device provides a message 991 asking the player to "go ahead and make a pick of one of the masked selections to move up the chart!"

In the example illustrated by FIG. 11E, the player picks the selection 922, revealing the position move points having a value of +6 associated with such selection. In FIG. 11E, display 981 indicates that there are now two picks left in that round. The game accordingly changes the initial position by six places or positions closer to the first or ultimate position, creating a new position of ten and a new award of thirty-five, marked as "pick 2", as illustrated in FIG. 11F.

Figure 11G:
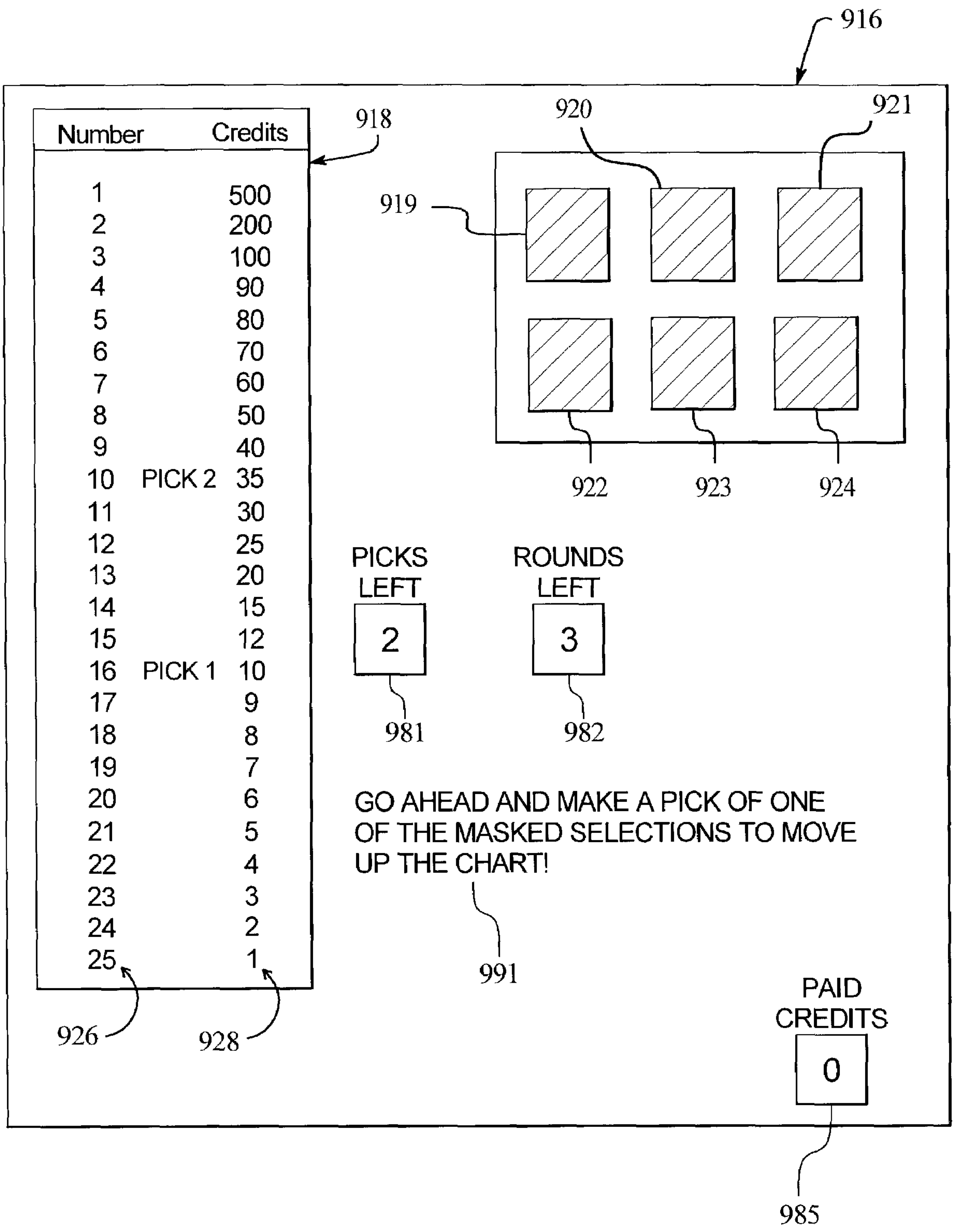
Figure 11H:
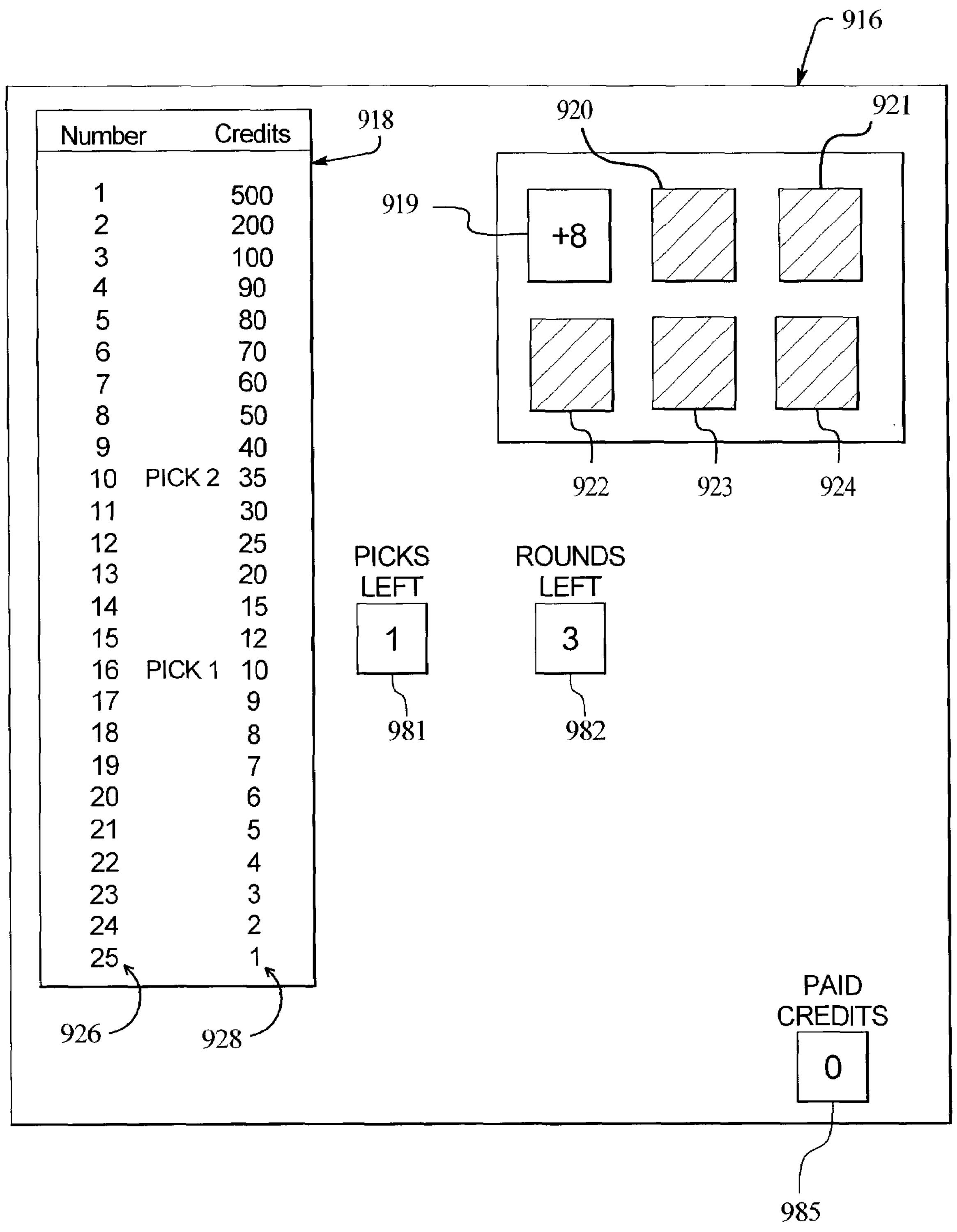
Figure 11I:
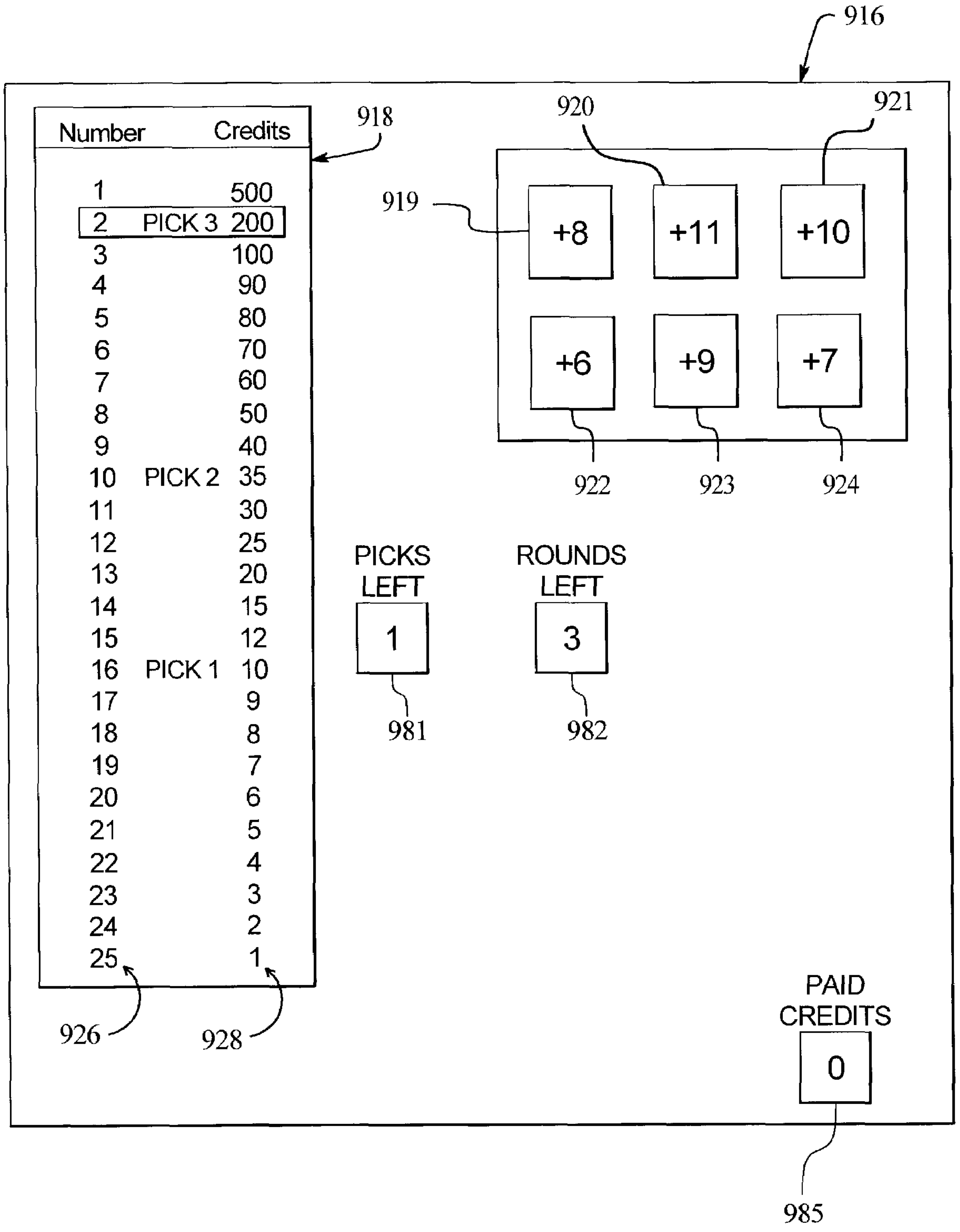

A player's third pick during the first round of the bonus game continues in like fashion, as illustrated in FIGS. 11G to 11I. Here, the player picks one of the masked selections, the selection 919, from the group of selections 919 through 924, and the gaming device reveals position move points of +8, as illustrated in FIG. 11H, such that the player's position moves by eight places or positions closer to the first or ultimate position, creating a new position of two and a new award of two hundred, marked as "pick 3" in FIG. 11I. FIG. 11G presents a new set of selections associated with position move points. FIG. 11H shows the pick by the player resulting in a position move of +8. FIG. 11I shows the result of the pick wherein the player's position changes.

Figure 11J:
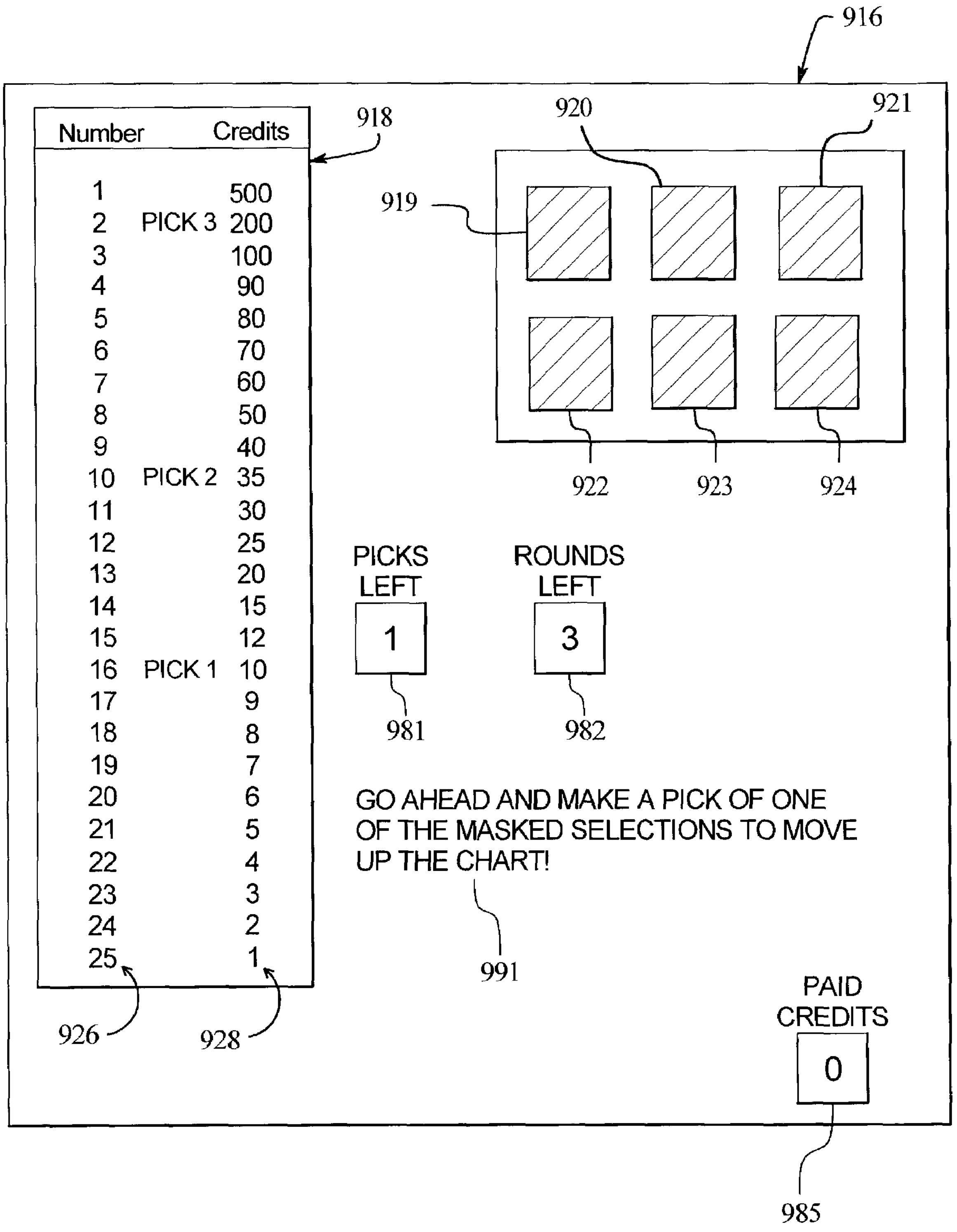
Figure 11K:
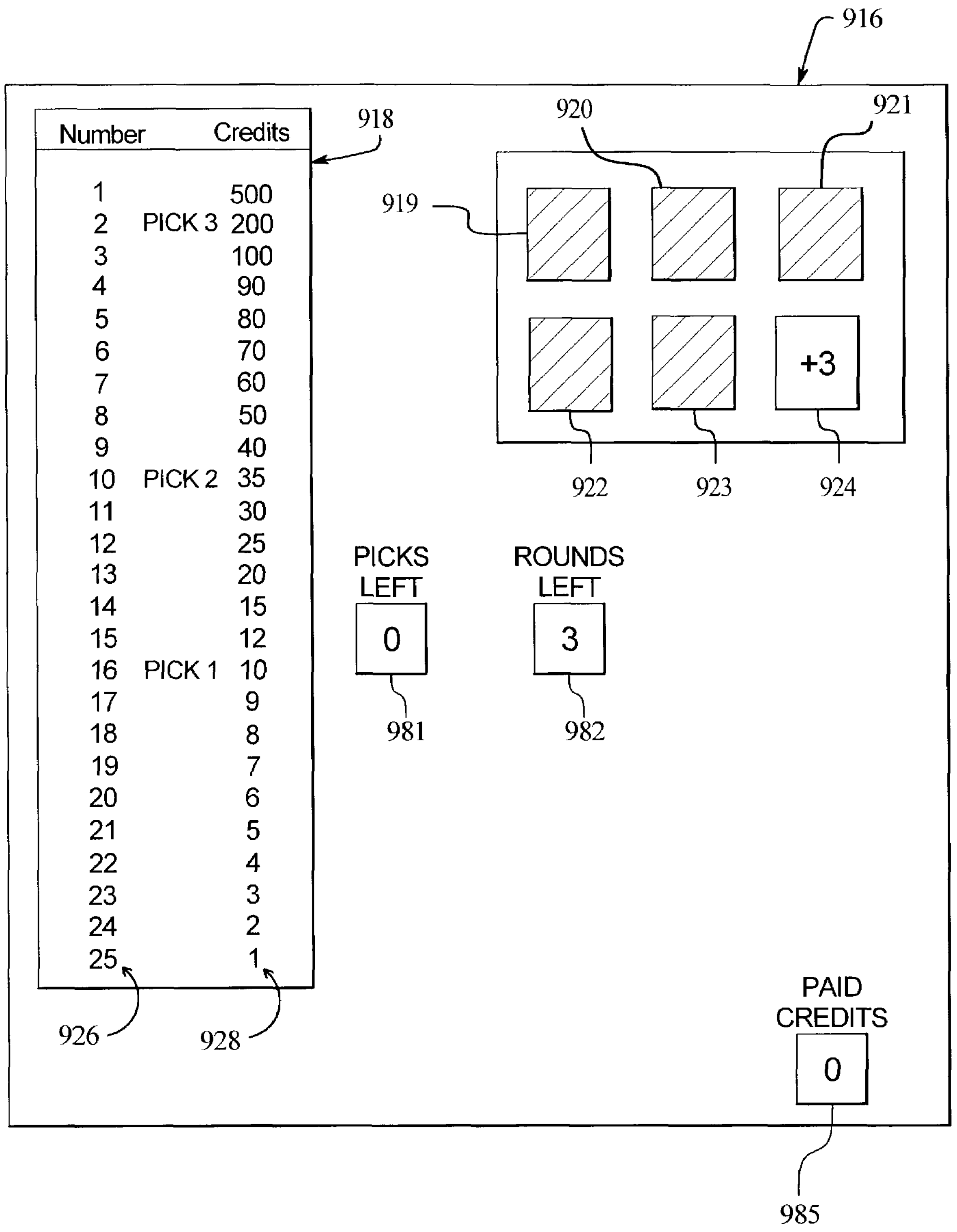
Figure 11L:
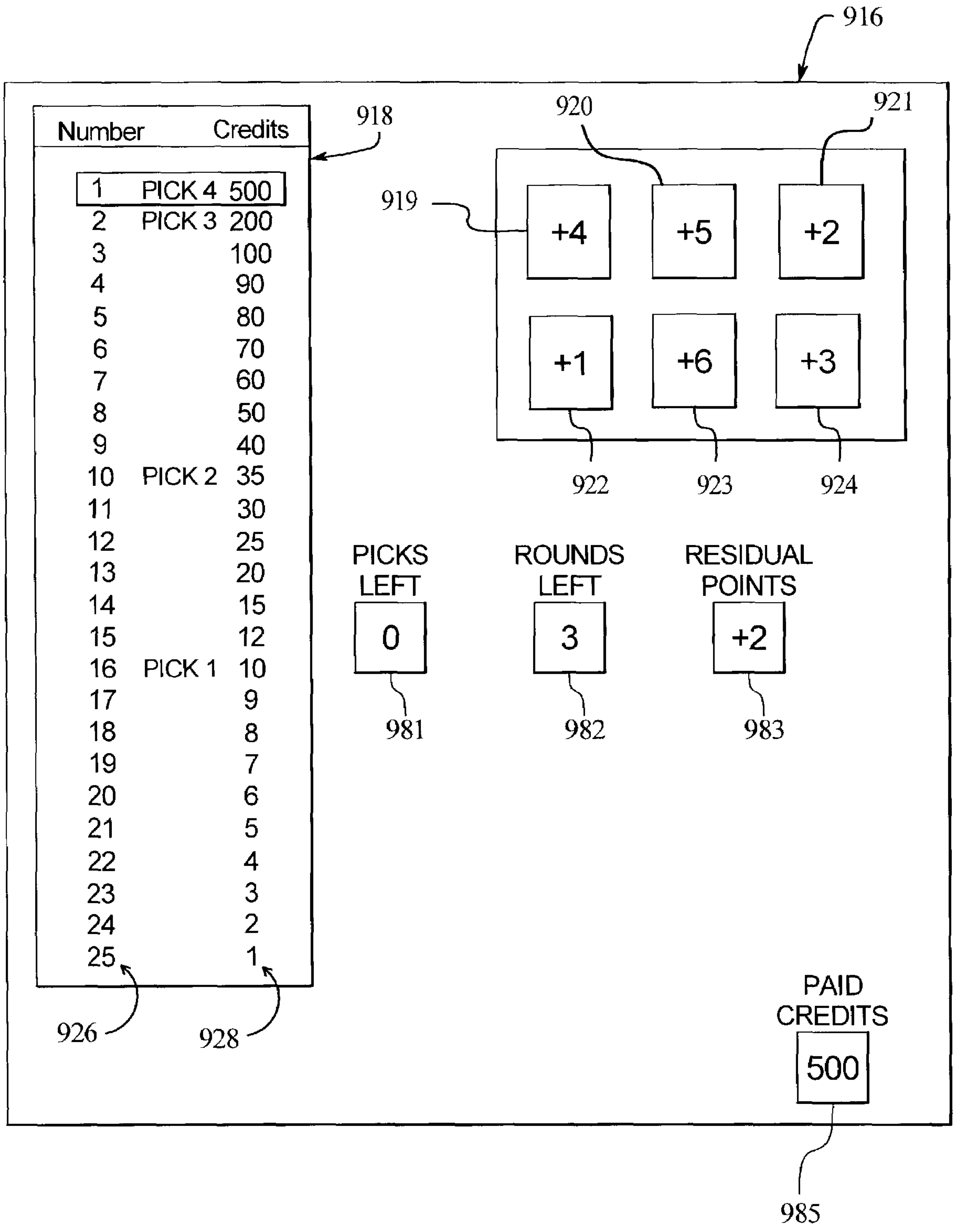

FIGS. 11J through 11L illustrate the fourth or final pick by the player during the first round of the bonus game. In this example, the player picks one of the masked selections, the selection 924, from the group of selections 919 through 924 as illustrated in FIG. 11J, wherein the gaming device reveals position move points of +3 as illustrated in FIG. 11K. In FIG. 11K, display 981 indicates that there are now no picks left in that round. In FIG. 11L, the player only needs to move one place or position to reach the first, activation, target, ultimate, designated, or predetermined or reset position and the award of five hundred, marked as "pick 4." The gaming device accordingly changes the awards shown in display 985 from zero to five hundred, as illustrated in FIG. 11L. Alternatively, the gaming device pays the player at the end of all the rounds. In one preferred embodiment, the gaming device also provides the player an additional award for obtaining the highest, best, or most favorable, designated, target, predetermined, or randomly determined position. In one alternative embodiment, a multiplier or other award can be determined from a mechanical device such as a wheel, die or reel upon the occurrence of the trigger or designated position.

Figure 11M:
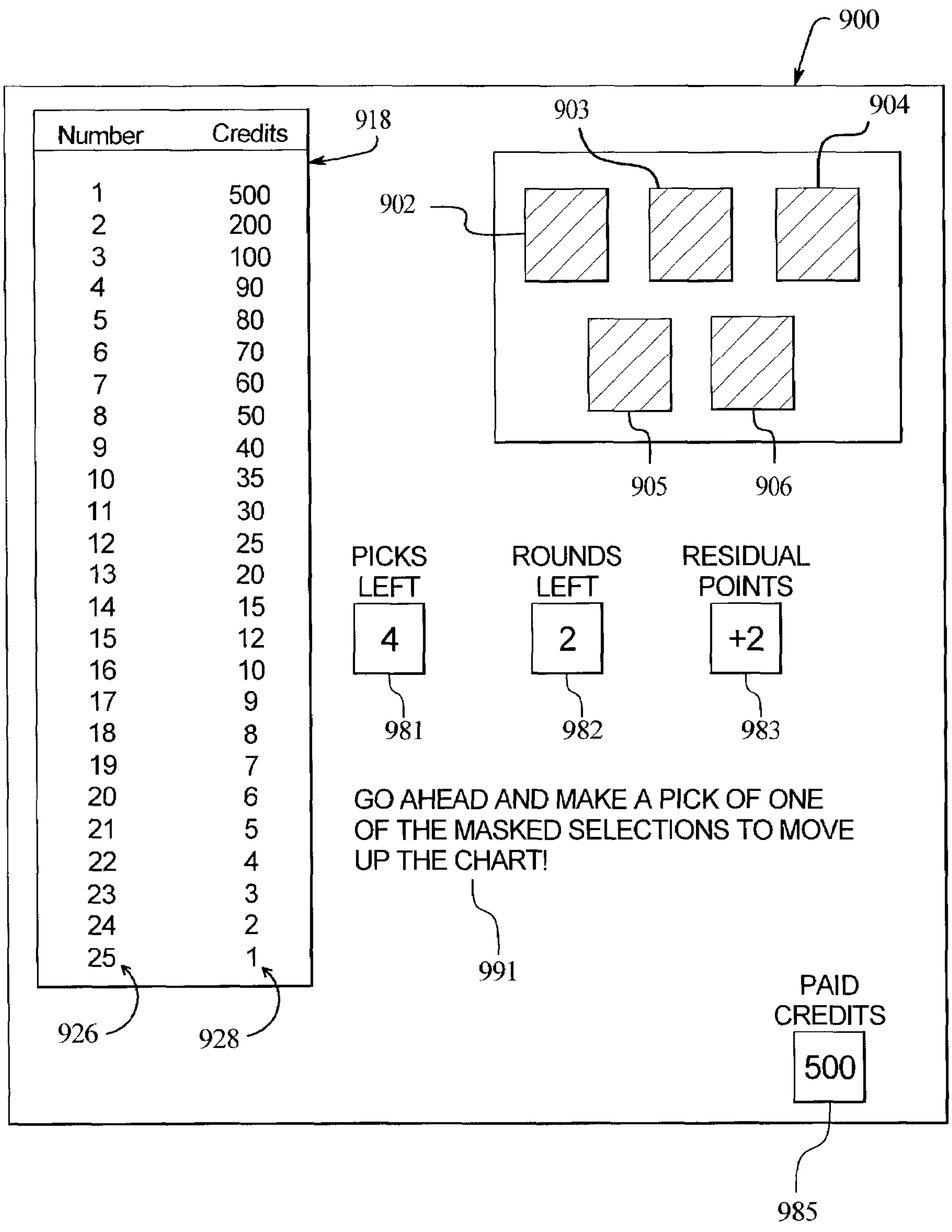
Figure 11N:
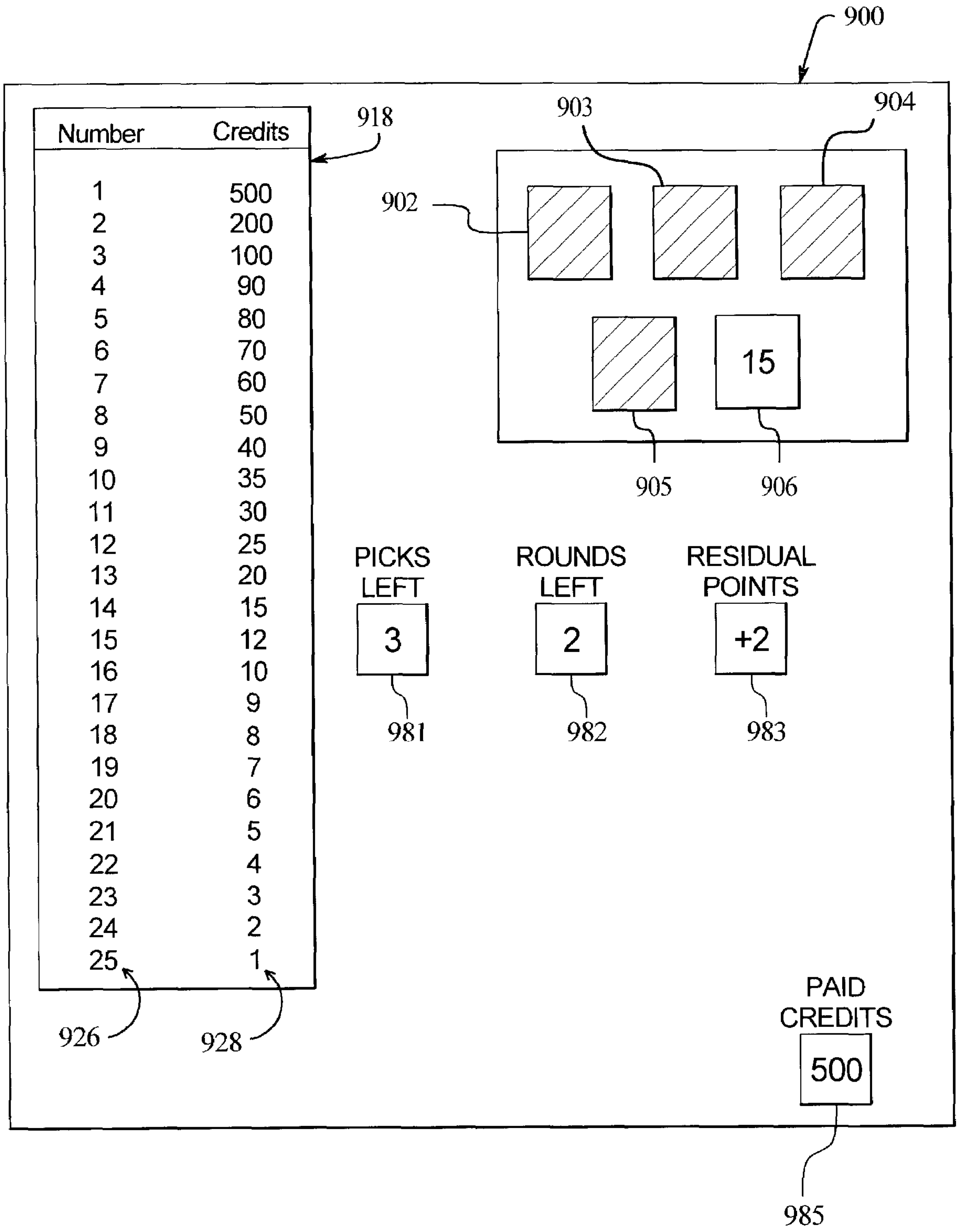
Figure 11O:
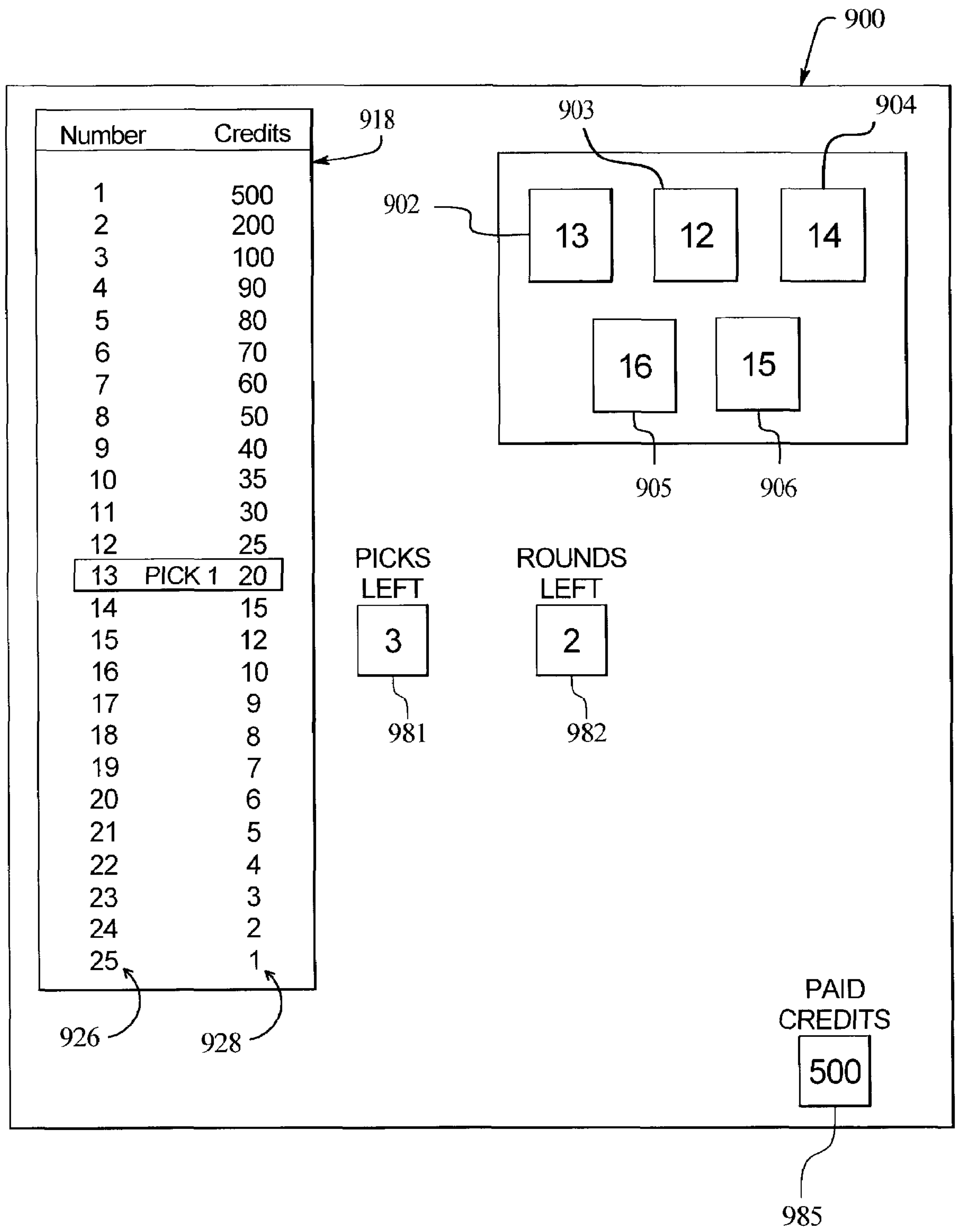

In one embodiment, the gaming device saves the residual +2 position move points as indicated by an additional display 983, as illustrated by FIG. 11L. The gaming device applies the residual points to the result of the first pick during the next round of the bonus game, as illustrated by FIGS. 11M through 11O. That is, the gaming device uses the residual points in determining the player's initial position in the next round, whether that position is determined via a player's pick or automatically and randomly by the gaming device.

In another embodiment, the gaming device may enable the player to hold the residual points and not automatically apply the residual points to the first pick during the next round, wherein the player selectively uses the residual points in a desired round. The player can thereby command the gaming device to apply the residual points to the final pick of a round instead of to the initial or "come out" position of a round. In yet another-embodiment, the gaming device accumulates residual points to be applied in a subsequent round. Here, the gaming device may accumulate residual points over multiple rounds of the bonus game and let the player use the residual points as needed.

FIGS. 11A through 11L illustrate an embodiment with residual points. FIGS. 11M through 11V on the other hand illustrate another embodiment of the bonus game having residual picks instead. In FIG. 11M, display 981 indicates that there are four picks left for this round, display 982 indicates that there are now two rounds of the bonus game left unplayed, and display 983 indicates that there are +2 residual position move points carried over from the previous round of the bonus game. The player chooses the selection 906, revealing the initial position of fifteen as illustrated in FIG. 11N. In FIG. 11N, display 981 indicates that there are now three picks left in that round. Since there is a carryover of residual position move points of +2, the game accordingly changes the initial position of fifteen by two places or positions closer to the first or ultimate position, creating a new position of thirteen and a new award of twenty, marked as "pick 1", as illustrated in FIG. 11O.

Figure 11P:
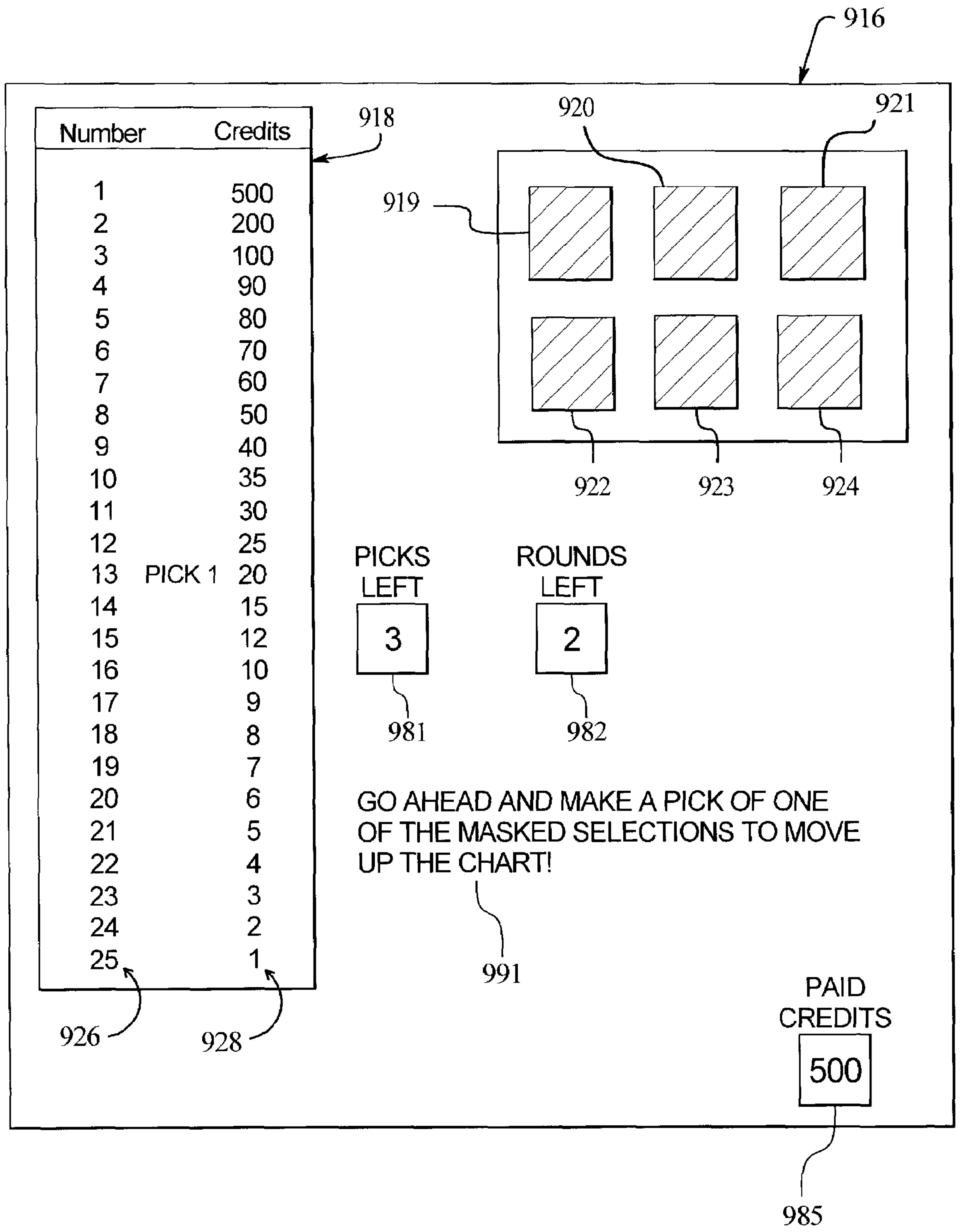
Figure 11Q:
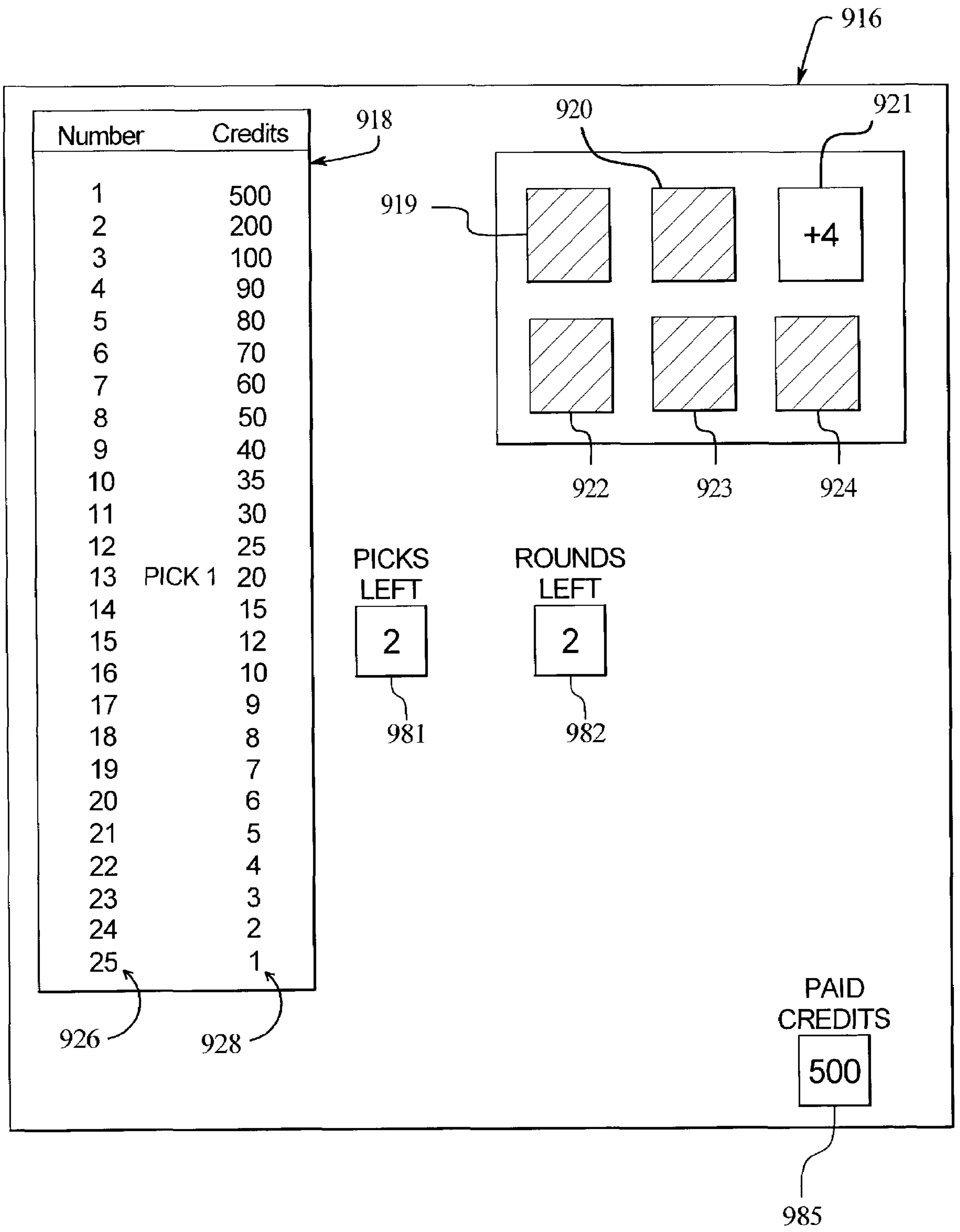
Figure 11R:
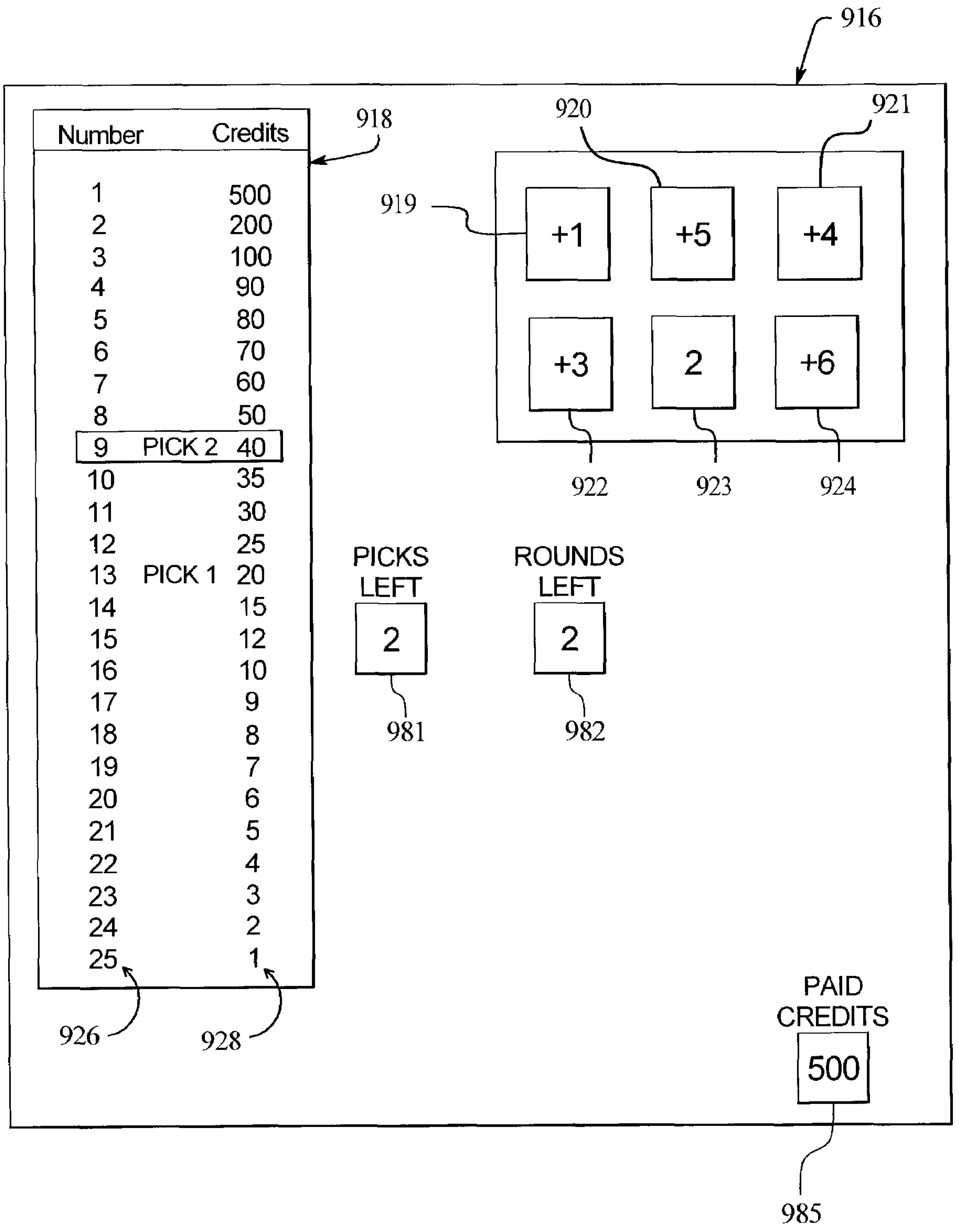

For the second pick during the second round of the bonus game as illustrated in FIGS. 11P through 11R, the player picks one of the masked selections, the selection 921, from the group of selections 919 through 924, and the gaming device reveals position move points of +4, as illustrated by FIG. 11Q, such that the player's position moves by four places or positions closer to the first or ultimate position, creating a new position of nine and a new award of forty, marked as "pick 2" in FIG. 11R.

Figure 11S:
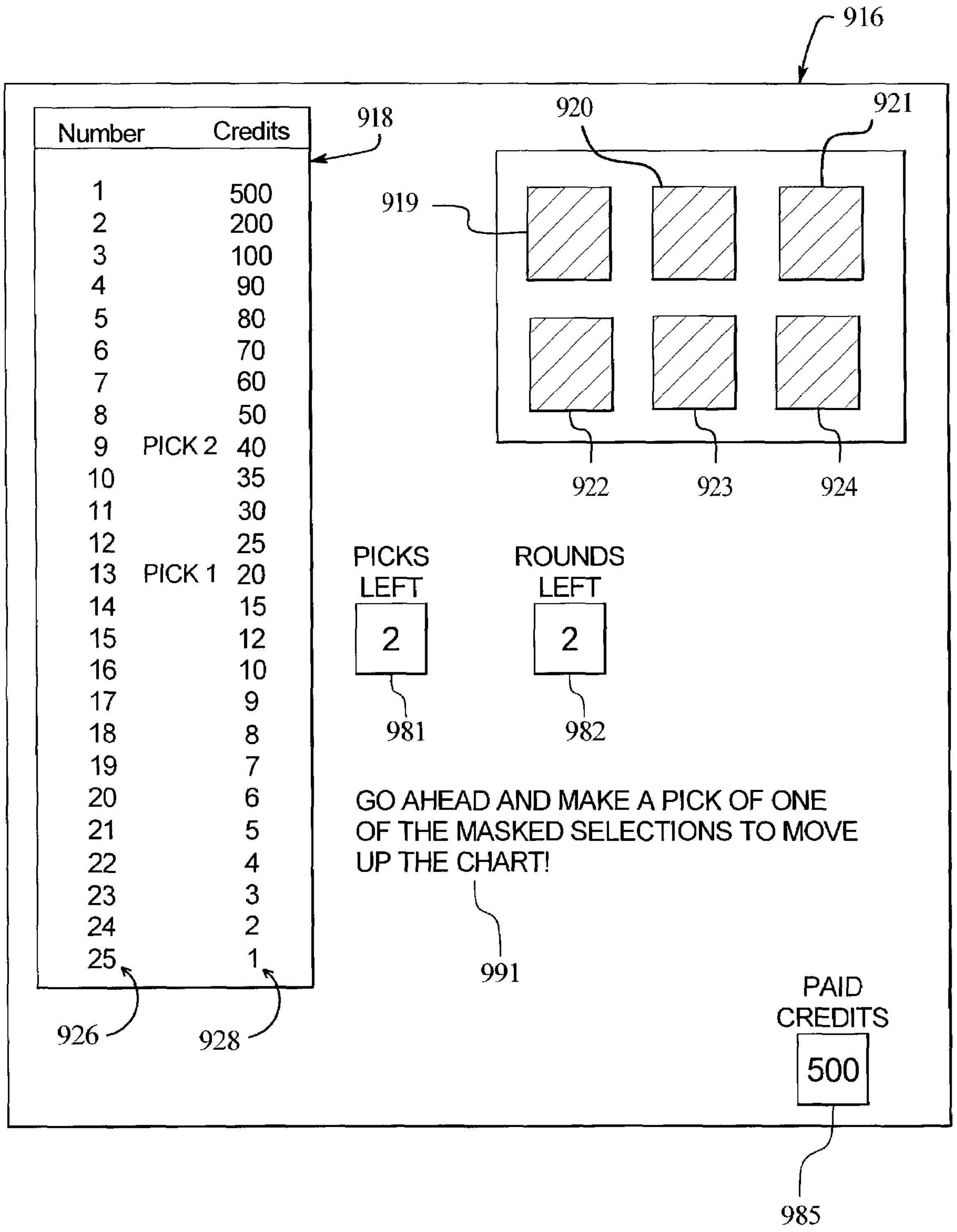
Figure 11T:
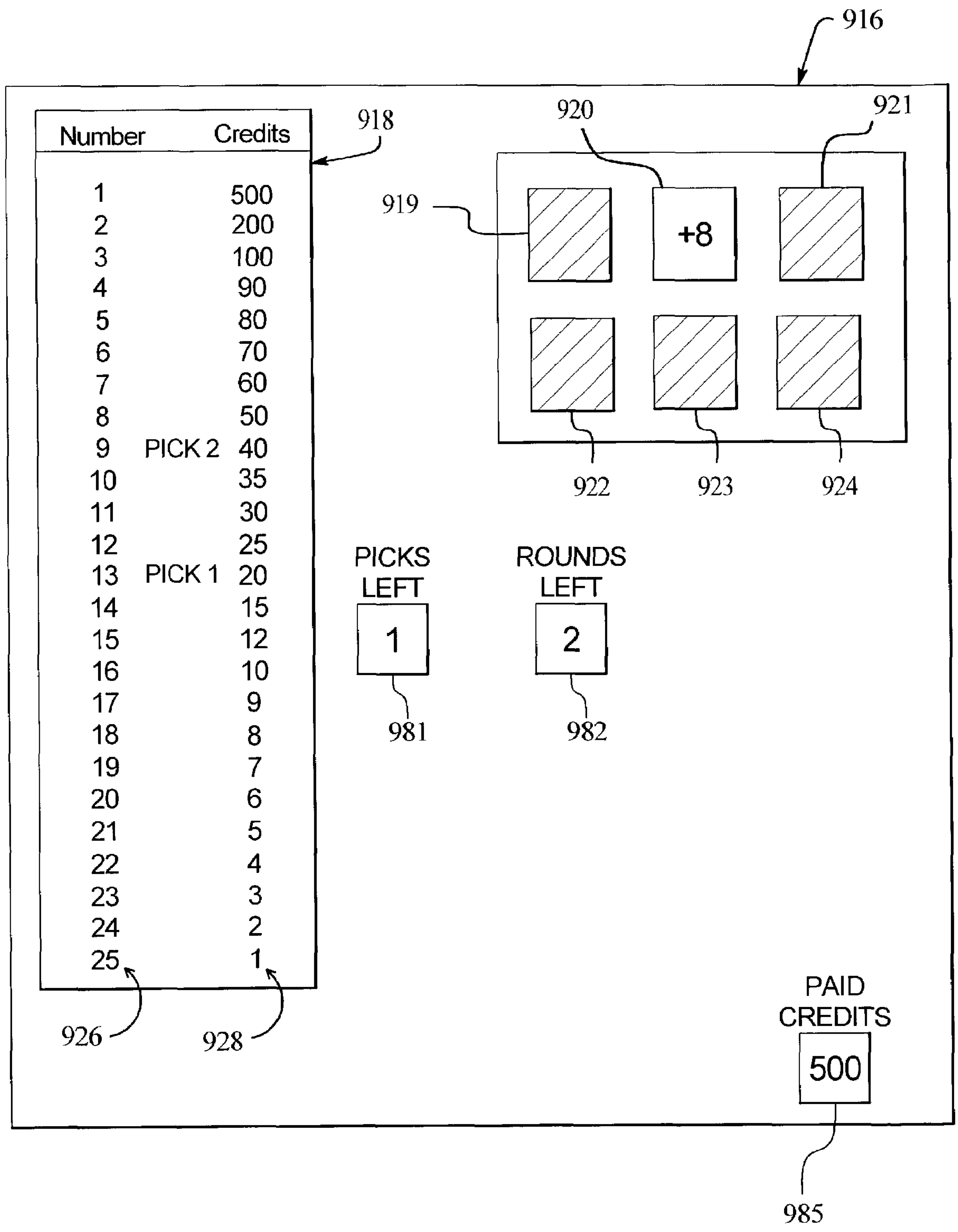
Figure 11U:
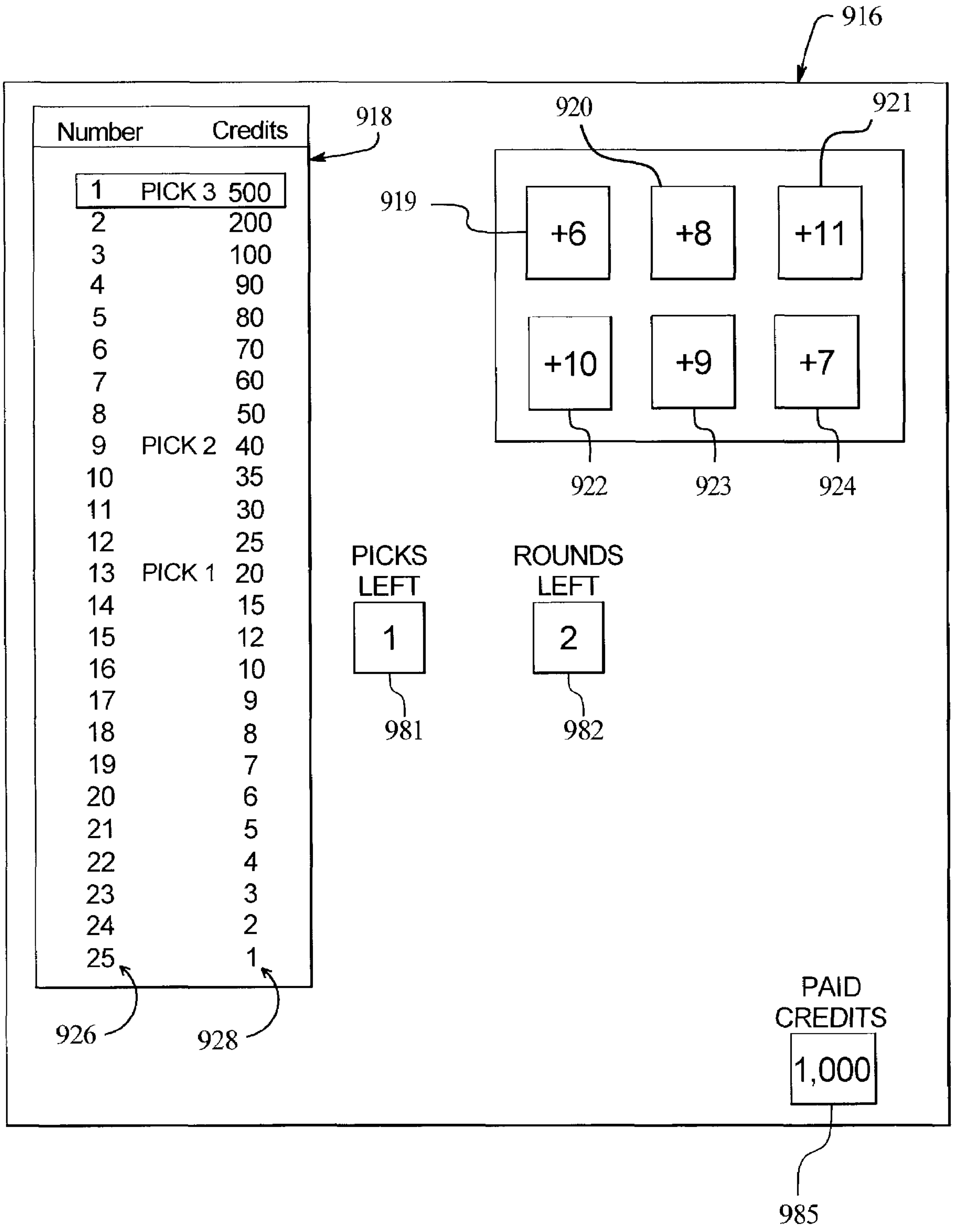

The player proceeds to make the third pick during the second round of the bonus game as illustrated in FIGS. 11S through 11U. In this example, the player picks the selection 920 revealing position move points of +8 as illustrated in FIG. 11T. In FIG. 11T, display 981 indicates that there are now two picks left in that round. The game accordingly changes the previous position of nine by eight places or positions, creating a new position of one and a new award of five hundred, marked as "pick 3", as illustrated in FIG. 11U. In FIG. 11U, the paid display 985 shows the accumulated awards the player has received, here, one thousand.

Figure 11V:
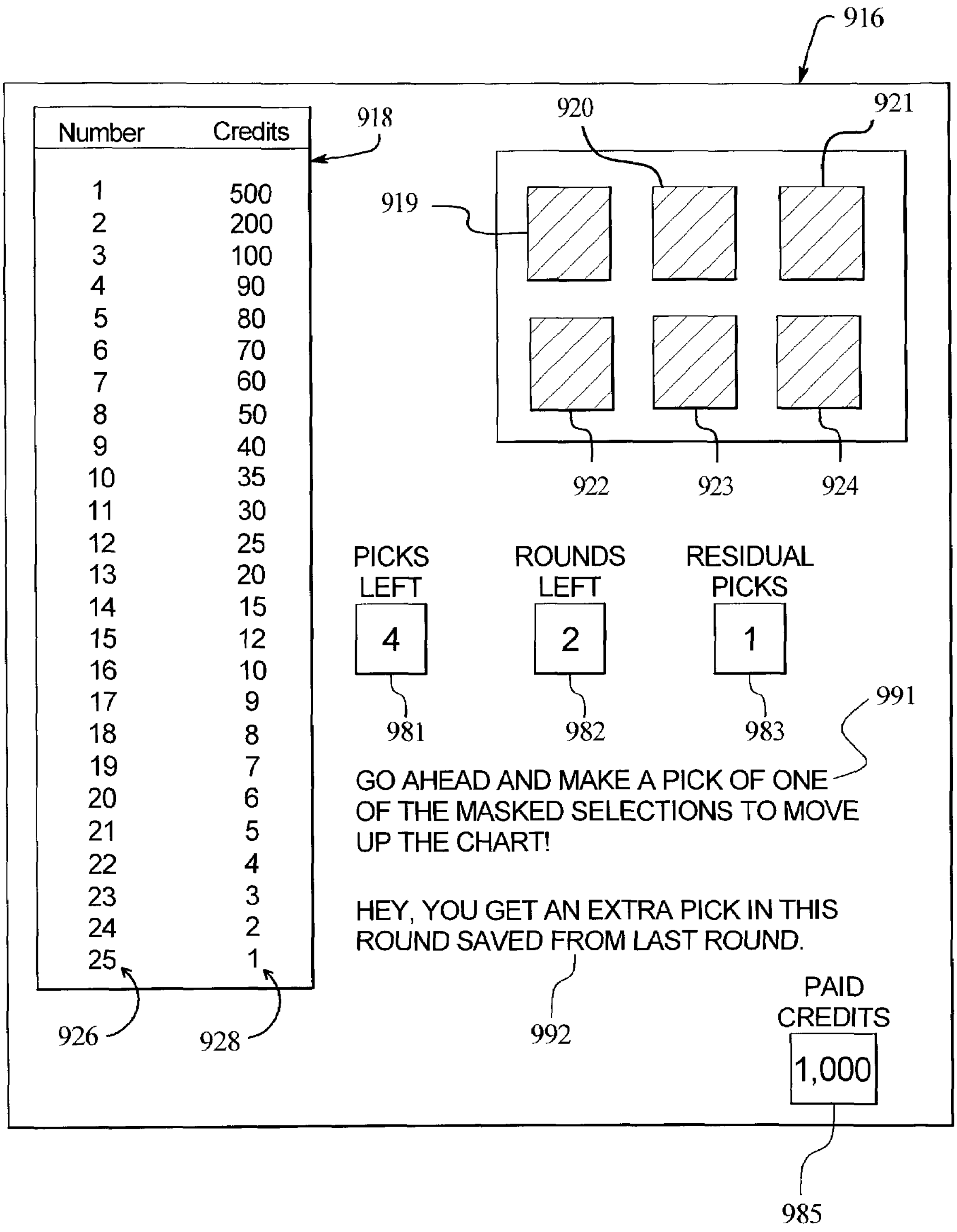

In the example illustrated by FIG. 11U, the gaming device saves one residual pick as indicated by display 981, and will enable the player to use the residual pick automatically during the next round of the bonus game or selectively during any subsequent round. As illustrated in FIG. 11V, the first pick of the next round of the bonus game provides a total of five picks instead of four picks, as indicated by the four picks in the picks left display 981 and the one pick in Residual Picks display 983. In addition to message 991, the gaming device may provide a message display 992, e.g., "Hey, you get an extra pick in this round saved from last round", as illustrated in FIG. 11V.

It should be appreciated that the gaming device may accumulate residual picks over multiple rounds of the bonus game. It should also be appreciated that the player may receive both residual position move points and residual picks in the same round or in the same game and that each of the various embodiments described above for the residual move points is applicable to the residual picks. It should further be appreciated that the gaming device may provide the player with an additional award based on residual points and/or residual picks or provide an award in lieu of providing the additional move points or additional picks.

In an alternative embodiment of the present invention, credits or awards are not associated with the sequential position numbers. In this embodiment, an award or prize is provided to the player for completing the round and getting to the designated, predetermined or target position. A consolation award may be provided to the player for not obtaining the designated, predetermined or target position. In one embodiment, the award provided to the player associated with the designated, predetermined or target position is determined through another game or event such as the selection of one or more of the plurality of selections or the activation of a mechanical device such as a wheel, reel, die or set of objects such as balls. Thus, in this embodiment, the primary goal of the player is obtain the number one or target selection.

It should be appreciated that in one preferred embodiment of the present invention, each subsequent round includes higher awards or higher average awards. In such embodiment, the probability of reaching subsequent rounds may decrease with each round.

While the present invention is described in connection with what is presently considered to be the most practical and preferred embodiments, it should be appreciated that the invention is not limited to the disclosed embodiments, and is intended to cover various modifications and equivalent arrangements included within the spirit and scope of the claims. Modifications and variations in the present invention may be made without departing from the novel aspects of the invention as defined in the claims, and this application is limited only by the scope of the claims.

The invention claimed is:

1. A gaming device operated under control of a processor, the gaming device comprising:

a game operable upon a wager by a player;

a plurality of positions including at least one target position;

a plurality of selections associated with position move points;

a plurality of rounds each consisting of at least one player pick of the selections;

a display device for displaying said positions, position move points and rounds; and wherein the processor is operable with said display device in one of the rounds to:

(i) provide the player picks of the selections;

(ii) determine positions based on position move points generated from the player picks of the selections;

(iii) end position moves when reaching the target position; and (iv) store any residual position move points provided by the player picks of the selections that remain after reaching the target position in said round; and wherein the processor and display device in a subsequent one of the rounds: enable use of residual position move points during the subsequent round.

2. The gaming device of claim 1, wherein position move points are positive integers, zero or negative integers.

3. The gaming device of claim 1, wherein the processor and display device display multiple selections to a player and enable the player to pick selections to yield position move points.

4. The gaming device of claim 3, wherein the processor and display device reveal the position moves associated with the non-picked selections.

5. The gaming device of claim 3, wherein the processor and display device enable the player to pick at least one selection from the non-picked selections.

6. The gaming device of claim 1, wherein completion of the round and advancement to a next one of the rounds is conditioned upon reaching the target position within a predefined number of picks of the selections.

7. The gaming device of claim 1, wherein completion of the round and advancement to a next one of the rounds is provided automatically upon completing a number of player picks of the selections provided in said round.

8. The gaming device of claim 1, which includes an award provided to a player at the end of each round based on a final position reached.

9. The gaming device of claim 1, wherein upon initiation of the round, an initial position is determined by the processor.

10. The gaming device of claim 1, wherein an initial position is established by a player pick of one of the selections.

11. The gaming device of claim 1, wherein during at least one subsequent round, an initial position is determined by an outcome of at least one preceding round.

12. The gaming device of claim 1, wherein the processor applies the residual position move points from the round to an initial position in another round.

13. The gaming device of claim 1, wherein the processor applies the residual position move points from the round to position move points of one of the picks of the selections by a player during another round.

14. The gaming device of claim 1, which includes an accumulation of residual position move points over multiple rounds.

15. The gaming device of claim 1, which includes an award provided to the player based on the residual position move points.

16. The gaming device of claim 1, wherein any residual picks from the round are applied to another round.

17. The gaming device of claim 1, wherein an award is associated with each position and the processor provides a player the award associated with a final position achieved in each round.

18. A gaming device comprising:

a game operable upon a wager by a player;

a plurality of positions including at least one target position;

a plurality of selections associated with position move points;

a plurality of rounds each consisting of at least one player pick of the selections;

a display device for displaying said positions, position move points, and rounds; and a processor operable with said display device, wherein the processor and display device in one of the rounds:

(i) provide the player picks of the selections;

(ii) determine positions based on position move points from the player picks of the selections;

(iii) end position moves when reaching the target position and (iv) store any residual picks that remain after reaching the target position in said round; and wherein the processor and display device in a subsequent one of the rounds: enable use of the residual picks during the subsequent round.

19. The gaming device of claim 18, wherein position move points are positive integers, zero or negative integers.

20. The gaming device of claim 18, wherein the processor and display device operate to display multiple selections to a player and enable the player to pick the selections to yield position move points.

21. The gaming device of claim 20, wherein the processor and display device operate to reveal the position moves associated with the non-picked selections.

22. The gaming device of claim 20, wherein the processor and display device operate to enable the player to pick at least one selection from the non-picked selections.

23. The gaming device of claim 18, wherein completion of the round and advancement to a next one of the rounds is conditioned upon reaching the target position within a predefined number of picks of the selections.

24. The gaming device of claim 18, wherein completion of the round and advancement to a next one of the rounds is provided automatically upon finishing a number of picks of the selections provided in said round.

25. The gaming device of claim 18, which includes an award provided to the player at the end of the round based on a final position reached.

26. The gaming device of claim 18, wherein upon initiation of the round, an initial position is determined by the processor.

27. The gaming device of claim 18, wherein an initial position is established by a player pick of one of the selections.

28. The gaming device of claim 18, wherein during at least one subsequent round, an initial position is determined by an outcome of at least one preceding round.

29. The gaming device of claim 18, wherein the processor applies the residual picks from the round to a next round.

30. The gaming device of claim 18, which includes an accumulation of residual picks over multiple rounds.

31. The gaming device of claim 18, which includes an award provided to a player based on the residual picks.

32. The gaming device of claim 18, wherein any residual position move points from the round are applied to another round.

33. The gaming device of claim 18, which includes an award associated with each position, wherein the processor provides a player the award associated with a final position reached in each round.

34. A gaming device comprising:

a game operable upon a wager by a player;

a plurality of positions including at least one target position;

an award associated with the target position;

a plurality of selections associated with position move points;

a plurality of rounds each consisting of at least one player pick of the selections;

a display device for displaying said positions, award, position move points, and rounds; and a processor operable with said display device, wherein the processor and display device in one of the rounds:

(i) provide the player picks of the selections;

(ii) determine positions based on position move points from the player picks of the selections;

(iii) end position moves when reaching the target position;

(iv) store any residual picks that remain after reaching the target position in said round and;

(v) provide the award associated with the target position to a player if the final position in the round is the target position; and wherein the processor and display device in a subsequent one of the rounds: enable the player to use residual picks during the subsequent round.

35. A gaming device comprising:

a game operable upon a wager by a player;

a plurality of positions including at least one target position;

a plurality of random determinations of position move points;

a plurality of rounds each consisting of at least one of said random determinations of position move points;

a display device for displaying said positions, position move points and rounds; and a processor operable with said display device in one of the rounds to:

(i) provide at least one of said random determinations of position move points;

(ii) determine at least one position based on the determined position move points;

(iii) end position moves when reaching the target position; and (iv) store any residual position move points that remain after reaching the target position in said round; and wherein the processor and display device in a subsequent one of the rounds: enable use of the residual position move points during the subsequent round.

36. A gaming device comprising:

a game operable upon a wager by a player;

a plurality of positions including at least one designated target position;

an award associated with at least one of the positions;

a plurality of random determinations of position move points hidden from a player by a plurality of masked selections;

a display device operable to display the positions, award and randomly determined position move points; and a processor operable with said display device in a game to:

(i) determine and display each obtained position based on each of the randomly determined position move points, (ii) provide the award, if any, to the player associated with a final position based on said randomly determined position move points, and (iii) provide an additional award to the player if the final position is the designated target position.

37. The gaming device of claim 36, wherein the plurality of random determinations of position move points are determined by the player picking selections from the plurality of masked selections.

38. The gaming device of claim 36, wherein if the final position is the target position, the processor and display device enable the player to play the game again.

39. The gaming device of claim 36, wherein the additional award is displayed using a mechanical device.

40. The gaming device of claim 39, wherein the mechanical device is selected from the group consisting of: a wheel, a reel, a die and a set of objects.

41. The gaming device of claim 36, wherein the additional award includes an award modifier.

42. The gaming device of claim 36, which includes a plurality of rounds each consisting of at least one of said random determinations of position move points, wherein each subsequent round has a higher award associated with at least one position than a previous round.

43. A method of operating a game of a gaming device, said method comprising the steps of:

(a) generating, in each round of the game, an initial position for a player, the initial position selected from a plurality of positions, the plurality of positions having a target position, wherein at least one of the positions corresponds to an award;

(b) enabling the player within one of the rounds to pick at least one selection to obtain position move points;

(c) using said position move points to determine a new position in the round;

(d) recording any residual position move points provided by one of the player's picks that remain if the player reaches the target position in the round; and (e) providing the residual position move points, if any, to the player in another round of the game.

44. The method of claim 43, which includes providing a number of picks to the player to reach the target position and applying any residual picks that remain if the player reaches the target position in another round of the game.

45. The method of claim 43, wherein steps (a) to (d) are provided via a data network.

46. The method of claim 45, wherein the data network includes an internet.

47. The method of claim 43, wherein the award corresponds to the target position and is provided to the player if the player reaches the target position.

48. A method of operating a game of a gaming device, said method comprising the steps of:

(a) generating, in each round of said game, an initial position for a player, the initial position selected from a plurality of positions, the plurality of positions having a target position, at least one of the positions corresponding to an award;

(b) providing, in one of the rounds, the player with a number of picks of selections and enabling the player to pick at least one selection, to obtain a new position in the round;

(c) recording any residual picks from the number of picks that remain if the player reaches the target position in said round; and (d) providing any residual picks to the player in another round of the game.

49. The method of claim 48, which includes providing any residual position move points provided by one of the player's picks that remain after the target position is reached by the player in another round of the game.

50. The method of claim 48, wherein steps (a) to (d) are provided via a data network.

51. The method of claim 50, wherein the data network includes an internet.

52. The method of claim 48, wherein the award corresponds to the target position and is provided for the player if the player reaches the target position.

53. A gaming device operated under control of a processor, the gaming device comprising:

a game operable upon a wager by a player;

a plurality of positions including at least one target position;

a plurality of selections associated with position move points, wherein the position move points are positive integers, zero or negative integers;

a plurality of rounds each consisting of at least one player pick of the selections;

a display device for displaying said positions, position move points and rounds; and wherein the processor is operable with said display device in at least one of the rounds to:

(i) determine positions based on generated position move points;

(ii) end position moves when reaching the target position; and (iii) determine any residual position move points provided by the player picks of the selections that remain after reaching the target position in said round and wherein the processor and display device enable use of any residual position move points during a subsequent one of the rounds.

* * * * *